US011050212B2

(12) United States Patent
Sato et al.

(10) Patent No.: US 11,050,212 B2
(45) Date of Patent: Jun. 29, 2021

(54) LASER MACHINING DEVICE AND LASER OSCILLATOR

(71) Applicant: Keyence Corporation, Osaka (JP)

(72) Inventors: Masao Sato, Osaka (JP); Yu Takabatake, Osaka (JP); Hideki Yamakawa, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 225 days.

(21) Appl. No.: 16/167,556

(22) Filed: Oct. 23, 2018

(65) Prior Publication Data

US 2019/0190227 A1 Jun. 20, 2019

(30) Foreign Application Priority Data

Dec. 14, 2017 (JP) .............................. JP2017-239907

(51) Int. Cl.
*H01S 3/11* (2006.01)
*B23K 26/36* (2014.01)
(Continued)

(52) U.S. Cl.
CPC .............. *H01S 3/11* (2013.01); *B23K 26/032* (2013.01); *B23K 26/042* (2015.10);
(Continued)

(58) Field of Classification Search
CPC .. H01S 3/109; H01S 3/11; H01S 3/1124–125; B23K 26/064–0652
See application file for complete search history.

(56) References Cited

U.S. PATENT DOCUMENTS 9,608,397 B2    3/2017  Sato
2005/0068998 A1*  3/2005  Katsura ................... H01S 3/109
                                                    372/21
(Continued)

FOREIGN PATENT DOCUMENTS

JP        2007-273558 A    10/2007
JP        2008-242184 A    10/2008
(Continued)

OTHER PUBLICATIONS

U.S. Appl. No. 16/167,557, filed Oct. 23, 2018 (206 pages).
U.S. Appl. No. 16/167,559, filed Oct. 23, 2018 (189 pages).

*Primary Examiner* — Erin E McGrath
(74) *Attorney, Agent, or Firm* — Kilyk & Bowersox, P.L.L.C.

(57) ABSTRACT

To prevent an output decrease of laser light due to impurities formed in a Q switch. A laser machining device includes a Q-switch housing section configured by housing a Q switch and a first mirror and a wavelength converting section including a housing in which a transmission window section capable of transmitting a fundamental wave is formed, the wavelength converting section being configured by air-tightly housing, with an internal space surrounded by the housing, at least a first wavelength conversion element, a second wavelength conversion element, and a second mirror. A resonator forming a resonant optical path passing through the transmission window section is configured by the first mirror in the Q-switch housing section and the second mirror in the wavelength converting section.

10 Claims, 39 Drawing Sheets

(51) Int. Cl.
| | |
|---|---|
| B23K 26/082 | (2014.01) |
| G02B 26/10 | (2006.01) |
| H01S 3/0941 | (2006.01) |
| H01S 3/109 | (2006.01) |
| H01S 3/04 | (2006.01) |
| H01S 3/00 | (2006.01) |
| H01S 3/16 | (2006.01) |
| H01S 3/042 | (2006.01) |
| H01S 3/08 | (2006.01) |
| H01S 3/091 | (2006.01) |
| H01S 3/06 | (2006.01) |
| B23K 26/352 | (2014.01) |
| H01S 3/02 | (2006.01) |
| B23K 26/042 | (2014.01) |
| B23K 26/064 | (2014.01) |
| B23K 26/06 | (2014.01) |
| B23K 26/03 | (2006.01) |
| H01S 3/102 | (2006.01) |
| B23K 26/0622 | (2014.01) |
| B23K 26/38 | (2014.01) |
| B23K 26/046 | (2014.01) |
| H01S 3/10 | (2006.01) |
| H01S 3/081 | (2006.01) |
| H01S 3/23 | (2006.01) |

(52) U.S. Cl.
CPC .......... *B23K 26/046* (2013.01); *B23K 26/064* (2015.10); *B23K 26/0622* (2015.10); *B23K 26/0648* (2013.01); *B23K 26/0665* (2013.01); *B23K 26/082* (2015.10); *B23K 26/355* (2018.08); *B23K 26/36* (2013.01); *B23K 26/38* (2013.01); *G02B 26/101* (2013.01); *G02B 26/105* (2013.01); *H01S 3/0071* (2013.01); *H01S 3/025* (2013.01); *H01S 3/027* (2013.01); *H01S 3/042* (2013.01); *H01S 3/0405* (2013.01); *H01S 3/061* (2013.01); *H01S 3/08013* (2013.01); *H01S 3/0912* (2013.01); *H01S 3/0941* (2013.01); *H01S 3/109* (2013.01); *H01S 3/1022* (2013.01); *H01S 3/1611* (2013.01); *H01S 3/1673* (2013.01); *H01S 3/0401* (2013.01); *H01S 3/0815* (2013.01); *H01S 3/09415* (2013.01); *H01S 3/10069* (2013.01); *H01S 3/2391* (2013.01)

(56) References Cited

U.S. PATENT DOCUMENTS

2015/0194784 A1\* 7/2015 Kwon .................. H01S 3/0407 372/22
2018/0275487 A1\* 9/2018 Bhandari .................. G02F 1/37

FOREIGN PATENT DOCUMENTS

| JP | 2010-251448 A | 11/2010 | |
|---|---|---|---|
| JP | 2014-149315 A | 8/2014 | |
| WO | WO2017060967 A1 \* | 4/2017 | ............... G02F 1/37 |

\* cited by examiner

CONTAMINATION ADHESION EXAMPLE

LASER MACHINING DEVICE AND LASER OSCILLATOR

CROSS-REFERENCE TO RELATED APPLICATIONS

The present application claims foreign priority based on Japanese Patent Application No. 2017-239907, filed Dec. 14, 2017, the contents of which is incorporated herein by reference.

BACKGROUND OF THE INVENTION

1. Field of the Invention

The technique disclosed herein relates to a laser machining device that performs machining by irradiating laser light on a workpiece such as a laser marking device and a laser oscillator of the laser machining device.

2. Description of Related Art

There has been known a laser machining device capable of pulse-oscillating laser light with a Q switch.

For example, JP-A-2007-273558 (Patent Literature 1) discloses, as an example of a device capable of performing pulsed oscillation, a device in which a laser medium (a solid-state laser element) for generating a fundamental wave, a Q switch for pulse-oscillating of the fundamental wave, and a wavelength conversion element (a nonlinear crystal) for generating harmonics from the fundamental wave are disposed between a pair of mirrors (resonator mirrors) configuring a resonator.

When the Q switch is switched to an OFF state in the device according to Patent Literature 1, oscillation of laser light is stopped and formation of an inverted distribution is promoted in the laser medium (so-called optical pumping).

On the other hand, when the Q switch is switched from the OFF state to an ON state in this device, a Q value of the resonator instantaneously increases. Therefore, it is possible to pulse-oscillate high-output laser light.

Incidentally, in a general laser machining device, from the viewpoint of prevention of an output decrease of laser light, it is requested to prevent impurities from adhering to various kinds of optical components.

For example, if impurities floating in the air adhere to a wavelength conversion element, conversion efficiency by the element is deteriorated. An output decrease of laser light could be caused. If impurities adhere to an optical component for reflecting the laser light such as a mirror configuring the resonator, a transmission loss and a reflection loss of the laser light occur. As a result, an output decrease is likely to be caused.

To prevent adhesion of such impurities, it is desirable to configure the laser machining device to prevent formation of impurities in the first place. However, the inventors noticed that, when the configuration including the Q switch described in Patent Literature 1 is adopted, the Q switch could be a source of formation of impurities.

That is, in a general Q switch, electric components for performing electric control such as a circuit board made of resin and a wire connected to the circuit board are provided. However, when the resin and an adhesive forming the circuit board and the wire vaporize with heat or the like, the resin and the adhesive could emit impurities to the air.

SUMMARY OF THE INVENTION

A technique disclosed herein has been devised in view of such a point, and an object of the technique is to prevent an output decrease of laser light due to impurities that could be formed in a Q switch.

A first aspect of the present disclosure relates to a laser machining device including: an excitation-light generating section configured to generate excitation light; a laser-light output section configured to generate laser light on the basis of the excitation light generated by the excitation-light generating section and emit the laser light; a laser-light scanning section configured to irradiate the laser light emitted from the laser-light output section on a workpiece and scan the laser light on a surface of the workpiece; and a control section configured to perform machining of the workpiece by controlling the excitation-light generating section, the laser-light output section, and the laser-light scanning section.

In the laser machining device according to the first aspect of the present disclosure, the laser-light output section includes: a laser medium configured to generate a fundamental wave on the basis of the excitation light generated by the excitation-light generating section; a Q switch configured to pulse-oscillate the fundamental wave generated by the laser medium on the basis of a control signal input from the control section; a first mirror for reflecting the fundamental wave generated by the laser medium; a Q-switch housing section including an incident section on which the excitation light generated by the excitation-light generating section can be made incident and configured by housing at least the Q switch and the first mirror; a first wavelength conversion element on which the fundamental wave generated by the laser medium is made incident, the first wavelength conversion element generating a second harmonic having a frequency higher than a frequency of the fundamental wave; a second wavelength conversion element on which the second harmonic generated by the first wavelength conversion element is made incident, the second wavelength conversion element generating a third harmonic having a frequency higher than the frequency of the second harmonic; a second mirror for reflecting at least one of the second harmonic and the third harmonic; and a wavelength converting section including a housing in which a transmission window section capable of transmitting the fundamental wave generated by the laser medium and an output window section capable of emitting the third harmonic generated by the second wavelength conversion element as laser light are formed, the wavelength converting section being configured by airtightly housing, with an internal space surrounded by the housing, at least the first wavelength conversion element, the second wavelength conversion element, and the second mirror. The laser medium is housed in one of the Q-switch housing section and the wavelength converting section. A resonator forming a resonant optical path passing through the transmission window section is configured by the first mirror in the Q-switch housing section and the second mirror in the wavelength converting section.

With this configuration, the wavelength converting section configured by housing the first and second wavelength conversion elements is provided separately from the Q-switch housing section configured by housing the Q switch. The resonator for amplifying the laser light is configured by the first mirror housed in the Q-switch housing section and the second mirror housed in the wavelength converting section. The wavelength converting section includes an internal space independent from the Q-switch housing section and can airtightly seal the first and second wavelength conversion elements. Therefore, even if impurities formed in the Q switch are emitted to the air, the impurities can be prevented from adhering to the first and second wavelength conversion elements. Consequently, an output decrease of the laser light can be prevented.

In a laser machining device according to a second aspect of the present disclosure, the laser machining device may include an element-temperature adjusting section for adjusting temperatures of the first and second wavelength conversion elements, the element-temperature adjusting section being disposed on an outside of the housing.

With this configuration, by disposing the element-temperature adjusting section on the outside of the housing, even if impurities are formed on a circuit board connected to such an element-temperature adjusting section, the impurities can be prevented from adhering to the first and second wavelength conversion elements. This is advantageous in preventing an output decrease of the laser light.

In a laser machining device according to a third aspect of the present disclosure, the element-temperature adjusting section may include: a first temperature adjusting section configured to adjust the temperature of the first wavelength conversion element; and a second temperature adjusting section configured to adjust the temperature of the second wavelength conversion element. The first temperature adjusting section and the second temperature adjusting section may be configured to be controlled independently from each other.

In a laser machining device according to a fourth aspect of the present disclosure, the laser medium may be housed in the Q-switch housing section. The Q-switch housing section may be configured by airtightly housing the laser medium, the Q switch, and the first mirror.

With this configuration, not only the wavelength converting section but also the Q-switch housing section airtightly houses various components. Therefore, it is possible to reduce possibility that impurities formed in the components flow to the outside of the Q-switch housing section and flow into the inside of the wavelength converting section. This is advantageous in preventing an output decrease of the laser light.

In a laser machining device according to a fifth aspect of the present disclosure, halfway in a resonant optical path formed by connecting the first mirror and the second mirror, an output mirror for separating laser light including at least the third harmonic from the resonant optical path may be disposed.

In a laser machining device according to a sixth aspect of the present disclosure, the output mirror may be airtightly housed by the housing.

A laser oscillator according to a seventh aspect of the present disclosure includes: a laser medium configured to generate a fundamental wave on the basis of an excitation light; a Q switch configured to control, on the basis of a control signal input from an outside, on and off of pulsed oscillation of the fundamental wave generated by the laser medium; a first mirror for reflecting the fundamental wave generated by the laser medium; a Q-switch housing section including an incident section on which the excitation light can be made incident and configured to house at least the Q switch and the first mirror; a first wavelength conversion element on which the fundamental wave generated by the laser medium is made incident, the first wavelength conversion element generating a second harmonic having a frequency higher than a frequency of the fundamental wave; a second wavelength conversion element on which the second harmonic generated by the first wavelength conversion element is made incident, the second wavelength conversion element generating a third harmonic having a frequency higher than the frequency of the second harmonic; a second mirror for reflecting at least the fundamental wave; and a wavelength converting section including a housing in which a transmission window section capable of transmitting the fundamental wave generated by the laser medium and an output window section capable of emitting the third harmonic generated by the second wavelength conversion element as laser light are formed, the wavelength converting section being configured by airtightly housing, with an internal space surrounded by the housing, at least the first wavelength conversion element, the second wavelength conversion element, and the second mirror.

The laser medium is housed in one of the Q-switch housing section and the wavelength converting section. A resonator forming a resonant optical path passing through the transmission window section is configured by the first mirror in the Q-switch housing section and the second mirror in the wavelength converting section.

With this configuration, the wavelength converting section configured by housing the first and second wavelength conversion elements is provided separately from the Q-switch housing section configured by housing the Q switch. The resonator for amplifying the laser light is configured by the first mirror housed in the Q-switch housing section and the second mirror housed in the wavelength converting section. The wavelength converting section includes an internal space independent from the Q-switch housing section and can airtightly seal the first and second wavelength conversion elements. Therefore, even if impurities formed in the Q switch are emitted to the air, the impurities can be prevented from adhering to the first and second wavelength conversion elements. Consequently, an output decrease of the laser light can be prevented.

As explained above, with the laser machining device and the laser oscillator, it is possible to prevent an output decrease of the laser light due to impurities that could be formed in the Q switch.

DESCRIPTION OF EMBODIMENTS

An embodiment of the present disclosure is explained below with reference to the drawings. Note that the following explanation is an illustration.

That is, in this specification, a laser marker is explained as an example of a laser machining device. A technique disclosed herein can be used in a laser applied device in general irrespective of the name of the laser machining device.

In this specification, printing is explained as a representative example of machining. However, the machining is not limited to the printing and can be used in all kinds of machining in which laser light is used.

Overall Configuration of a Laser Machining Device L

Figure 1:
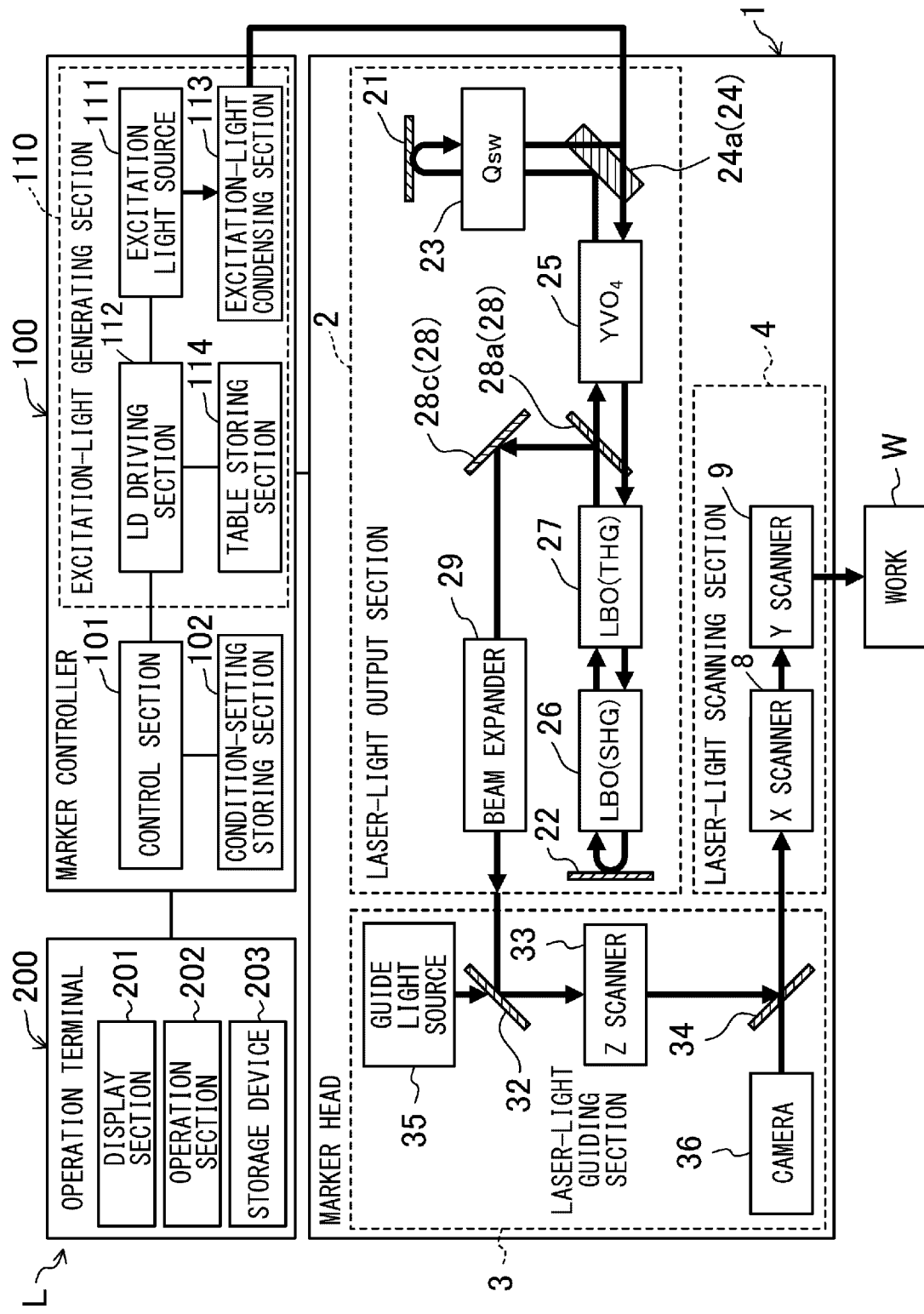
FIG. 1 is a block diagram illustrating a schematic configuration of a laser machining device.

FIG. 1 is a block diagram illustrating a schematic configuration of a laser machining device L. The laser machining device L shown in FIG. 1 performs machining by irradiating laser light emitted from a marker head 1 on work W serving as a workpiece and performing three-dimensional scanning on the surface of the work W.

In particular, the laser machining device L disclosed herein is configured to be capable of pulse-oscillating UV laser light.

As shown in FIG. 1, the laser machining device L can be configured by a marker controller 100 for controlling various devices and the marker head 1 for emitting laser light. One of the marker controller 100 and the marker head 1 can be incorporated in and integrated with the other.

The marker controller 100 and the marker head 1 are separated in this embodiment and electrically connected via an electric wire and optically coupled via an optical fiber cable. When the marker controller 100 and the marker head 1 are integrated, the marker controller 100 and the marker head 1 can be coupled via a space even if the marker controller 100 and the marker head 1 are not coupled via the optical fiber cable.

An operation terminal (a setting section) 200 for setting various machining conditions such as print setting can be connected to the marker controller 100. The operation terminal 200 includes a display section 201 for displaying information to a user such as a liquid crystal display, an operation section 202 configured to receive an operation input by the user such as a keyboard and a mouse, and a storage device 203 for storing information such as a HDD. The operation terminal 200 can be incorporated in and integrated with, for example, the marker controller 100. In this case, a name such as a control unit can be used rather than "operation terminal". However, the operation terminal 200 and the marker controller 100 are separated from each other at least in this embodiment.

When the operation terminal 200 according to this embodiment is used, by performing operation input via the operation section 202, the user can determine content of printing (a marking pattern) and set machining conditions for performing desired machining on the work W such as an output (a target output) required for laser light, scanning speed (scan speed) of the laser light, and the number of times pulsed oscillation is performed per one second (a pulse frequency). The machining conditions set in this way are output to the marker controller 100 and stored in a condition-setting storing section 102 of the marker controller 100. The storage device 203 of the operation terminal 200 may save the machining conditions according to necessity.

The machining conditions set in this way are output to the marker controller 100 and stored in the condition-setting storing section 102 of the marker controller 100.

Besides the apparatuses and the devices described above, a device for performing operation and control, a computer for performing other various kinds of processing, a storage device, peripheral apparatuses, and the like can also be connected to the laser machining device L. Examples of the connection in this case include serial connection such as IEEE1394, RS-232x, RS-422, and USB, parallel connection, and methods of electrically, magnetically, and optically connecting the devices via a network such as 10BASE-T, 100BASE-TX, and 1000BASE-T. Besides the wired connection, the connection may be, for example, a wireless LAN such as IEEE802.x and wireless connection using a radio wave, an infrared ray, optical communication, and the like such as Bluetooth (registered trademark). Further, as a storage medium used in a storage device for performing exchange of data, saving of various kinds of setting, and the like, for example, various memory cards, a magnetic disk, a magneto-optical disk, a semiconductor memory, and a hard disk can be used.

The laser machining device L can be configured as a laser machining system obtained by combining the marker controller 100, the marker head 1, and the operation terminal 200 and various units, devices, and apparatuses other than the marker controller 100, the marker head 1, and the operation terminal 200.

In the following explanation, respective hardware configurations of the marker controller 100 and the marker head 1 are explained in detail. Thereafter, components related to control of the marker head 1 by the marker controller 100 are explained.

Marker Controller 100

The marker controller 100 includes the condition-setting storing section 102 for storing machining conditions, a control section 101 for controlling the marker head 1 on the basis of the machining conditions, and an excitation-light generating section 110 for generating laser excitation light (excitation light).

Condition-Setting Storing Section 102

The condition-setting storing section 102 stores machining conditions set via the operation terminal 200 and outputs the stored machining conditions to the control section 101 according to necessity.

Specifically, the condition-setting storing section 102 is configured using a volatile memory, a nonvolatile memory, a HDD, or the like. The condition-setting storing section 102 can temporarily or continuously store information indicating machining conditions. In particular, when the operation terminal 200 is incorporated in the marker controller 100, the storage device 203 can be configured to be used as the condition-setting storing section 102 as well.

Control Section 101

The control section 101 is configured to perform machining of the work W by controlling the sections configuring the marker head 1 such as the excitation-light generating section 110 of the marker controller 100, the laser-light output section 2, a laser-light guiding section 3, and a laser-light scanning section 4 on the basis of the machining conditions stored in the condition-setting storing section 102.

Specifically, the control section 101 includes a processor, a memory, and an input/output bus. The control section 101 controls the machining of the work W by generating a control signal on the basis of a signal indicating information input via the operation terminal 200 and a signal indicating the machining conditions read from the condition-setting storing section 102 and outputting the generated control signal to the sections of the laser machining device L.

For example, when starting the machining of the work W, the control section 101 reads a target output stored in the condition-setting storing section 102, outputs a control signal generated concerning the target output to an excitation-light-source driving section 112, and controls generation of laser excitation light.

Although not shown in FIG. 1, the control section 101 outputs a control signal generated on the basis of a pulse frequency stored in the condition-setting storing section 102 and a predetermined duty ratio to a Q switch 23 explained below and controls pulsed oscillation of UV laser light.

Excitation-Light Generating Section 110

The excitation-light generating section 110 includes an excitation light source 111 configured to generate laser excitation light (excitation light) corresponding to a driving current, the excitation-light-source driving section (in FIG. 1, described as "LD driving section") 112 configured to supply a driving current to the excitation light source 111, an excitation-light condensing section 113 optically joined to the excitation light source 111, and a table storing section (a correspondence-relation storing section) 114 for determining a driving current that should be supplied to the excitation light source 111. The excitation light source 111 and the excitation-light condensing section 113 are fixed in a not-shown excitation casing and optically coupled. Although details are omitted, the excitation casing is formed of meal such as copper excellent in thermal conductivity and can efficiently radiate heat of the excitation light source 111.

The excitation-light generating section 110 also includes the table storing section 114 (the correspondence-relation storing section) configured to store a correspondence relation between a target output of UV laser light set as one of the machining conditions and driving power that should be supplied to the excitation light source 111. In this embodiment, the table storing section 114 is connected to the excitation-light-source driving section 112 to transmit and receive electric signals to and from the excitation-light-source driving section 112. However, the table storing section 114 may be configured to transmit and receive signals to and from the control section 101.

The sections of the excitation-light generating section 110 are explained below in order.

The excitation-light-source driving section 112 supplies a driving current to the excitation light source 111 on the basis of a control signal output from the control section 101. Although a detailed flow is explained below, the excitation-light-source driving section 112 determines a driving current that should be supplied to the excitation-light generating section 110 by using the target output determined by the control section 101 and the correspondence relation stored in the table storing section 114. The excitation-light-source driving section 112 supplies the driving current determined in that way to the excitation light source 111. When the table storing section 114 is connected to the control section 101, instead of the excitation-light-source driving section 112, the control section 101 may perform the processing for determining a driving current.

The driving current is supplied to the excitation light source 111 from the excitation-light-source driving section 112. The excitation light source 111 is configured to generate excitation light corresponding to the driving current. An output of the excitation light generated by the excitation light source 111 increases as the driving current increases. Specifically, the excitation light source 111 is configured by a laser diode (LD) or the like. An LD array or an LD bar in which a plurality of LD elements are linearly disposed can be used as the excitation light source 111. When the LD array or the LD bar is used as the excitation light source 111, laser oscillation from the elements is linearly output and made incident on the excitation-light condensing section 113.

The excitation-light condensing section 113 is configured to condense a laser output from the excitation light source 111 and output the laser as laser excitation light (excitation light). Specifically, the excitation-light condensing section 113 can be configured by a focusing lens or the like. The excitation-light condensing section 113 includes an incident surface on which laser oscillation is made incident and an emission surface from which the laser excitation light is output. The excitation-light condensing section 113 is optically coupled to the marker head 1 via the optical fiber cable explained above. Therefore, the laser excitation light output from the excitation-light condensing section 113 is guided to the marker head 1 through the optical fiber cable.

The table storing section 114 is configured to store a correspondence relation between a target output set as one of the machining conditions and a driving current that should be supplied to the excitation light source 111. Specifically, in the table storing section 114, a current table storing the correspondence relation between the target output and the driving current is stored. The excitation-light-source driving section 112 is configured to read the driving current corresponding to the target output to determine a driving current supplied to the excitation light source 111.

Instead of the table storing section 114, a calculation-formula storing section configured to store a calculation formula for calculating a driving current using the target output as an argument may be provided. Both of the calculation-formula storing section and the table storing section 114 illustrate the correspondence-relation storing section in terms of storing the correspondence relation between the target output and the driving current.

The excitation-light generating section 110 can be configured as an LD unit or an LD module in which members such as the excitation-light-source driving section 112, the excitation light source 111, the excitation-light condensing section 113, and the table storing section 114 are incorporated in advance. The excitation light emitted from the excitation-light generating section 110 (specifically, the laser excitation light output from the excitation-light condensing section 113) can be formed as unpolarized light. Consequently, it is unnecessary to consider a change in a polarization state. This is advantageous in design. In particular, concerning the configuration around the excitation light source 111, a mechanism for forming output light as unpolarized light is desirably included in an LD unit itself that bundles, with an optical fiber cable, lights respectively obtained from an LD array, in which several ten LD elements are arrayed, and outputs the lights.

Marker Head 1

As explained above, the laser excitation light generated by the excitation-light generating section 110 is guided to the marker head 1 through the optical fiber cable. The marker head 1 includes the laser-light output section 2 configured to generate UV laser light on the basis of the laser excitation light and output the UV laser light, the laser-light scanning section 4 configured to irradiate the UV laser light output from the laser-light output section 2 on the surface of the work W and perform two-dimensional scanning, and the laser-light guiding section 3 configured to form an optical path leading from the laser-light output section 2 to the laser-light scanning section 4.

Figure 2:
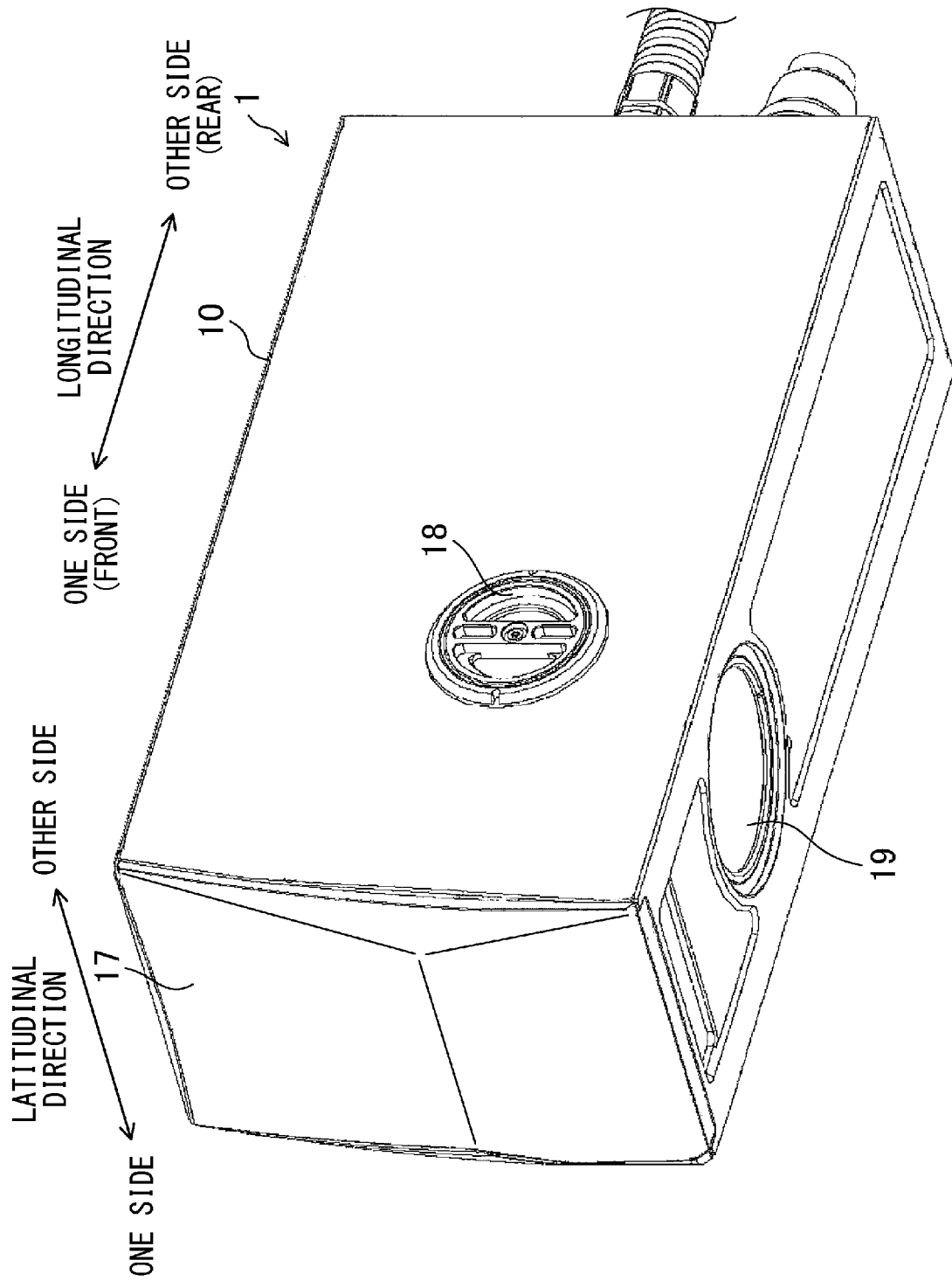
FIG. 2 is a perspective view illustrating the exterior of a marker head.
Figure 3:
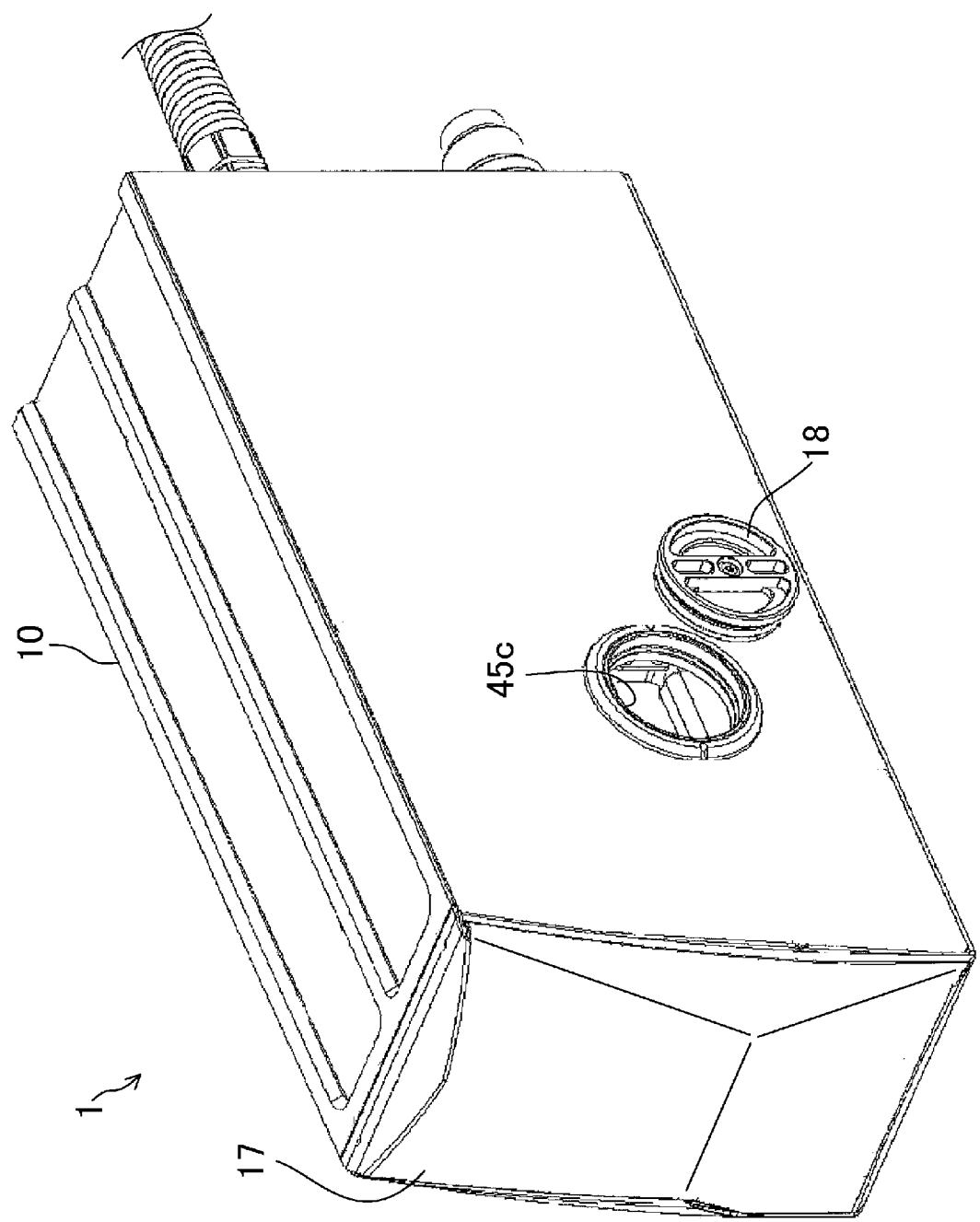
FIG. 3 is a perspective view illustrating the exterior of the marker head.

FIGS. 2 and 3 are perspective views illustrating the exterior of the marker head 1. As shown in FIGS. 2 and 3, the marker head 1 includes a housing 10 for fixing the laser-light output section 2, the laser-light guiding section 3, the laser-light scanning section 4, and the like. The housing 10 has a substantially rectangular parallelepiped exterior shown in FIGS. 2 and 3. A replacement lid section 18 for replacing a drying agent Dm explained below is detachably attached to one side surface in the latitudinal direction of the housing 10. On the other hand, as shown in FIG. 2, an emission window section 19 for emitting UV laser light from the marker head 1 is provided on the lower surface of the housing 10. The configurations of the replacement lid section 18 and the emission window section 19 are explained below.

Figure 4:
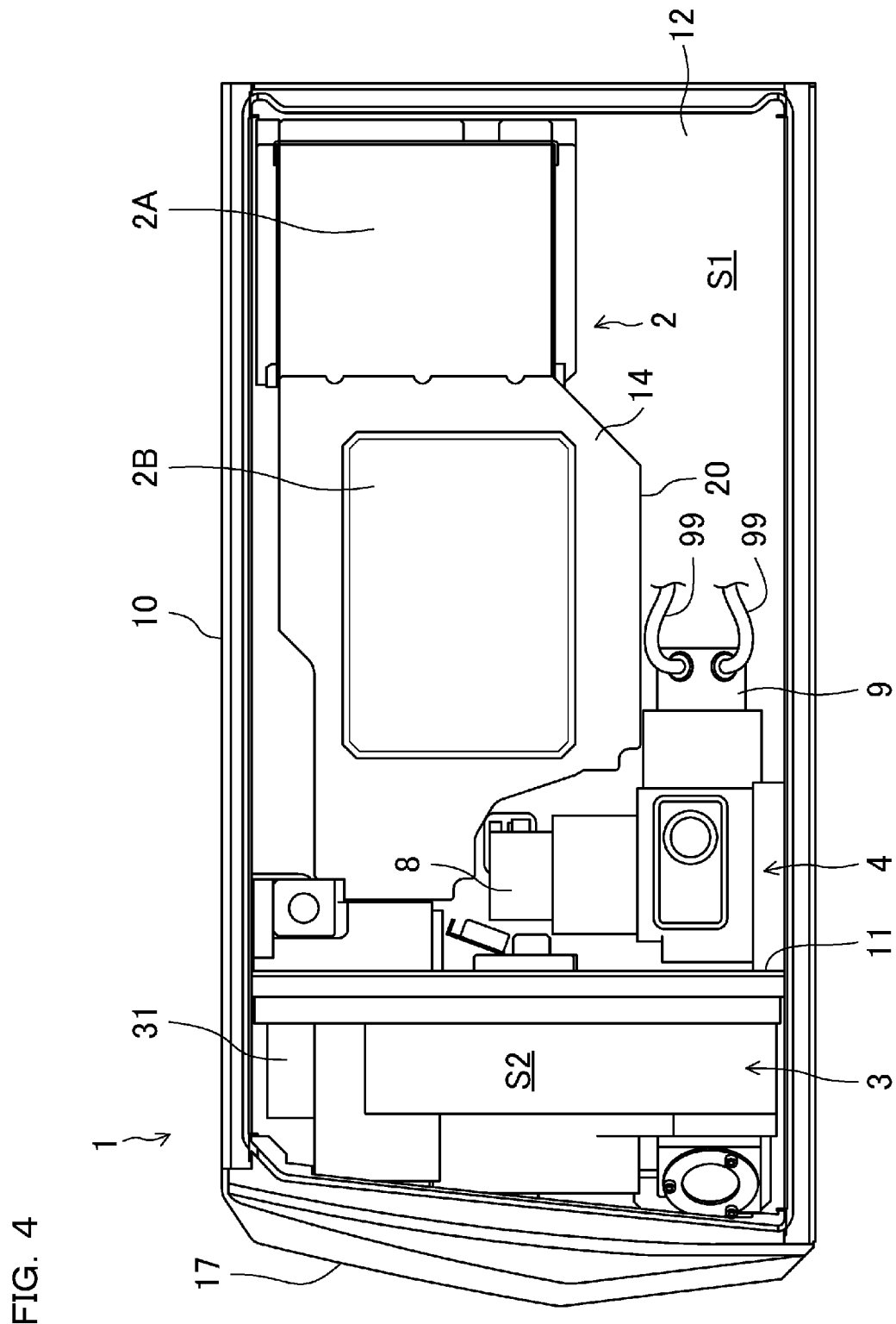
FIG. 4 is a diagram illustrating the internal structure of the marker head.

FIG. 4 is a diagram showing the internal structure of the marker head 1. A partitioning section 11 shown in FIG. 4 is provided on the inside of the housing 10 (see FIGS. 21 and 29 as well). The internal space of the housing 10 is partitioned into one side and the other side in the longitudinal direction by the partitioning section 11.

In the following explanation, "the longitudinal direction of the housing 10" indicates the paper surface left-right direction of FIG. 4. The paper surface left side of FIG. 4 is referred to as "longitudinal direction one side". On the other hand, the paper surface right side of FIG. 4 is referred to as "longitudinal direction other side". Similarly, "the latitudinal direction of the housing 10" indicates a direction perpendicular to the paper surface of FIG. 4. The paper surface near side of FIG. 4 is referred to as "latitudinal direction one side". On the other hand, the paper surface depth side of the figure is referred to as "latitudinal direction other side".

In the following explanation, "the longitudinal direction (the latitudinal direction) of the housing 10" is sometimes simply referred to as "longitudinal direction (latitudinal direction)". As shown in FIG. 2, in the other figures, directions corresponding to these directions are sometimes referred to as "longitudinal direction" or "latitudinal direction".

In the following explanation, "up-down direction" is equal to the paper surface up-down direction of FIG. 4. In the other figures, a direction corresponding to this direction is sometimes referred to as "up-down direction".

Specifically, the partitioning section 11 is formed in a flat shape extending in a direction perpendicular to the longitudinal direction of the housing 10. In the longitudinal direction of the housing 10, the partitioning section 11 is disposed closer to one side (the paper surface left side of FIG. 4) than the center in the direction. Therefore, a space partitioned on one side in the longitudinal direction of the housing 10 has a shorter dimension in the longitudinal direction than a space partitioned on the other side because the partitioning section 11 is disposed closer to the one side. In the following explanation, the latter space is referred to as first space S1. On the other hand, the former space is referred to as second space S2.

In this embodiment, the laser-light output section 2 and the laser-light scanning section 4 are fixed on the inside of the first space S1. On the other hand, the laser-light guiding section 3 is fixed on the inside of the second space S2.

In detail, the first space S1 is partitioned into one side and the other side in the latitudinal direction by a substantially flat base plate 12. Components of the laser-light output section 2 can be mainly disposed in a space on one side in the latitudinal direction with respect to the base plate 12.

More in detail, in this embodiment, among components configuring the laser-light output section 2, optical components required to be airtightly sealed as much as possible such as a concave lens 28b and an optical crystal forming a wavelength conversion element are housed in a sealed state in a housing space surrounded by the partitioning section 11, the base plate 12, and the like (specifically, an internal space of a wavelength converting section 2B). On the other hand, components not always be required to be sealed such as an electric wire and a heat sink (not shown in FIG. 4) are disposed on the other side in the latitudinal direction across the base plate 12.

Figure 21:
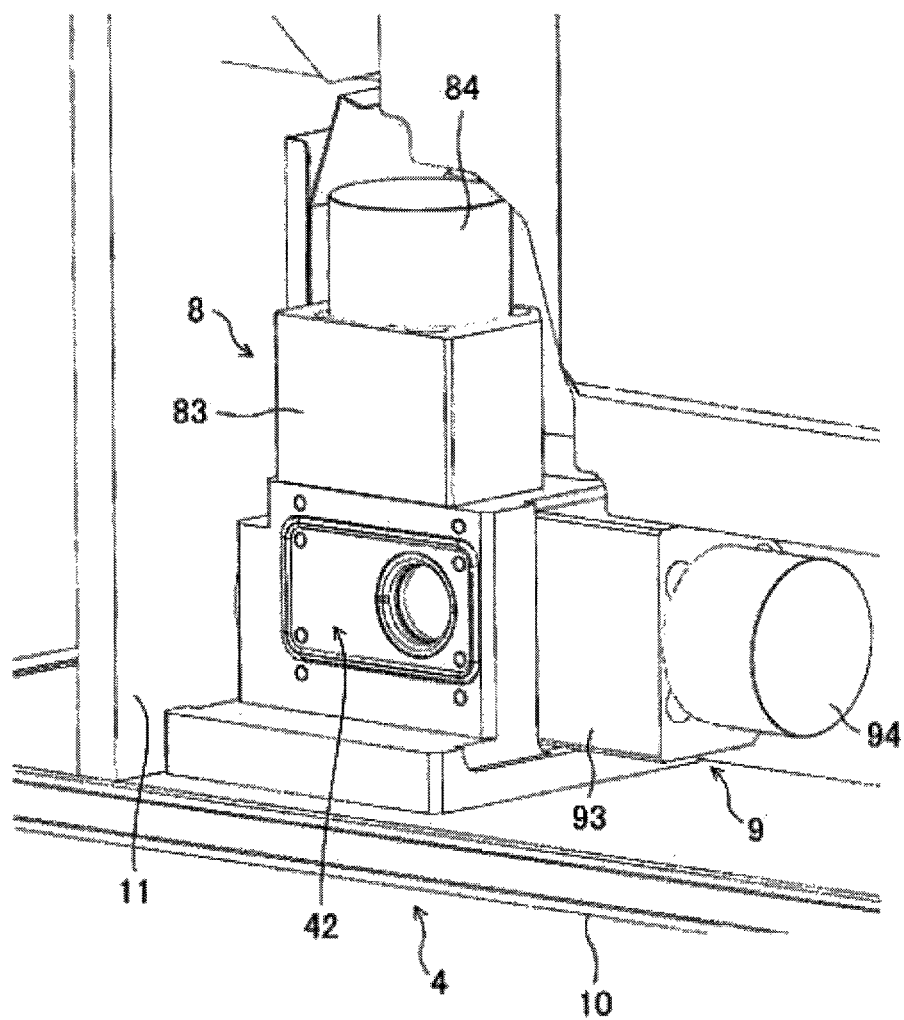
FIG. 21 is a perspective view illustrating the exterior of a laser-light scanning section.

As shown in FIG. 4, the laser-light scanning section 4 can be disposed on one side in the latitudinal direction like the optical components configuring the laser-light output section 2 (see FIG. 21 as well). Specifically, the laser-light scanning section 4 according to this embodiment is adjacent to the partitioning section 11 in the longitudinal direction and is disposed on the inner bottom surface of the housing 10 in the up-down direction.

As explained above, the laser-light guiding section 3 is disposed in the second space S2. In this embodiment, among components configuring the laser-light guiding section 3, optical components required to be sealed such as a first bend mirror 32 are airtightly housed by a Z chamber Sz surrounded by the partitioning section 11 and a Z chamber cover 31. On the other hand, components not always required to be sealed such as a guide light source 35 and a camera 36 are disposed on the outside of the Z chamber Sz.

The optical fiber cable explained above is connected to the rear surface of the housing 10. The optical fiber cable is connected to the laser-light output section 2 disposed in the first space S1.

In the following explanation, the configurations of the laser-light output section 2, the laser-light guiding section 3, and the laser-light scanning section 4 are explained in order.

Laser-Light Output Section 2

The laser-light output section 2 is configured to generate UV laser light on the basis of laser excitation light generated by the excitation-light generating section 110 and emit the UV laser light to the laser-light guiding section 3.

Figure 5:
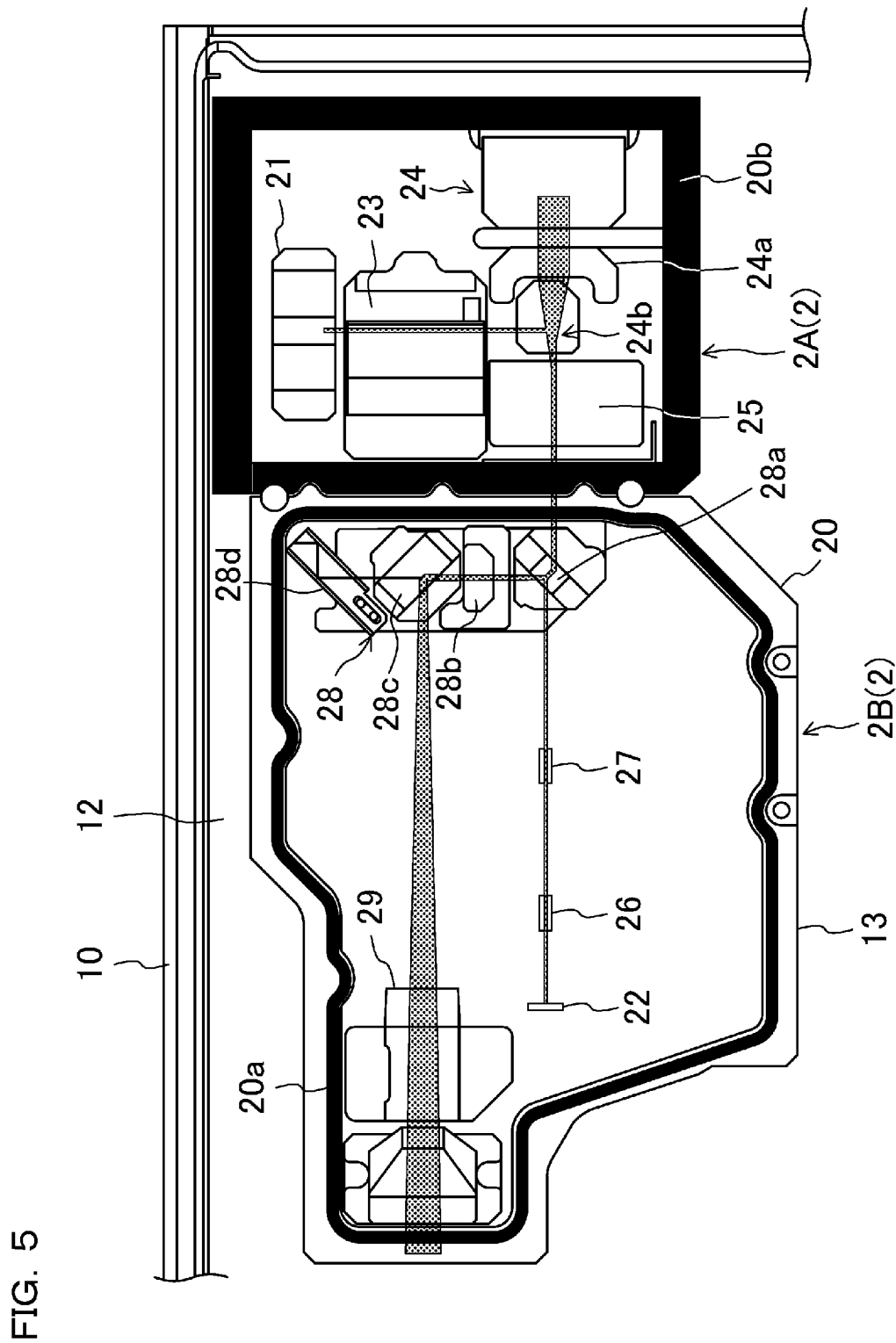
FIG. 5 is a diagram illustrating the configuration of a laser-light output section.
Figure 6:
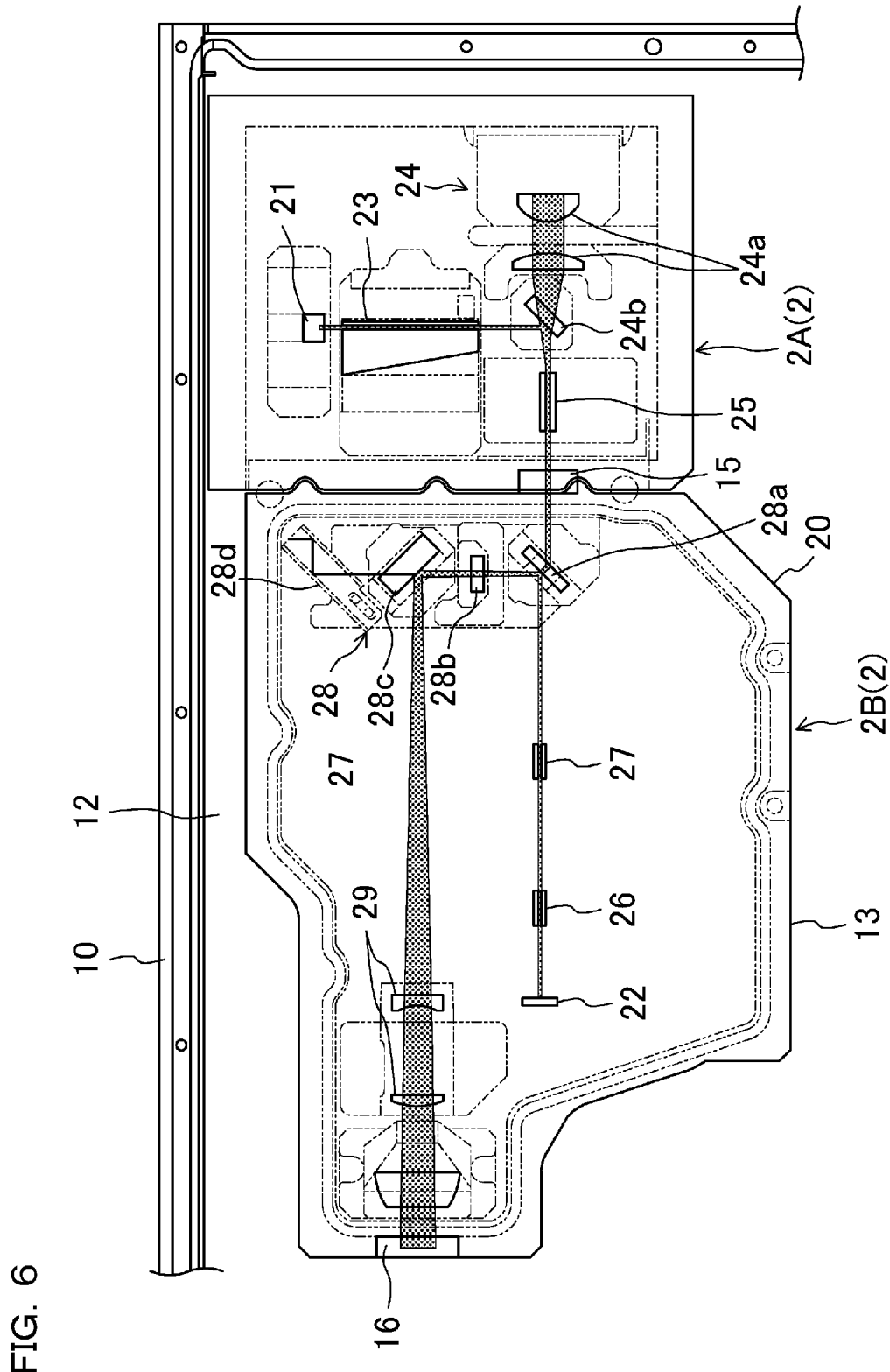
FIG. 6 is a diagram illustrating a layout of optical components in the laser-light output section.

FIG. 5 is a diagram illustrating the configuration of the laser-light output section 2. FIG. 6 is a diagram illustrating a layout of the optical components in the laser-light output section 2. As shown in FIGS. 5 and 6, the laser-light output section 2 according to this embodiment mainly includes a Q-switch housing section 2A capable of pulse-oscillating a fundamental wave generated on the basis of laser excitation light and a wavelength converting section 2B for wavelength-converting the fundamental wave output from the Q-switch housing section 2A.

A resonator used for amplification of laser light can be configured by a first reflection mirror (a first mirror, a reflection mirror) 21 housed in the Q-switch housing section 2A and a second reflection mirror (a second mirror, a reflection mirror) 22 housed in the wavelength converting section 2B. That is, in this embodiment, a resonant optical path for amplifying laser light is configured to extend from the Q-switch housing section 2A to the wavelength converting section 2B.

Both of the Q-switch housing section 2A and the wavelength converting section 2B are surrounded by the base plate 12, a sidewall section 13 erected on the base plate 12, and a lid section 14 configured to close a space surrounded by the base plate 12 and the sidewall section 13. In this embodiment, in the lid section 14, a portion covering the Q-switch housing section 2A and a portion covering the wavelength converting section 2B are separately configured. However, both the portions may be integrally configured.

Specifically, the base plate 12 configures a supporting surface for attaching various components explained below. The sidewall section 13 is erected perpendicularly to the base plate 12 and formed to surround, from a side, the components attached to the base plate 12. In particular, the sidewall section 13 shown in FIG. 5 is formed in a shape for separating components housed in the Q-switch housing section 2A and components housed in the wavelength converting section 2B from each other. That is, as shown in FIG. 5, the Q-switch housing section 2A is partitioned on the other side in the longitudinal direction (the paper surface right side of FIG. 5). On the other hand, the wavelength converting section 2B is partitioned on one side in the longitudinal direction (the paper surface left side of FIG. 5). A part erected in substantially the center in the longitudinal direction in the sidewall section 13 extends along substantially the up-down direction and is shared by the Q-switch housing section 2A and the wavelength converting section 2B.

In this embodiment, as shown in FIG. 5, a space opened toward one side in the latitudinal direction is partitioned by the base plate 12 and the sidewall section 13. The space can be closed by the lid section 14 (see FIG. 4). The lid section 14 seals at least the wavelength converting section 2B. In an example shown in FIGS. 4 to 6, the wavelength converting section 2B and the Q-switch housing section 2A are respectively sealed by separate members.

To seal the wavelength converting section 2B, in the embodiment shown in FIG. 5, a seal member 20a formed of resin or the like is provided at an opening edge of a space surrounded by the base plate 12 and the sidewall section 13. The seal member 20a is capable of being sandwiched by the sidewall section 13 and the lid section 14. The internal space of a housing 20 can be sealed by closely attaching the lid section 14 to the seal member 20a. A seal member 20b for sealing is also provided at the opening edge of the Q-switch housing section 2A.

The Q-switch housing section 2A includes an incident section 24 on which excitation light generated by the excitation-light generating section 110 can be made incident. The Q-switch housing section 2A can house at least the Q switch 23 and the first reflection mirror 21.

Specifically, the Q-switch housing section 2A according to this embodiment is configured by airtightly housing the incident section 24 on which laser excitation light generated by the excitation-light generating section 110 can be made incident, a laser medium 25 configured to generate a fundamental wave on the basis of the laser excitation light, the Q switch 23 configured to pulse-oscillate, on the basis of a control signal input from the marker controller 100, the fundamental wave generated by the laser medium 25, and the first reflection mirror 21 for reflecting the fundamental wave generated by the laser medium 25. Among these components, at least the laser medium 25 only has to be housed in one of the Q-switch housing section 2A and the wavelength converting section 2B.

The wavelength converting section 2B includes the housing in which a transmission window section 15 capable of transmitting the fundamental wave generated by the laser medium 25 and an output window section 16 capable of emitting UV laser light generated in the wavelength converting section 2B are formed. The wavelength converting section 2B is configured by airtightly housing, with an internal space surrounded by the housing 20, at least a first wavelength converting section (a first wavelength conversion element) 26 on which the fundamental wave generated by the laser medium 25 is made incident, the first wavelength converting section 26 generating a second harmonic having a wavelength larger than a wavelength of the fundamental wave, a second wavelength converting section (a second wavelength conversion element) 27 configured to generate a third harmonic having a wavelength larger than the wavelength of the second harmonic, and a second reflection mirror 22 for reflecting at least one of the second harmonic and the third harmonic.

Specifically, in the embodiment shown in FIGS. 4 to 6, the housing 20 is configured by the base plate 12, the sidewall section 13, and the lid section 14 explained above. Both of the transmission window section 15 and the output window section 16 are provided in the sidewall section 13.

As explained above, the Q-switch housing section 2A and the wavelength converting section 2B are separated by the sidewall section 13. Therefore, by providing the transmission window section 15 in the sidewall section 13, the resonator configured by the first reflection mirror 21 in the Q-switch housing section 2A and the second reflection mirror 22 in the wavelength converting section 2B forms a resonant optical path passing through the transmission window section 15.

The wavelength converting section 2B can also seal, with the internal space formed by such a housing 20, a laser-light separating section 28 for separating at least the third harmonic from the resonant optical path and a beam expander 29.

In particular, in an example shown in FIG. 6, the laser-light output section 2 is configured as a laser oscillator of a so-called intra-cavity type. That is, halfway in the resonant optical path leading from the first reflection mirror 21 to the second reflection mirror 22, the Q switch 23, a folding mirror 24b configuring the incident section 24, the laser medium 25, the transmission window section 15, a first separator 28a configuring the laser-light separating section 28, the second wavelength conversion element 27, and the first wavelength conversion element 26 are disposed in order.

The folding mirror 24b is disposed to join the optical axis of the excitation light generated by the excitation-light generating section 110 and the optical axis of the resonant optical path. The first separator 28a is disposed to separate laser light including at least the third harmonic from the resonant optical path connecting the first reflection mirror 21 and the second reflection mirror 22.

Components related to the laser-light output section 2 are explained below in order.

First Reflection Mirror 21

The first reflection mirror 21 is housed in the Q-switch housing section 2A and configured to reflect at least the fundamental wave. As explained above, the first reflection mirror 21 and the second reflection mirror 22 configure the resonator. In this embodiment, the first reflection mirror 21 is formed as a total reflection mirror that reflects the fundamental wave.

Second Reflection Mirror 22

The second reflection mirror 22 is housed in the wavelength converting section 2B and configured to reflect at least the fundamental wave. The second reflection mirror 22 and the first reflection mirror 21 configure the resonator. In this embodiment, the second reflection mirror 22 is formed as a total reflection mirror that reflects not only the fundamental wave but also the second harmonic and the third harmonic.

Q Switch 23

The Q switch 23 is housed in the Q-switch housing section 2A and configured to pulse-oscillate the fundamental wave generated by the laser medium 25. Specifically, the Q switch 23 is disposed to be located on the optical path of the resonant optical path and interposed between the laser medium 25 and the first reflection mirror 21. By using the Q switch 23, it is possible to change continuous oscillation to high-speed repeated pulsed oscillation having a high peak output value (a peak value). A Q-switch control circuit configured to generate an RF signal applied to the Q switch 23 is connected to the Q switch 23. The laser-light output section 2 amplifies, between the first reflection mirror 21 and the second reflection mirror 22, with multiple reflection, laser light formed by photons induced and emitted from the laser medium 25 and outputs the laser light through the laser-light separating section 28.

That is, if the Q switch 23 is switched to an ON state, the laser light made incident on the Q switch 23 is deflected and separated from the resonant optical path. In this case, as a result of restricting the multiple reflection of the laser light, generation of an inverted distribution is promoted in the laser medium 25 explained below.

When the Q switch 23 is switched from the ON state to an OFF state for a predetermined period, the laser light is amplified by the multiple reflection. In this case, high-output laser light pulse-oscillates.

By cyclically switching on and off of the Q switch 23 in this way, the high-speed repeated pulsed oscillation explained above can be performed. Examples of a control amount for controlling such pulsed oscillation include a duty ratio related to a ratio between a period in which the Q switch 23 is switched to the ON state (an ON time) and a period in which the Q switch 23 is switched to the OFF state (an OFF time). When the duty ratio is large, the period in which the Q switch 23 is switched to the ON state is longer than when the duty ratio is small. In this case, the generation of the inverted distribution is promoted and an output value of the pulsed oscillation (e.g., pulse energy of the laser light) increases. Examples of another control amount for controlling the pulsed oscillation include a Q switch frequency indicating a frequency that the Q switch repeats on and off. By increasing the Q switch frequency, the number of pulsed oscillations emitted per unit time increases.

Incident Section 24

An optical fiber cable extending from the excitation-light generating section 110 is connected to the incident section 24. That is, one end portion of the optical fiber cable is connected to the excitation-light collecting section 113. On the other hand, the other end portion is connected to the incident section housed in the Q-switch housing section 2A. The laser excitation light made incident from the incident section 24 reaches the laser medium 25.

In the example shown in FIGS. 5 and 6, a condensing section 24a and the folding mirror 24b are interposed between the incident section 24 and the laser medium 25. The condensing section 24a is configured by a set of two optical lenses. The condensing section 24a condenses the laser excitation light propagated through the optical fiber cable and made incident and guides the laser excitation light to the folding mirror 24b.

On the other hand, the folding mirror 24b is configured as a so-called half mirror. The folding mirror 24b transmits laser light (specifically, laser excitation light) propagated in a direction from the incident section 24 to the laser medium 25 through the condensing section 24a. On the other hand, the folding mirror 24b totally reflects laser light (specifically, a fundamental wave) propagated in the opposite direction of the direction. The laser light totally reflected by the folding mirror 24b reaches the first reflection mirror 21 passing through the Q switch 23 (specifically, the Q switch 23 switched to the OFF state) as explained below.

Laser Medium 25

The laser medium 25 is formed as a laser medium capable of forming an inverted distribution. The laser medium 25 is configured to, when laser excitation light is made incident on the medium, perform induced emission corresponding to the incident laser excitation light. A wavelength (a so-called fundamental wavelength) of photons emitted by the induced emission increases and decreases according to the configuration of the laser medium 25. In this example, the wavelength of the photons is present in an infrared region of approximately 1 μm.

In this embodiment, rod-like Nd:YVO$_4$ (yttrium vanadate) is used as the laser medium 25. The laser excitation light is made incident from one end face of the laser medium 25 formed in a rod shape. Laser light (a so-called fundamental wave) having the fundamental wavelength is emitted from the other end face (a one-direction excitation scheme by so-called end pumping). In this example, the fundamental wavelength is set to 1064 nm. On the other hand, the wavelength of the laser excitation light is set near a center wavelength of an absorption spectrum of Nd:YVO$_4$ to promote the induced emission. However, the laser medium is not limited to this example. As other laser media, for example, YAG, YLF, GdVo$_4$, and the like doped with rare earth can be used. Various solid-state laser media can be used according to uses of the laser machining device L.

A wavelength of output laser light can be converted into any wavelength by combining a wavelength conversion element with the solid-state laser medium. In that case, unlike FIG. 6, the laser medium 25 may be housed in the wavelength converting section 2B. A so-called fiber laser in which fiber is used as an oscillator instead of bulk may be used as the solid-state laser medium.

Furthermore, the marker head 1 is not limited to the solid-state laser. A gas laser using gas such as CO$_2$, helium-neon, argon, or nitrogen as a medium may be used. For example, a laser medium at the time when a carbon dioxide laser is used is filled with carbon dioxide (CO$_2$) on the inside thereof and incorporates an electrode. The laser medium oscillates a laser by exciting the carbon dioxide on the basis of a printing signal input from a laser control device.

Furthermore, the laser-light output section 2 can also use, as an excitation scheme in which the solid-state laser medium is used, a two-direction excitation scheme for irradiating excitation light from front and rear end faces of the solid-state laser medium instead of the one-direction excitation scheme explained above.

First Wavelength Conversion Element 26

The first wavelength conversion element 26 is formed as a nonlinear optical crystal capable of generating the second harmonic. The first wavelength conversion element 26 is configured to, when the fundamental wave is made incident, double a frequency of the fundamental wave and emit the fundamental wave as the second harmonic (Second Harmonic Generation: SHG). That is, a wavelength of laser light generated when the fundamental wave is made incident on the first wavelength conversion element 26 is present in a visible light region of approximately 500 nm. In particular, in this embodiment, a wavelength of the second harmonic is set to 532 nm.

In general, conversion efficiency of the fundamental wave by the first wavelength conversion element 26 is lower than 100%. Therefore, at least a part of the fundamental wave made incident on the first wavelength conversion element 26 is emitted without being converted by the first wavelength conversion element 26. Therefore, when the fundamental wave is made incident on the first wavelength conversion element 26, laser light including the fundamental wave and the second harmonic is emitted.

In this embodiment, LBO (LiB$_3$O$_5$) is used as the first wavelength conversion element 26. However, the first wavelength conversion element 26 is not limited to this example. As the first wavelength conversion element 26, KTP (KTiPO$_4$), organic nonlinear optical materials, other inorganic nonlinear optical materials, for example, KN (KNbO$_3$), KAP (KAsPO$_4$), BBO (β-BaB$_2$O$_4$), and LBO (LiB$_3$O$_5$), and a bulk-type polarization reversal element (LiNbO$_3$ (Periodically Polled Lithium Niobate: PPLN), LiTaO$_3$, etc.) may be used. A semiconductor laser for an excitation light source of a laser by up-conversion using a fluoride fiber doped with rare earth such as Ho, Er, Tm, Sm, or Nd can also be used. In this way, in this embodiment, optical materials of various types can be used.

Second Wavelength Conversion Element 27

The second wavelength conversion element 27 is formed as a nonlinear optical crystal capable of generating the third harmonic. The second wavelength conversion element 27 is configured to, when the fundamental wave and the second harmonic are made incident (in particular, when propagating directions of the fundamental wave and the second harmonic are equal), convert the fundamental wave and the second harmonic into the third harmonic having a triple frequency of the fundamental wave and emit the third harmonic (Third Harmonic Generation: THG). That is, a wavelength of laser light generated when the fundamental wave and the second harmonic are made incident on the second wavelength conversion element 27 is present in an ultraviolet region of approximately 350 nm (specifically, near a boundary between a visible light region and the ultraviolet region). In particular, in this embodiment, a wavelength of the third harmonic is set to 355 nm.

In general, conversion efficiency of the fundamental wave by the second wavelength conversion element 27 is lower than 100%. Therefore, at least a part of each of the fundamental wave and the second harmonic made incident on the second wavelength conversion element 27 is emitted without being converted by the second wavelength conversion element 27. Therefore, when the fundamental wave and the second harmonic are made incident on the second wavelength conversion element 27, laser light in which the fundamental wave, the second harmonic, and the third harmonic are mixed is emitted.

In this embodiment, LBO (LiB$_3$O$_5$) is used as the second wavelength conversion element 27. However, the second wavelength conversion element 27 is not limited to this example, As the second wavelength conversion element 27, optical materials of various types such as KTP (KTiPO$_4$), organic nonlinear optical materials, and other inorganic nonlinear optical materials can be used.

Laser-Light Separating Section 28

The laser-light separating section 28 is housed in the wavelength converting section 2B and configured to separate the third harmonic from the resonant optical path of the laser light and emit the third harmonic from the laser-light output section 2.

As shown in FIGS. 5 and 6, the laser-light separating section 28 in this embodiment is configured from a plurality of optical components. The laser-light separating section 28 can be configured to include the first separator (an output mirror) 28a for extracting the second and third harmonics from the laser light, the concave lens 28b for shaping a beam diameter of the laser light including the second and third harmonics, a second separator (a reflection mirror) 28c for extracting the third harmonic from the laser light, and an attenuating section 28d for attenuating an unnecessary second harmonic (see FIG. 9 as well).

The first separator 28a is a so-called beam splitter and is configured to transmit the fundamental wave and reflect the second harmonic and the third harmonic. The first separator 28a is disposed to cross the optical axis of the resonant optical path connecting the first reflection mirror 21 and the second reflection mirror 22 and set to a posture inclined at approximately 45 degrees with respect to the optical axis.

The concave lens 28b is configured to expand the beam diameter of the transmitted laser light by transmitting the laser light reflected by the first separator 28a, that is, the laser light separated from the resonant optical path. In this configuration example, the concave lens 28b is interposed between the first separator 28a and the second separator 28c. However, the concave lens 28b is not limited to such disposition. For example, the concave lens 28b may be disposed such that the laser light after being transmitted through the second separator 28c passes through the concave lens 28b.

The second separator 28c is a beam splitter similar to the first separator 28a and is configured to transmit the second harmonic and reflect the third harmonic. The second separator 28c is disposed to cross the optical axis of the laser light passed through the concave lens 28b and set to a posture inclined approximately 45 degrees with respect to the optical axis.

The attenuating section 28d is configured to attenuate the laser light, that is, the second harmonic transmitted through the second separator 28c. In this configuration example, the attenuating section 28d attenuates the second harmonic with multiple reflection.

Beam Expander 29

The beam expander 29 is configured by a plurality of optical lenses and configured to make the third harmonic reflected by the second separator 28c incident and shape the beam diameter of the laser light to be suitable for incident on a Z scanner 33 explained below.

In this configuration example, the second separator 28c, the two optical lenses configuring the beam expander 29, and the output window section 16 of the housing 20 are disposed in this order on an optical path formed by the third harmonic reflected by the second separator 28c. These components are disposed slightly on the upper side in the up-down direction of the housing 10.

Although details are omitted, a beam sampler for separating a part of the laser light is disposed between the beam expander 29 and the output window section 16. A power monitor configured to detect an output of the laser light is provided downstream of the beam sampler. A detection signal of the power monitor is output to the control section 101 of the marker controller 100.

When it is unnecessary to expand the beam diameter of the laser light, the beam expander 29 can be omitted.

Laser Resonance

As shown in FIGS. 5 and 6, in the Q-switch housing section 2A, the laser excitation light made incident from the incident section 24 is transmitted through the folding mirror 24b and made incident on one end face of the laser medium 25. The fundamental wave emitted on the basis of the laser excitation light is transmitted through the transmission window section 15 and made incident on the wavelength converting section 2B.

Subsequently, the fundamental wave made incident on the wavelength converting section 2B is transmitted through the first separator 28a and thereafter made incident on the first wavelength conversion element 26 passing through the second wavelength conversion element 27. In the first wavelength conversion element 26, a part of the fundamental wave is converted into the second harmonic. Therefore, the first wavelength conversion element 26 emits laser light in which the fundamental wave and the second harmonic are mixed. The laser light is totally reflected on the second reflection mirror and traces an optical path, which the laser light has traced so far, in the opposite direction.

The laser light made incident on the first wavelength conversion element 26 again is made incident on the second wavelength conversion element 27 after the second harmonic is generated again in the first wavelength conversion element 26. In the second wavelength conversion element 27, a part of the fundamental wave and the second harmonic is converted into the third harmonic. Therefore, the second wavelength conversion element 27 emits laser light in which the fundamental wave, the second harmonic, and the third harmonic are mixed. When the laser light reaches the first separator 28a, the second harmonic and the third harmonic are reflected by the first separator 28a to separate from the resonant optical path. On the other hand, the fundamental wave is transmitted through the first separator 28a to reach the transmission window section 15.

The second and third harmonics separated by the first separator 28a reaches the second separator 28c after passing through the concave lens 28b. The second separator 28c transmits the second harmonic and guides the second harmonic to the attenuating section 28d and reflects the third harmonic and guides the third harmonic to the beam expander 29. The third harmonic guided to the beam expander 29 is emitted via the output window section 16 as UV laser light after the beam diameter of the third harmonic is shaped.

On the other hand, the fundamental wave transmitted through the first separator 28a and reaching the transmission window section 15 reaches the folding mirror 24b via the laser medium 25 after passing through the transmission window section 15. As explained above, the folding mirror 24b reflects the fundamental wave propagated in this way and guides the fundamental wave to the Q switch 23. The fundamental wave guided to the Q switch 23 is deflected and separated from the resonant optical path when the Q switch 23 is in the ON state. As explained above, in this case, a continuous wave (CW) having a zero output or an extremely low output oscillates.

On the other hand, when the Q switch 23 is in the OFF state, the fundamental wave reaches the first reflection mirror 21 passing through the Q switch 23. The fundamental wave reflected on the first reflection mirror 21 is reflected by the folding mirror 24b and made incident on the laser medium 25 after passing through the Q switch 23 again. The fundamental wave made incident on the laser medium 25 is made incident on the wavelength converting section 2B again.

When such a process is repeated, the fundamental wave is multiply reflected between the first reflection mirror 21 and the second reflection mirror 22. As a result, the laser light is amplified. According to the ON/OFF control of the Q switch 23, a high-output UV laser intermittently pulse-oscillates.

Components Related to Temperature Adjustment of the Optical Components

Incidentally, to secure conversion efficiency of the laser light by the first wavelength conversion element 26 and the second wavelength conversion element 27, it is requested to appropriately adjust the temperatures of the first wavelength conversion element 26 and the second wavelength conversion element 27.

Therefore, the laser-light output section 2 includes an element-side temperature adjusting section configured to adjust the temperatures of the first and second wavelength conversion elements 26 and 27 on the basis of a control signal input from the marker controller 100 such that the first and second wavelength conversion elements 26 and 27 are kept as a predetermined target temperature.

Specifically, the element-side temperature adjusting section includes a first temperature adjusting section 5 capable of adjusting the temperature of the first wavelength conversion element 26 and a second temperature adjusting section 6 capable of adjusting the temperature of the second wavelength conversion element 27. Both of the first temperature adjusting section 5 and the second temperature adjusting section 6 are disposed on the outside of the housing 20 (i.e., the outside of the internal space surrounded by the housing 20).

The first temperature adjusting section 5 and the second temperature adjusting section 6 are configured to be controlled independently from each other. That is, members for adjusting temperature such as Peltier elements are individually provided in the first temperature adjusting section 5 and the second temperature adjusting section 6. Separate control signals (when the Peltier elements are used, electric currents (control currents)) can be sent to such members.

In particular, in this embodiment, the first wavelength conversion element 26 and the first temperature adjusting section 5 are unitized and the second wavelength conversion element 27 and the second temperature adjusting section 6 are unitized. In the following explanation, the former is referred to as "SHG unit" and the latter is referred to as "THG unit".

It is also requested to adjust the temperature of the laser-light separating section 28 from the viewpoint of reducing a temperature difference between the first and second wavelength conversion elements 26 and 27 and the first and second separators 28a and 28c in the laser-light separating section 28.

The laser-light output section 2 includes an output-mirror-temperature adjusting section 7 configured to adjust at least the temperature of the first separator 28a in the laser-light separating section 28 on the basis of a control signal input from the marker controller 100 such that the temperature falls within a predetermined temperature range specified according to the target temperature of the first and second wavelength conversion elements 26 and 27.

Specifically, in this embodiment, the output-mirror-temperature adjusting section 7 is configured to collectively adjust the temperatures of the first separator 28a, the concave lens 28b, and the second separator 28c among the optical components configuring the laser-light separating section 28. The output-mirror-temperature adjusting section 7 may individually adjust these temperatures.

In particular, in this embodiment, the laser-light separating section 28 and the output-mirror-temperature adjusting section 7 are unitized. In the following explanation, this unit is referred to as "laser-light separating unit".

The configurations of the SHG unit, the THG unit, and the laser-light separating unit are explained below in order.

SHG Unit

Figure 7:
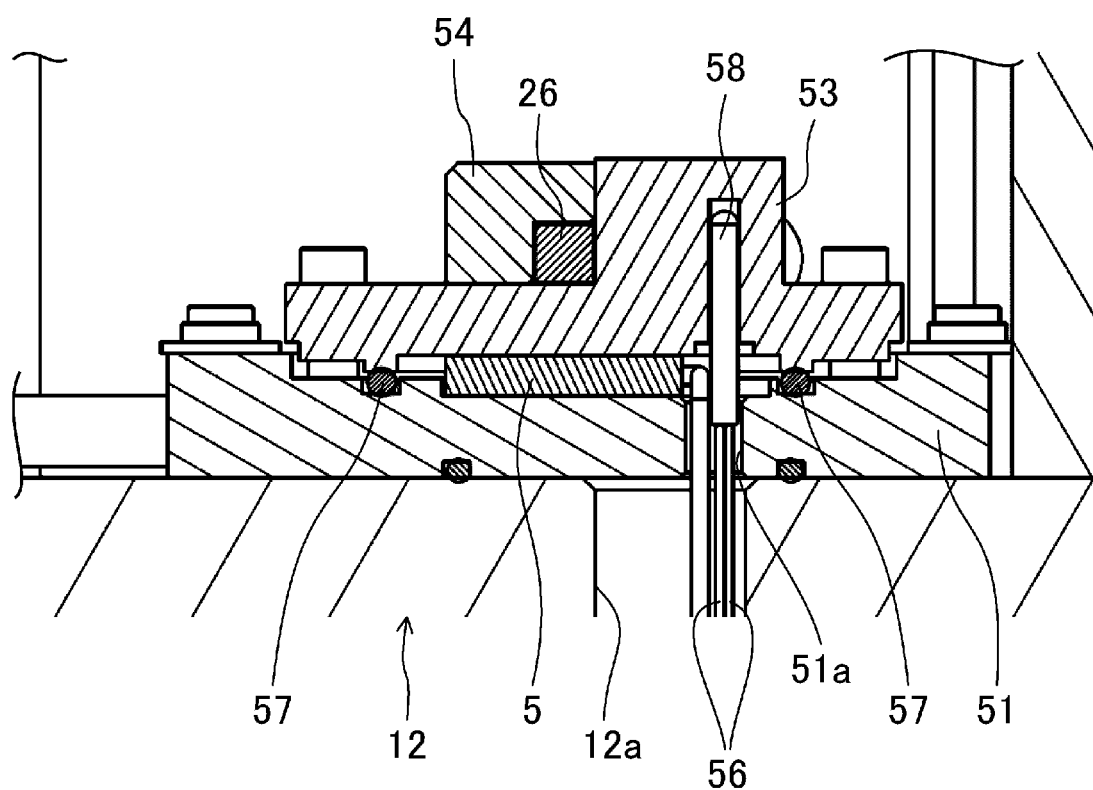
FIG. 7 is a sectional view illustrating the configuration of an SHG unit.

FIG. 7 is a sectional view illustrating the configuration of the SHG unit. As shown in FIG. 7, the SHG unit is configured by a Peltier base 51 supported on the base plate 12, a crystal holding member 53 supported with respect to the Peltier base 51 via a plurality of positioning pins (not shown in FIG. 7), the first wavelength conversion element 26 placed on the crystal holding member 53, and a crystal pressing member 54 for fixing the first wavelength conversion element 26 to the crystal holding member 53. The first temperature adjusting section 5 is sandwiched between the Peltier base 51 and the crystal holding member 53. A harness 56 connected to the first temperature adjusting section 5 is connected from the outside of the housing 20 via through-holes 51a and 12a provided in the Peltier base 51 and the base plate 12.

In explanation related to the SHG unit, "upper" is equivalent to "upper" on the paper surface of FIG. 7. An upper side referred to herein is equal to the latitudinal direction one side explained above.

The Peltier base 51 is formed in a rectangular plate shape and fixed on the base plate 12 by screws and the like. The first temperature adjusting section 5 formed by the Peltier element is placed on the upper surface of the Peltier base 51. The plurality of positioning pins are inserted into the upper surface of the Peltier base 51. The crystal holding member 53 is supported via the positioning pins.

A supporting structure via the positioning pins is used in this way. This is advantageous in reducing a contact area of the Peltier base 51 and the crystal holding member 53 and preventing heat transfer between both the members.

The crystal holding member 53 is formed in a plate shape having a dimension smaller than the Peltier base 51 and fixed to the Peltier base 51 via positioning pins. A seal member 57 made of resin such as an O-ring is sandwiched between the lower surface of the crystal holding member 53 and the upper surface of the Peltier base 51. Although details are omitted, the seal member 57 can be formed in a shape that surrounds the first temperature adjusting section 5 from a side.

A space surrounded by the lower surface of the crystal holding member 53, the upper surface of the Peltier base 51, and the seal member 57 communicates with the outside of the housing 20 through the through-hole 12a provided in the base plate 12. The space is airtightly isolated from the space surrounded by the housing 20 by sandwiching the seal member 57 between the spaces.

The first temperature adjusting section 5 is disposed in the space isolated in that way. Specifically, the first temperature adjusting section 5 according to this embodiment is formed by a Peltier element having a substantial thin plate shape and is sandwiched between the upper surface of the Peltier base 51 and the crystal holding member 53. The harness 56 for supplying an electric current to the Peltier element is connected to a side of the first temperature adjusting section 5. As explained above, the harness 56 is let out to the outside via the through-hole 12a of the base plate 12.

A temperature sensor 58 for detecting the temperature of the first temperature adjusting section 5 is inserted into the crystal holding member 53. The temperature sensor 58 is substantially bar-shaped and inserted upward from the lower surface of the crystal holding member 53. Although details are omitted, wires for outputting a detection signal by the temperature sensor 58 are let out to the outside via the through-hole 12a of the base plate 12 like the harness 56 connected to the first temperature adjusting section 5.

The crystal holding member 53 has a sectional shape obtained by laterally reversing a substantial L-shape. The first wavelength conversion element 26 is placed on the upper surface near a corner of the L-shape of the crystal holding member 53.

The crystal pressing member 54 is fixed to the upper surface of the crystal holding member 53. The crystal pressing member 54 and the crystal holding member 53 hold the first wavelength conversion element 26.

When an electric current is supplied to the first temperature adjusting section 5, the first temperature adjusting section 5 (specifically, a surface on the crystal holding member 53 side in the first temperature adjusting section 5)

generates heat according to the magnitude of the electric current. The heat is transferred to the first wavelength conversion element 26 via the crystal holding member 53. The temperature of the first wavelength conversion element 26 is adjusted to keep a predetermined target temperature T1. The target temperature T1 can be changed as appropriate according to, for example, design of an optical system. In this embodiment, the target temperature T1 is set within a range of 50° C. to 100° C.

A space in which the first temperature adjusting section 5, the harness 56 connected to the first temperature adjusting section 5, and the temperature sensor 58 are housed is airtightly isolated from the space surrounded by the housing 20. Even if synthetic resin or the like vaporizes and impurities are formed in these components, such impurities can be prevented from intruding into the space surrounded by the housing 20, that is, the inside of the wavelength converting section 2B. This is advantageous in preventing the impurities from adhering to various optical components such as the first wavelength conversion element 26 and the first separator 28a.

THG Unit

Figure 8:
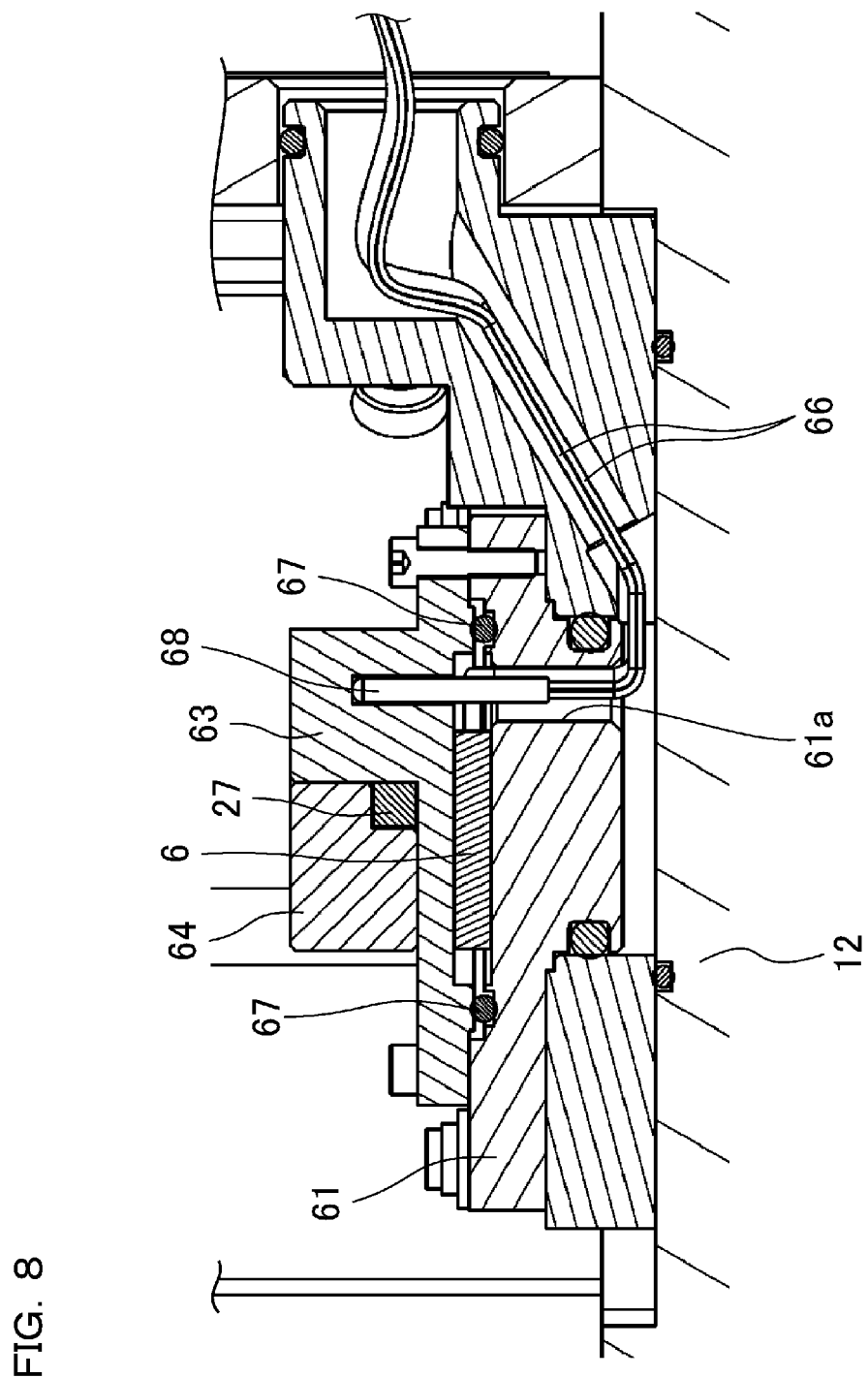
FIG. 8 is a sectional view illustrating the configuration of a THG unit.

FIG. 8 is a sectional view illustrating the configuration of the THG unit. The THG unit is configured substantially the same as the SHG unit except a part of components. That is, as shown in FIG. 8, the THG unit is configured by a Peltier base 61 supported on the base plate 12, a crystal holding member 63 supported via a plurality of positioning pins 62 with respect to the Peltier base 61, the second wavelength conversion element 27 placed on the crystal holding member 63, and a crystal pressing member 64 for fixing the second wavelength conversion element 27 to the crystal holding member 63. The second temperature adjusting section 6 is sandwiched between the Peltier base 61 and the crystal holding member 63. A harness 66 connected to the second temperature adjusting section 6 is connected from the outside of the housing 20 via a through-hole 61a provided in the Peltier base 61.

The second temperature adjusting section 6 is disposed in the space isolated in that way. Specifically, the second temperature adjusting section 6 according to this embodiment is formed by a substantially thin plate-shaped Peltier element and sandwiched between the upper surface of the Peltier base 61 and the crystal holding member 63. The harness 66 for supplying an electric current to the Peltier element is connected to a side of the second temperature adjusting section 6. The harness 66 is let out to the outside via the through-hole 61a provided in the Peltier base 61.

A seal member 67 made of resin such as an O-ring is sandwiched between the lower surface of the crystal holding member 63 and the upper surface of the Peltier base 61. Like the seal member 57 in the SHG unit, the seal member 67 can be formed in a shape surrounding the second temperature adjusting section 6 from a side.

A temperature sensor 68 for detecting the temperature of the second temperature adjusting section 6 is inserted into the crystal holding member 63. Although details are omitted, wires for outputting a detection signal by the temperature sensor 68 are let out to the outside via the through-hole 61a of the Peltier base 61 like the harness 66 connected to the second temperature adjusting section 6.

When an electric current is supplied to the second temperature adjusting section 6, the second temperature adjusting section 6 (specifically, a surface on the crystal holding member 63 side in the second temperature adjusting section 6) generates heat according to the magnitude of the electric current. The heat is transferred to the second wavelength conversion element 27 via the crystal holding member 63. The temperature of the second wavelength conversion element 27 is adjusted to keep a predetermined target temperature T2. The target temperature T2 can be changed as appropriate according to, for example, design of an optical system. In this embodiment, the target temperature T2 is set substantially the same as the target temperature T1 of the first wavelength conversion element 26.

A space in which the second temperature adjusting section 6, the harness 66 connected to the second temperature adjusting section 6, and the temperature sensor 68 are housed is airtightly isolated from the space surrounded by the housing 20. Even if synthetic resin or the like vaporizes and impurities are formed in these components, such impurities can be prevented from intruding into the space surrounded by the housing 20, that is, the inside of the wavelength converting section 2B. This is advantageous in preventing the impurities from adhering to various optical components such as the second wavelength conversion element 27 and the first separator 28a.

Laser-Light Separating Unit

Figure 9:
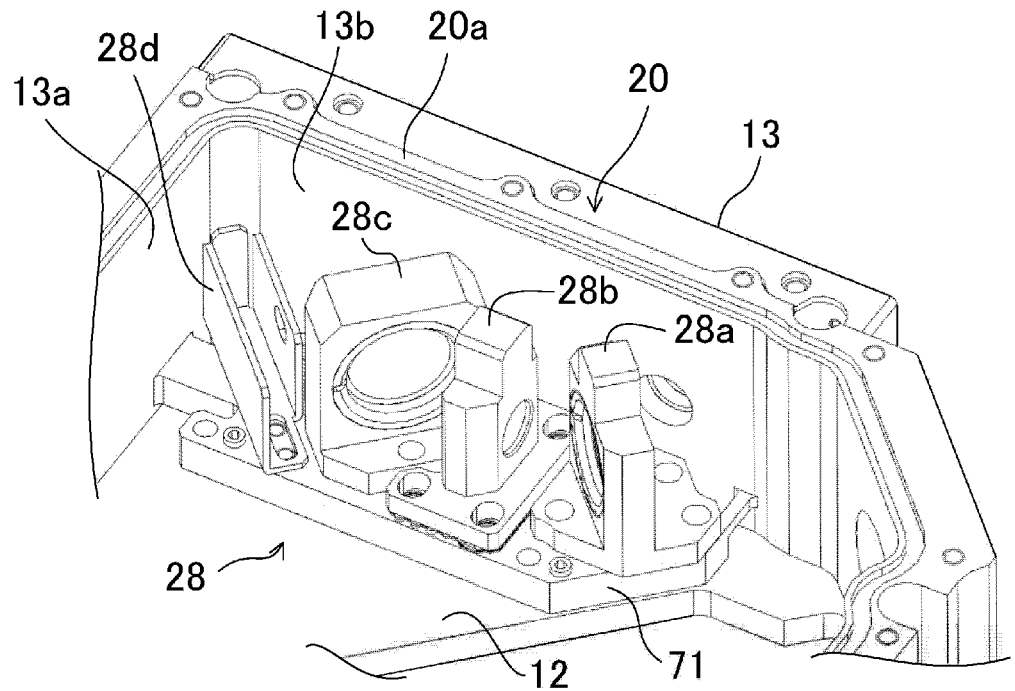
FIG. 9 is a perspective view illustrating the configuration of a laser-light separating unit.
Figure 10:
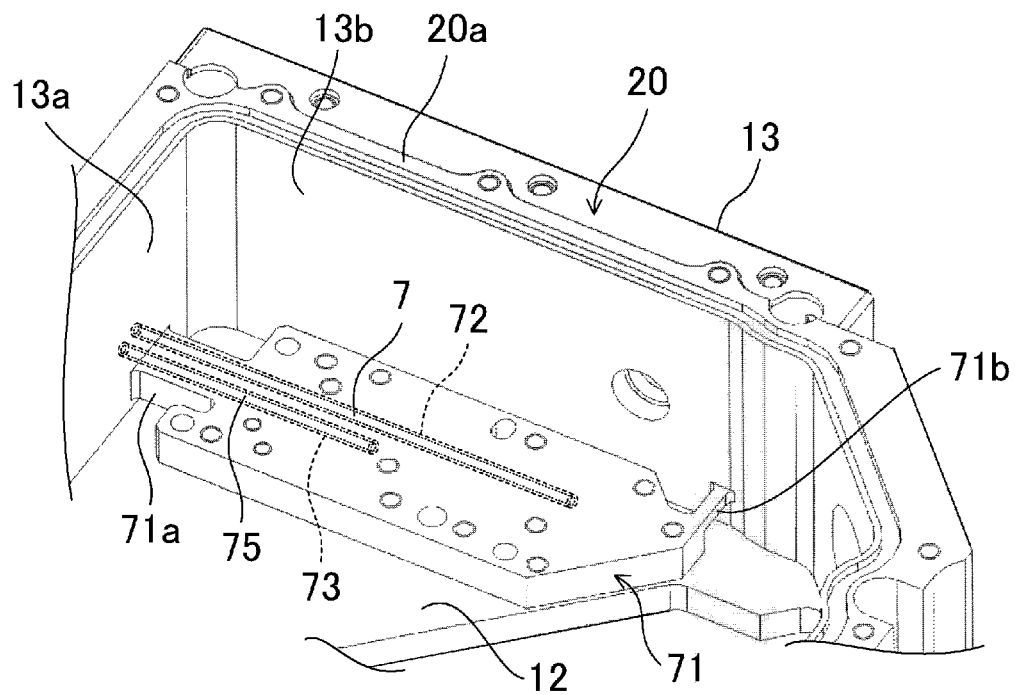
FIG. 10 is a partially omitted perspective view of the configuration illustrated in FIG. 9.

FIG. 9 is a perspective view illustrating the configuration of the laser-light separating unit. FIG. 10 is a partially omitted perspective view of the configuration illustrated in FIG. 9. The laser-light separating unit shown in FIGS. 9 and 10 includes a separator base (a base plate) 71 extending substantially in parallel to the base plate 12. The first separator 28a, the concave lens 28b, the second separator 28c, and the attenuating section 28d are supported by the separator base 71.

The separator base 71 shown in FIGS. 9 and 10 is formed in a substantially rectangular plate shape extending along the up-down direction of the housing 10 and is housed in the internal space surrounded by the housing 20. The separator base 71 is provided integrally with one inner wall 13a partitioning the internal space surrounded by the housing 20. The separator base 71 extends toward the inside of the internal space from the one inner wall 13a.

That is, as explained above, the internal space of the housing 20 is partitioned by the base plate 12, the sidewall section 13, and the lid section 14. The separator base 71 is disposed on the inner side of a corner where the one inner wall 13a in the sidewall section 13 and the other inner wall 13b orthogonal to the one inner wall 13a cross. The separator base 71 extends substantially perpendicularly from the one inner wall 13a and toward a direction substantially parallel to the other inner wall 13b while keeping a posture substantially parallel to the base plate 12.

A first connecting section 71a integrated with the one inner wall 13a of the housing 20 is provided at one end portion in the longitudinal direction of the separator base 71. As it is seen from FIGS. 9 and 10, the first connecting section 71a is extended in the longitudinal direction of the separator base 71 and formed narrower than a part enabled to support the first separator 28a, the concave lens 28b, the second separator 28c, and the attenuating section 28d.

On the other hand, a second connecting section 71b integrated with the other inner wall 13b of the housing 20 is provided at the other end portion in the longitudinal direction of the separator base 71. As it is seen from FIGS. 9 and 10, the second connecting section 71b is extended in the latitudinal direction of the separator base 71 and formed narrower than the first connecting section 71a.

In this way, by providing the connecting sections 71a and 71b at one end and the other end in the longitudinal direction, the separator base 71 is configured to be supported integrally with the inner walls 13a and 13b configuring the housing 20.

A plurality of cylindrical positioning pins are interposed between the separator base 71 and the base plate 12. By interposing the positioning pins, it is possible to prevent thermal coupling between the separator base 71 and the base plate 12.

As shown in FIG. 10, a first insertion hole (an insertion hole) 72 for enabling the output-mirror-temperature adjusting section 7 to be inserted is provided in the separator base 71. The first insertion hole 72 extends in a thin hole shape along the longitudinal direction of the separator base 71. The first insertion hole 72 is opened in the outer surface of the sidewall section 13 via the first connecting section 71a. The output-mirror-temperature adjusting section 7 is formed in a bar shape and inserted from the opening. The terminal end portion of the first insertion hole 72 extends to the vicinity of the other end portion of the separator base 71. On the other hand, the start end portion of the first insertion hole 72 communicates with the outer space of the housing 20.

In this embodiment, the output-mirror-temperature adjusting section 7 is configured by a heating wire such as a nichrome wire and inserted into the first insertion hole 72. The output-mirror-temperature adjusting section 7 generates heat according to an electric current supplied from the outside.

Further, as shown in FIG. 10, a second insertion hole 73 for enabling the temperature sensor 75 to be inserted is also provided in the separator base 71. Like the first insertion hole 72, the second insertion hole 73 extends in a thin hole shape along the longitudinal direction of the separator base 71. The second insertion hole 73 is opened in the outer surface of the sidewall section 13 via the first connecting section 71a. The terminal end portion of the second insertion hole 73 extends to substantially the center in the longitudinal direction of the separator base 71. On the other hand, the start end portion of the second insertion hole 73 communicates with the outer space of the housing 20.

In this embodiment, the temperature sensor 75 is formed in an elongated bar shape and inserted into the second insertion hole 73. The temperature sensor 75 outputs a detection signal indicating a detection result of the temperature sensor 75.

When an electric current is supplied to the output-mirror-temperature adjusting section 7, the output-mirror-temperature adjusting section 7 generates heat according to the magnitude of the electric current. The heat is transferred to the first separator 28a, the concave lens 28b, the second separator 28c, and the attenuating section 28d via the separator base 71. The temperatures of optical components are adjusted to fall within a predetermined temperature range T3.

The temperature range T3 set as a control target in the output-mirror-temperature adjusting section 7 is specified according to the target temperatures T1 and T2 in the first and second temperature adjusting sections 5 and 6. When the target temperatures T1 and T2 are set the same, the temperature range T3 only has to be set in a range of desirably ±10° C. and more desirably ±5° C. with respect to the target temperature T1.

Prevention of an Output Decrease of Laser Light (the Laser-Light Output Section 2)

Figure 11:
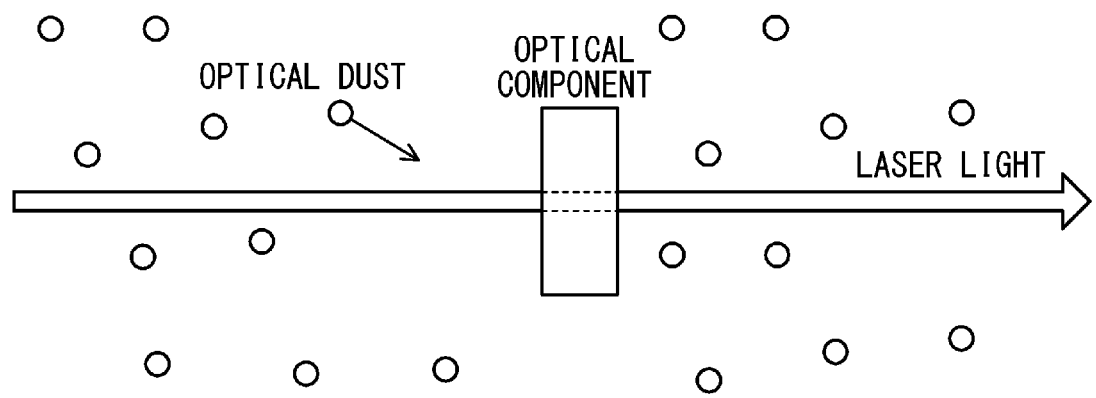
FIG. 11 is a diagram for explaining an optical dust collection effect.
Figure 12:
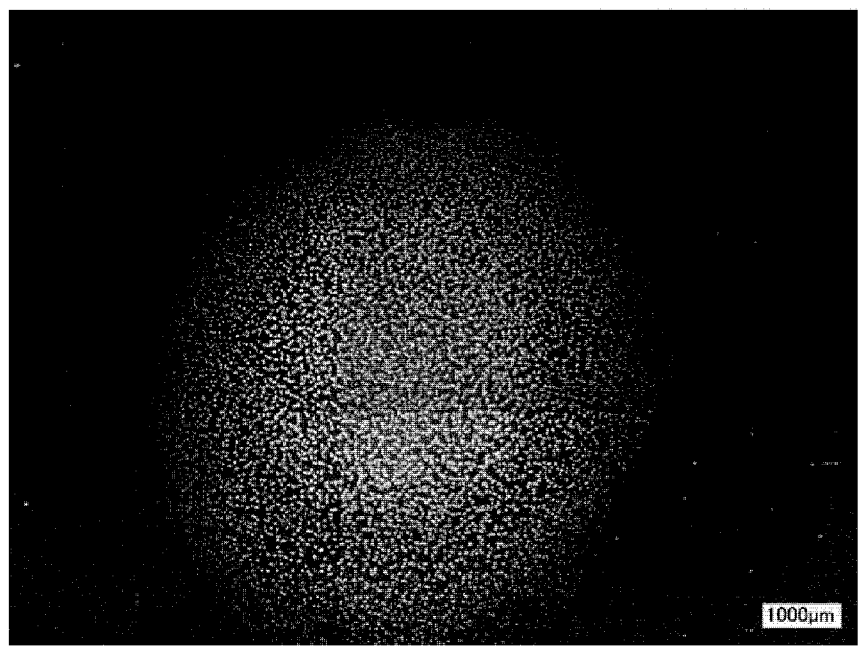
FIG. 12 is a diagram illustrating contaminations adhering to an optical component.

In general, from the viewpoint of prevention of an output decrease of laser light, it is requested to prevent impurities from adhering to various optical components. As shown in FIGS. 11 to 12, such impurities gather in the laser light according to a so-called optical dust collection effect. The impurities (contaminations) are likely to adhere to optical components disposed on the optical axis of the laser light and coagulate. As a result, a transmission loss and a reflection loss of the laser light occur. Consequently, an output decrease is likely to be caused.

On the other hand, in this embodiment, as shown in FIGS. 5 and 6, the wavelength converting section 2B configured by housing the first and second wavelength conversion elements 26 and 27 is provided separately from the Q-switch housing section 2A configured by housing the Q switch 23. The resonator for amplifying laser light is configured by the first reflection mirror 21 housed in the Q-switch housing section 2A and the second reflection mirror 22 housed in the wavelength converting section 2B. The wavelength converting section 2B includes the internal space independent from the Q-switch housing section 2A and can airtightly seal the first and second wavelength conversion elements 26 and 27. Therefore, even if impurities formed in the Q switch 23 are emitted to the air inside the housing 10, the impurities can be prevented from adhering to the first and second wavelength conversion elements 26 and 27. Consequently, an output decrease of the laser light can be prevented.

As shown in FIG. 9, it is possible to not only adjust the temperatures of the first and second wavelength conversion elements 26 and 27 but also adjust the temperature of the first separator 28a functioning as the output mirror. By specifying the temperature range T3 targeted by the first separator 28a according to the target temperatures T1 and T2 of the first and second wavelength conversion elements 26 and 27, a temperature difference between the wavelength conversion elements 26 and 27 and the first separator 28a can be reduced. Consequently, impurities can be prevented from adhering to the first separator 28a and an output decrease of the laser light can be prevented.

Modifications Related to Prevention of an Output Decrease

In the embodiment, the first separator 28a functioning as the output mirror and the first and second reflection mirrors 21 and 22 are configured as the separate optical components. However, the first separator 28a and the first and second reflection mirrors 21 and 22 are not limited to the configuration. For example, one of the first and second reflection mirrors 21 and 22 may be configured as a half mirror that transmits the third harmonic.

The configuration of the resonator is not limited to the intra-cavity type (the type in which the wavelength conversion element is disposed on the inside of the resonator). For example, when the first reflection mirror 21 is disposed in the wavelength converting section 2B, the resonator can also be configured in an extra-cavity type (a type in which the wavelength conversion element is disposed on the outside of the resonator).

Modification of the Configuration Related to Temperature Adjustment of the Optical Components In this embodiment, the configuration including the first and second temperature adjusting sections 5 and 6 and the output-mirror-temperature adjusting section 7 is illustrated. However, the laser-light output section 2 is not limited to this configuration. For example, the laser-light output section 2 may include a third temperature adjusting section configured to adjust, on the basis of a control signal from the control section 101, the temperature of the beam expander 29 to fall within a predetermined temperature range T4 specified according to the target temperature T1. Like the temperature range T3 related to the output-mirror-temperature adjusting section 7, the temperature range T4 only has to be set to a range of desirably ±10° C. and more desirably ±5° with respect to the target temperature T1.

Laser-Light Guiding Section 3

The laser-light guiding section 3 is configured to bend laser light (UV laser light) emitted from the laser-light output section 2 and form an optical path for guiding the laser light to the laser-light scanning section 4.

Figure 13:
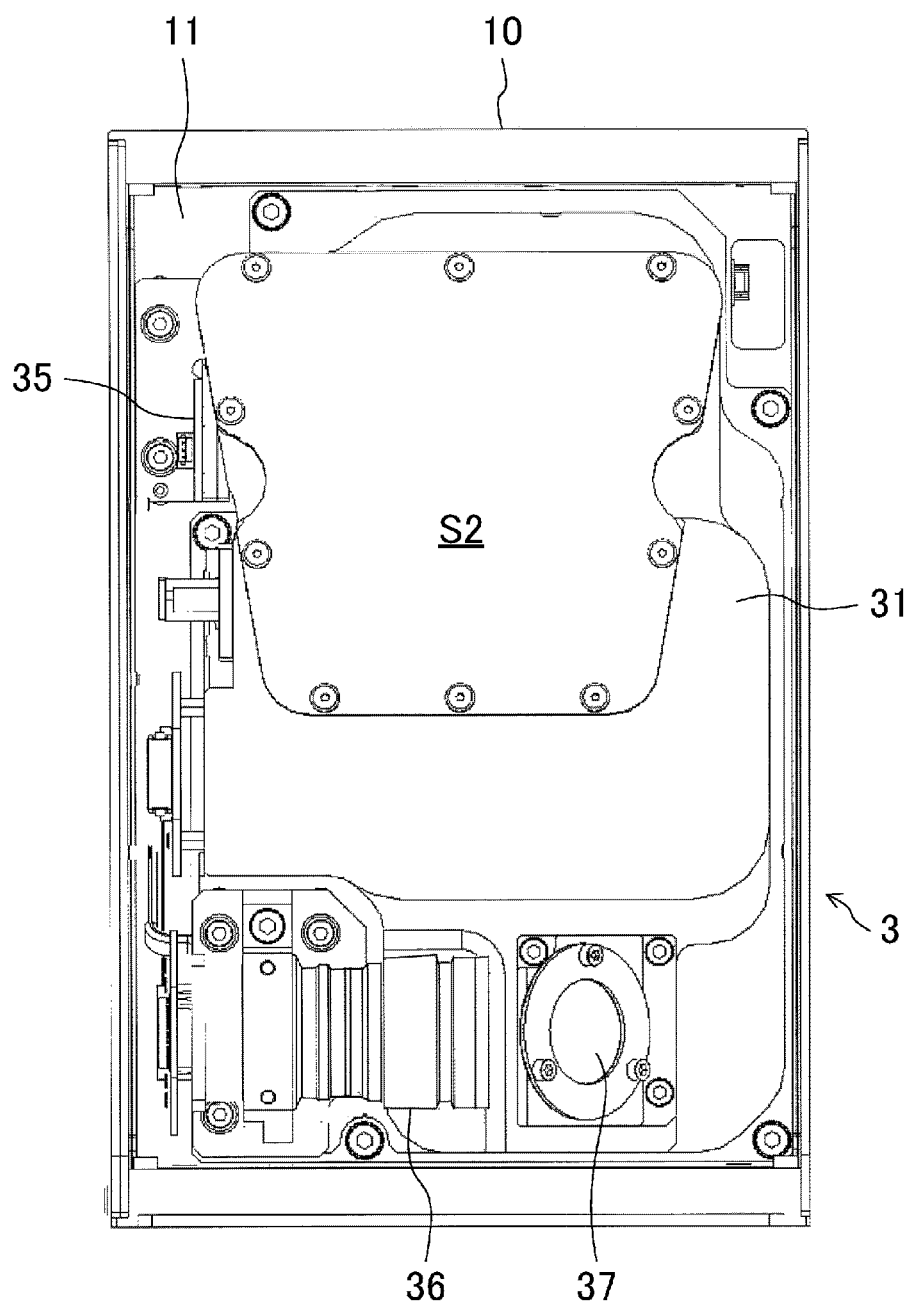
FIG. 13 is a front view illustrating a state in which an exterior cover is detached from the marker head.
Figure 14:
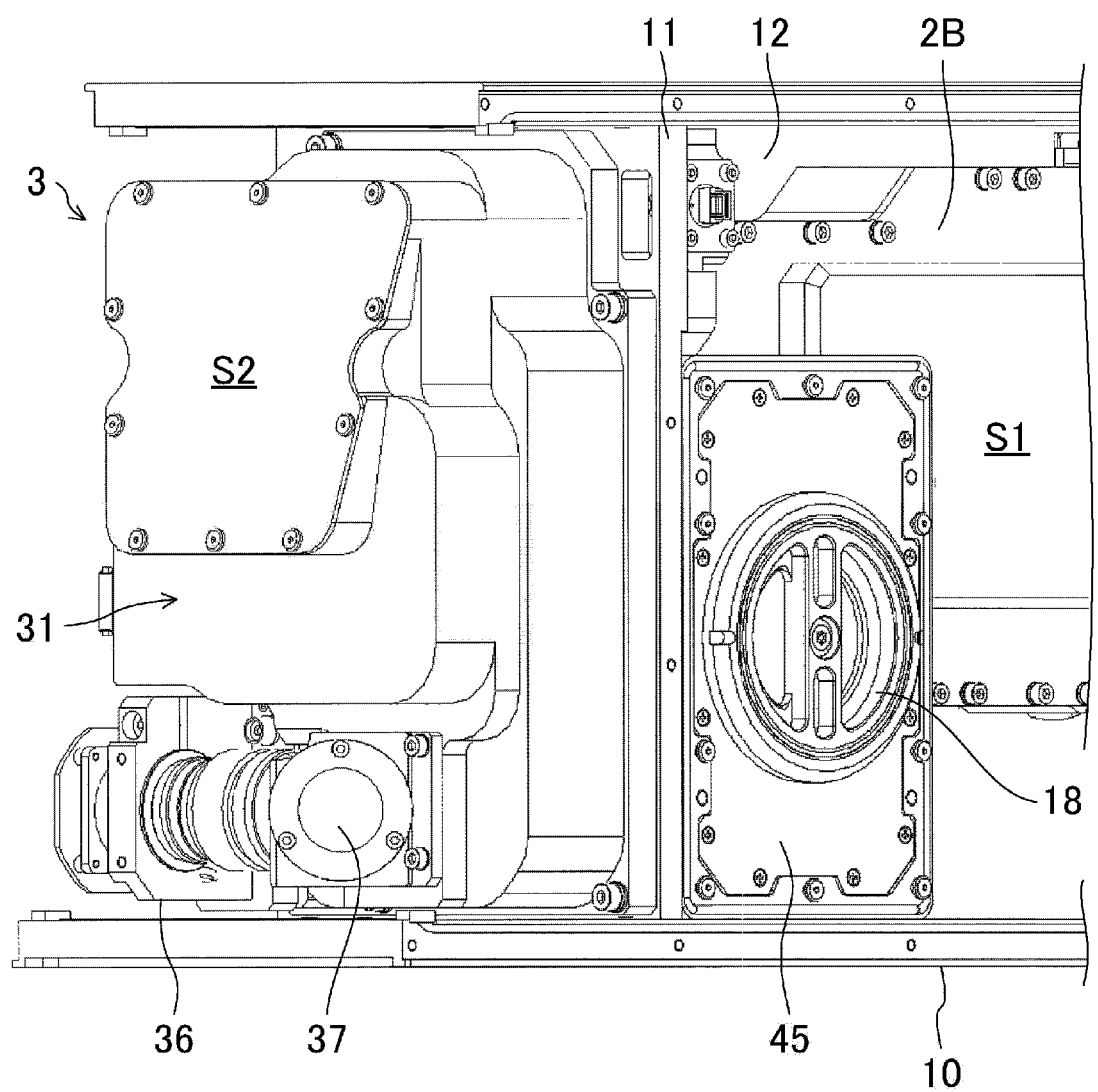
FIG. 14 is a front perspective view of the configuration illustrated in FIG. 13.
Figure 15:
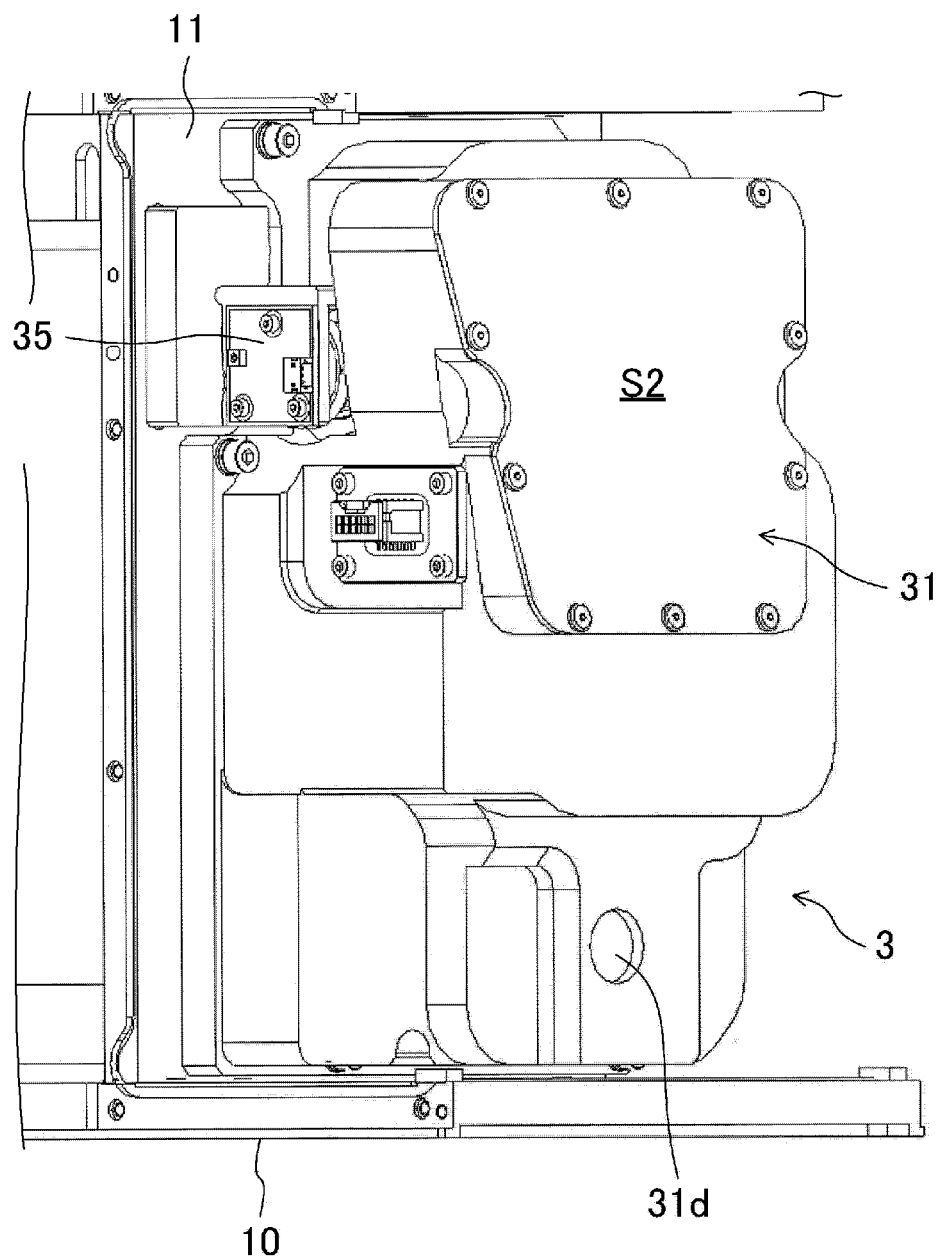
FIG. 15 is a partially omitted view of the configuration illustrated in FIG. 13.
Figure 16:
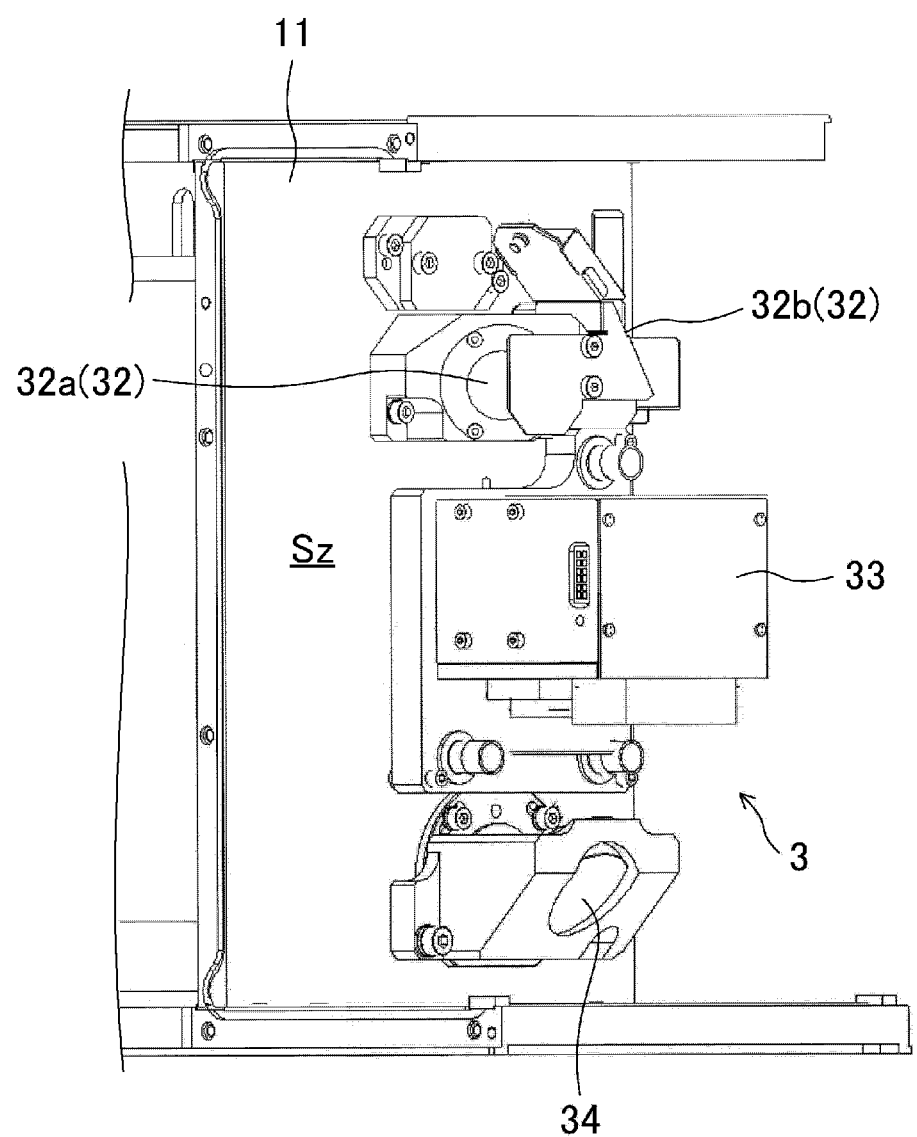
FIG. 16 is a diagram illustrating a state in which a Z chamber cover is detached from the marker head.
Figure 17:
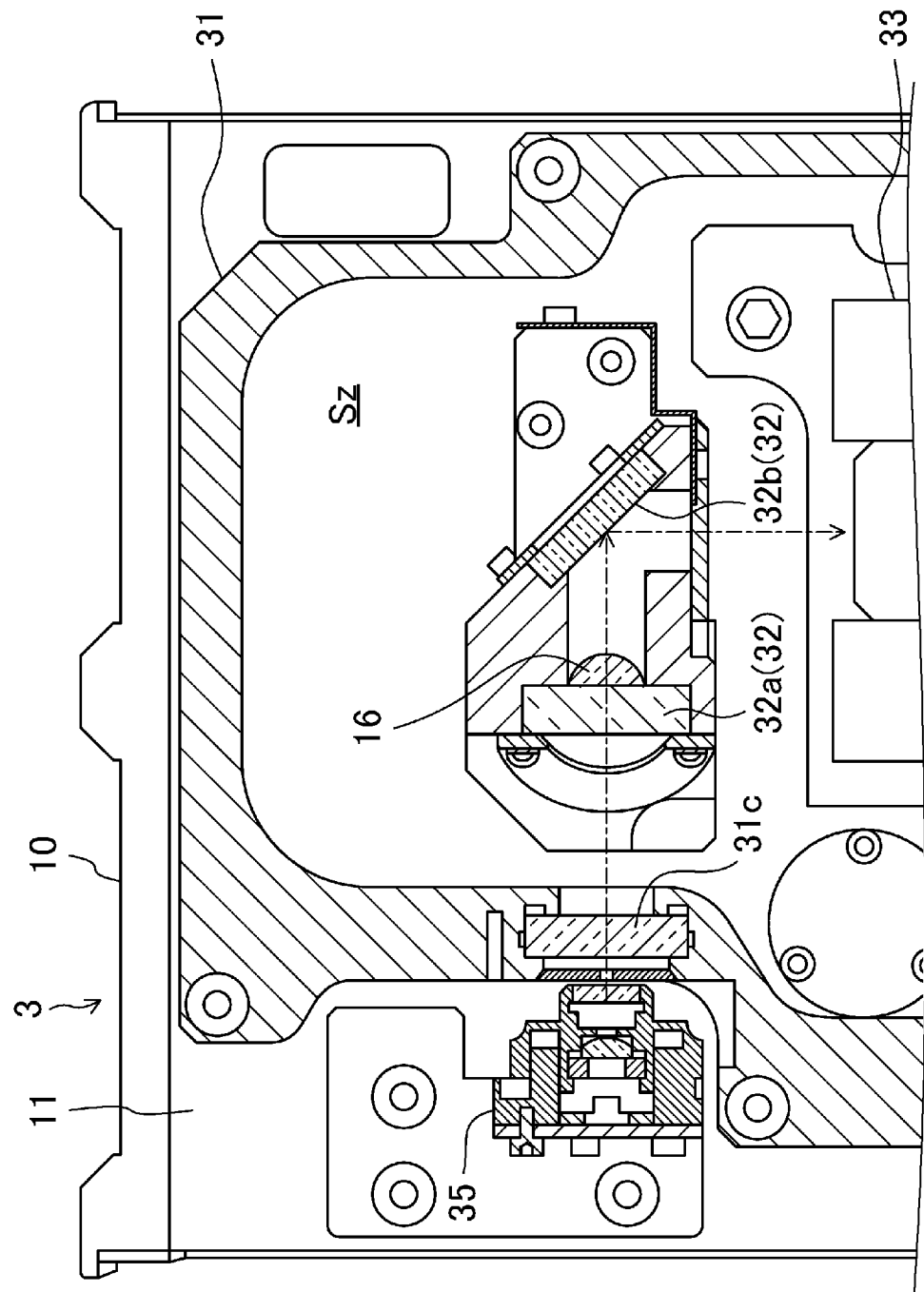
FIG. 17 is a cross sectional view illustrating the configuration around a guide-light emitting device.
Figure 18:
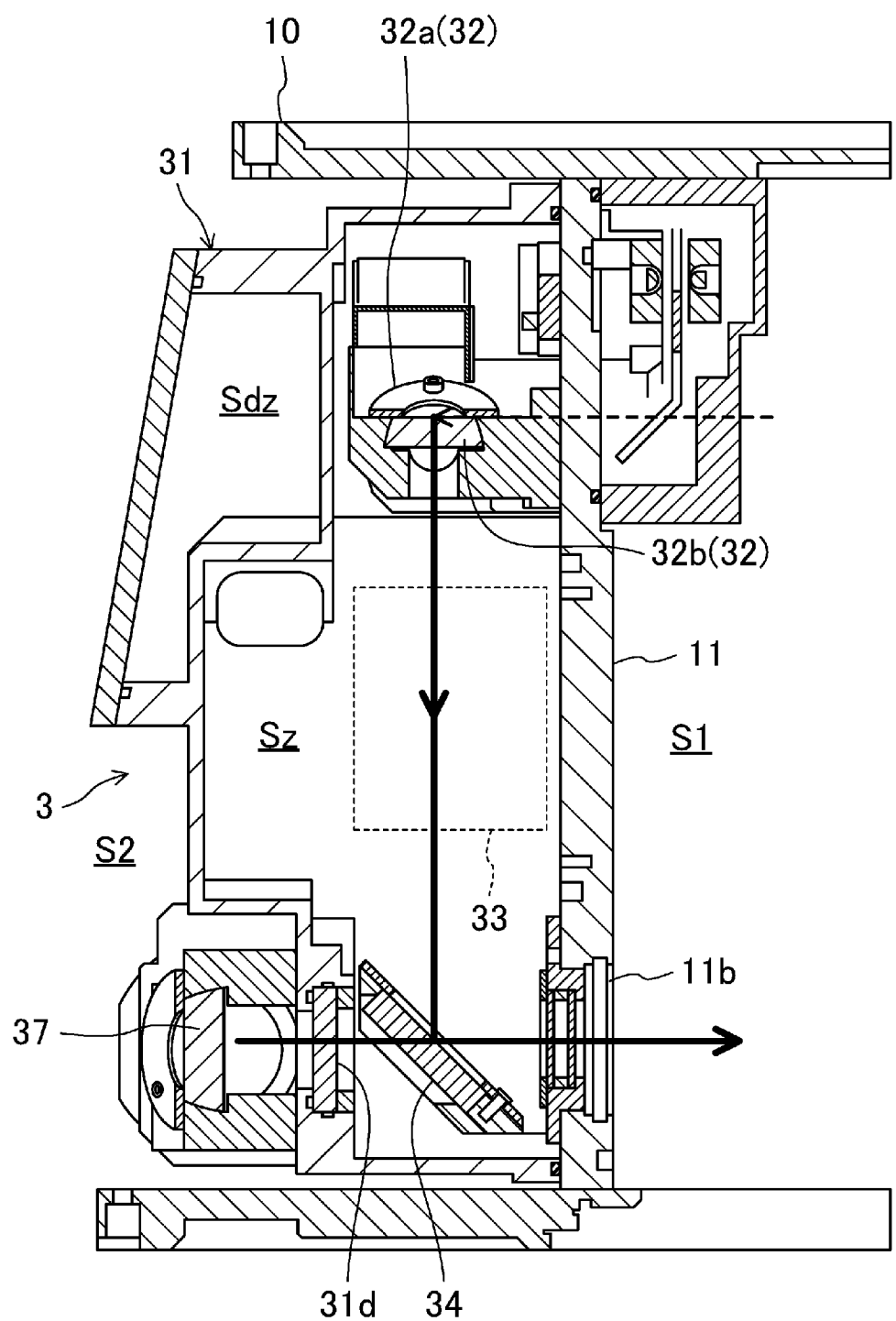
FIG. 18 is a diagram illustrating a longitudinal cross section of a laser-light guiding section.

FIG. 13 is a front view illustrating a state in which an exterior cover 17 (see FIGS. 2 to 4) on the front surface side is detached from the marker head 1. FIG. 14 is a front perspective view of a configuration illustrated in FIG. 13. FIG. 15 is a partially omitted view of the configuration illustrated in FIG. 13. FIG. 16 is a diagram illustrating a state in which the Z chamber cover 31 is detached from the marker head 1. FIG. 17 is a cross sectional view illustrating the configuration around the guide light source (the guide-light emitting device) 35. FIG. 18 is a diagram illustrating a longitudinal cross section of the laser-light guiding section 3.

The laser-light guiding section 3 includes the Z chamber (a sealed space) Sz for sealing the optical components such as first and second bend mirrors 32 and 34, the Z scanner 33, and the like. The Z chamber Sz is configured by the partition section 11 explained above and the Z chamber cover 31 shown in FIGS. 13 to 15. The Z chamber Sz is optically coupled to the wavelength converting section 2B in the laser-light output section 2 via the output window section 16 explained above.

Specifically, the Z chamber cover 31 is formed in a shallow box shape opened toward the partitioning section 11. The Z chamber cover 31 is formed in a shape for causing the Z chamber cover 31 to adhere to the partitioning section 11 to surround components, adhesion of impurities to which should be avoided, such as the first bend mirror 32, the Z scanner 33, and the second bend mirror 34 in conjunction with the partitioning section 11.

A transmission window section configured to transmit predetermined light is provided in a sidewall section of the Z chamber cover 31. An optical component disposed to cause an optical path of UV laser light emitted from the laser-light output section 2 and an optical path of transmitted light transmitted through the transmission window section to cross is provided on the inner side of the Z chamber Sz.

On the other hand, both of the guide light source (a guide-light emitting device) 35 capable of emitting guide light for visualizing a scanning position of the UV laser light and the camera (an imaging device) 36 for imaging the work W are disposed on the outer side of the Z chamber Sz. The guide light source 35 emits the guide light toward the transmission window section (a first transmission window section 31c). The camera 36 receives light for imaging the work W via the transmission window section (a second transmission window section 31d). That is, the camera 36 is disposed such that an imaging axis (a light reception axis) of the camera 36 is made coaxial with the optical axis of the UV laser light by the second bend mirror 34.

Components related to the laser-light guiding section 3 are explained below in order.

Guide Light Source 35

The guide light source 35 is disposed on the outer side of the Z chamber Sz. The guide light source 35 emits guide light toward the first transmission window section 31c capable of configuring the transmission window section. The first transmission window section 31c is disposed at substantially the same height as the output window section 16 and the first bend mirror 32 and located slightly above the center in the up-down direction of the housing 10.

The guide light source 35 is disposed at substantially the same height as such a first transmission window section 31c as shown in FIG. 15 and the like. The guide light source 35 emits guide light toward the inner side in the latitudinal direction of the housing 10. The optical axis of the guide light crosses both of the first transmission window section 31c and the first bend mirror 32.

Therefore, when guide light is emitted from the guide light source 35 to visualize a scanning position of the UV laser light, the guide light reaches the first transmission window section 31c. The first transmission window section 31c transmits the guide light and guides the guide light to the first bend mirror as transmitted light. An optical path formed by the transmitted light is transmitted through the first bend mirror 32 to thereby join an optical path of the UV laser light reflected on the first bend mirror 32.

Although details are omitted. A circuit board connected to the guide light source 35 is also disposed on the outer side of the Z chamber Sz like the guide light source 35.

First Bend Mirror 32

In this embodiment, the first bend mirror 32 capable of configuring an optical component (a first optical component) is disposed on the inner side of the Z chamber Sz and configured from a first mirror 32a and a second mirror 32b as shown in FIGS. 16 and 17.

The first mirror 32a is configured to transmit one of the guide light emitted from the guide light source 35 and the UV laser light output from the laser-light output section 2 and reflect the other to thereby cause the optical paths of the guide light and the UV laser light to cross each other.

Specifically, the first mirror 32a is configured as a so-called half mirror. The first mirror 32a is fixed in a posture for transmitting, from one surface side, guide light emitted from the guide light source 35 and transmitted through the first transmission window section 31c and reflecting, with the other surface on the opposite side of the one surface through which the guide light is transmitted, UV laser light made incident via the output window section 16 (in particular, UV laser light propagated toward the front side in the front-rear direction serving as a first direction).

Consequently, an optical path of the guide light transmitted through the first mirror 32a and an optical path of the UV laser light reflected by the first mirror 32a join. Both of the optical paths reach the second mirror 32b.

The second mirror 32b is configured to bend the optical path of the UV laser light to thereby extend the optical path along a second direction (in this example, substantially equal to the up-down direction) substantially orthogonal to the first direction.

The UV laser light and the guide light bent by the second mirror 32b are propagated downward (in detail, downward in the up-down direction of the housing 10) to reach the second bend mirror 34 through the Z scanner 33.

Z Scanner 33

A focus adjusting mechanism for adjusting a focal distance of UV laser light output from the laser-light output section 2 can be disposed on the inner side of the Z chamber Sz. As such a focus adjusting mechanism, in this embodiment, the Z scanner 33 shown in FIGS. 16 and 18 is provided.

Specifically, the Z scanner 33 is provided halfway in an optical path leading from the first bend mirror 32 to the second bend mirror 34 (in detail, near the center in the up-down direction of the housing 10). The Z scanner 33 can adjust the focal distance of the UV laser light.

The optical path leading from the first bend mirror 32 to the second bend mirror 34 also propagates the guide light emitted from the guide light source 35. Therefore, by operating the Z scanner 33, not only the focal length of the UV laser light but also a focal length of the guide light can be adjusted.

Camera 36

The camera 36 is disposed on the outer side of the Z chamber Sz like the guide light source 35. The camera 36 receives light transmitted through the second transmission window section 31d capable of configuring the transmission window section. As shown in FIG. 18, the second transmission window section 31d is disposed at substantially the same height as the second bend mirror 34 and located slightly below the center in the up-down direction of the housing 10.

As shown in FIGS. 13 to 15 and the like, the camera 36 is disposed at substantially the same height as such a second transmission window section 31d. As explained above, the camera 36 receives light transmitted through the second transmission window section 31d. In detail, the light is reflected light made incident on the laser-light guiding section 3 from the laser-light scanning section 4. The light is propagated toward the front side in the longitudinal direction of the housing 10 and transmitted through the second bend mirror 34 and the second transmission window section 31d in order. Thereafter, the light is reflected by a folding mirror for camera 37. The reflected light is propagated toward the other side in the latitudinal direction of the housing 10 to reach the camera 36. The optical axis of the reflected light crosses both of the second transmission window section 31d and the second bend mirror 34.

That is, when reflected light reflected at a printing point of the work W is transmitted through the second bend mirror 34 to reach the second transmission window section 31d, the second transmission window section 31d transmits the reflected light and guides the reflected light to the folding mirror for camera as transmitted light. An optical path formed by the transmitted light is transmitted through the second bend mirror 34 to thereby cross the optical paths of the UV laser light and the guide light reflected by the second bend mirror 34.

Although details are omitted, a circuit board connected to the camera 36 is also disposed on the outer side of the Z chamber Sz like the camera 36.

Second Bend Mirror 34

In this embodiment, the second bend mirror 34 capable of configuring an optical component (a second optical component) is disposed on the inner side of the Z chamber Sz like the first bend mirror 32 and configured to transmit one of light received by the camera 36 and UV laser light output from the laser-light output section 2 and reflect the other to thereby cause optical paths of the light and the UV laser light to cross each other.

Specifically, the second bend mirror 34 is configured as a so-called half mirror and configured to transmit light received by the camera 36 and reflect UV laser light and guide light reflected by the first bend mirror 32 and passed through the Z scanner 33.

Consequently, as explained above, an optical path of the light transmitted through the second bend mirror 34 and an optical path of the UV laser light and the guide light reflected by the second bend mirror 34 cross.

Further, the second bend mirror 34 in this embodiment bends an optical path bent by the first bend mirror 32 again to thereby direct the optical path to the rear side in the front-rear direction.

In detail, as shown in FIGS. 16 and 18 and the like, the second bend mirror 34 is fixed in a posture with a reflection surface of the second bend mirror 34 directed obliquely rear upward and is inclined rearward from the upper end toward the bottom of the second bend mirror 34. Therefore, when the laser light propagated downward is reflected by the second bend mirror 34, a propagating direction of the laser light is directed rearward.

The UV laser light and the guide light joined in the second bend mirror 34 is propagated rearward in that way to thereby be made incident on the first space S1 from the second space S2 via a downstream-side window section 1ib provided in the partitioning section 11. The UV laser light and the guide light reach from the laser-light guiding section 3 to the laser-light scanning section 4.

Drying Agent Dm

As shown in FIG. 18, a housing chamber Sdz is provided on the inner side of the Z chamber Sz. A drying agent is housed in the housing chamber Sdz. Although details are omitted, the housing chamber Sdz communicates with the Z chamber Sz. Moisture can be removed from the Z chamber Sz by the drying agent housed in the housing chamber Sdz Prevention of an Output Decrease of Laser Light (the Laser-Light Output Section 2)

As shown in FIGS. 13 and 16 and the like, optical components with concern about a transmission loss and a reflection loss of laser light such as the first and second bend mirrors 32 and 34 are housed in the Z chamber Sz in the airtight state. On the other hand, the guide light source 35 and the camera 36 with concern about formation of impurities are disposed on the outer side of the Z chamber Sz. With such a configuration, even if impurities are formed in the guide light source 35 and the camera 36, adhesion of the impurities to the optical components can be prevented. Consequently, an output decrease of the laser light can be prevented.

In general, a so-called optical dust collection effect becomes more conspicuous as the wavelength of laser light is shorter. When the optical dust collection effect becomes conspicuous, concern about adhesion of impurities to optical components increases. Considering this concern, in preventing an output decrease of the laser light, it is particularly effective to apply this configuration to a device capable of emitting UV laser light such as the laser machining device L disclosed herein.

Modifications of the Laser-Light Guiding Section 3

In the embodiment, the first bend mirror 32, the Z scanner 33, and the second bend mirror 34 are disposed inside the Z chamber Sz. The guide light source 35 and the camera 36 are disposed outside the Z chamber Sz. However, the laser-light guiding section 3 is not limited to this configuration.

Figure 19:
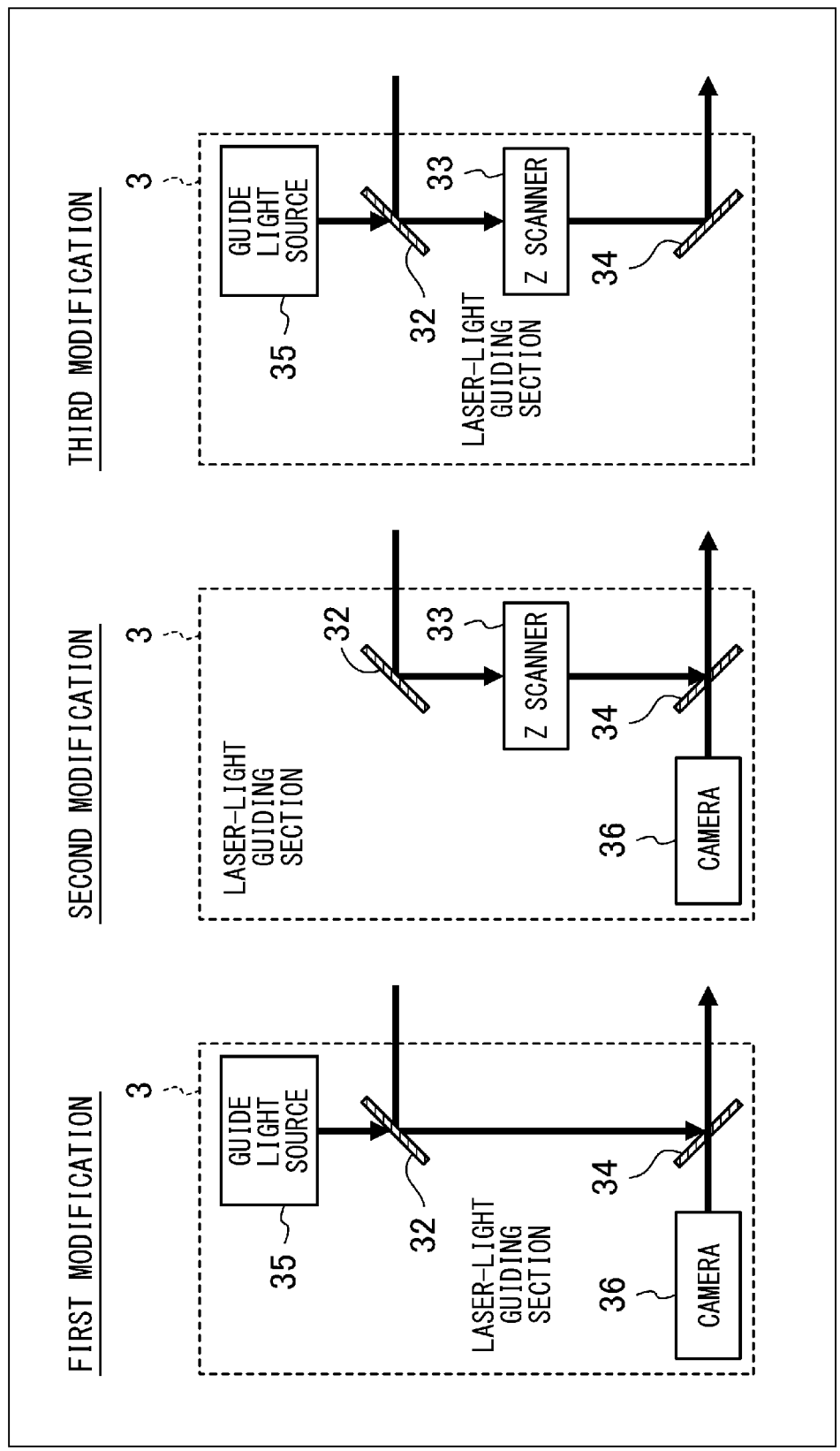
FIG. 19 is a diagram showing first to third modifications of the laser-light guiding section.

FIG. 19 is a diagram showing first to third modifications of the laser-light guiding section 3. As shown in FIG. 19, the Z scanner 33 may be omitted (a first modification), the guide light source 35 may be omitted (a second modification), and the camera 36 may be omitted (a third modification).

Figure 20:
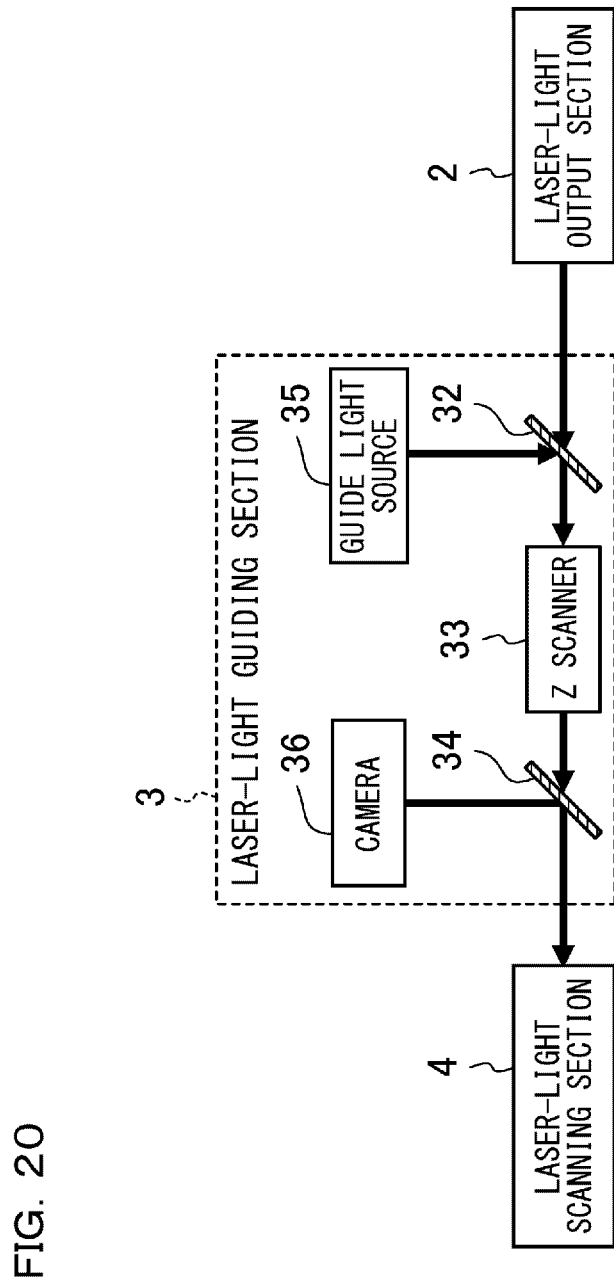
FIG. 20 is a diagram showing a fourth modification of the laser-light guiding section.

The configuration of the optical paths in the laser-light guiding section 3 can also be changed as appropriate. FIG. 20 is a diagram showing a fourth modification of the laser-light guiding section 3. As shown in FIG. 20, the first and second bend mirrors 32 and 34 may be configured to transmit laser light emitted from the laser-light output section 2 and reflect light emitted from the guide light source 35 and light received in the camera 36. Further, in the fourth modification, for example, the guide light source 35 and the first bend mirror 32 can be omitted and the camera 36 and the second bend mirror 34 can be omitted.

Laser-Light Scanning Section 4

The laser-light scanning section 4 is configured to two-dimensionally scan, on the surface of the work W, laser light (UV laser light) emitted from the laser-light output section 2 and guided by the laser-light guiding section 3.

Figure 22:
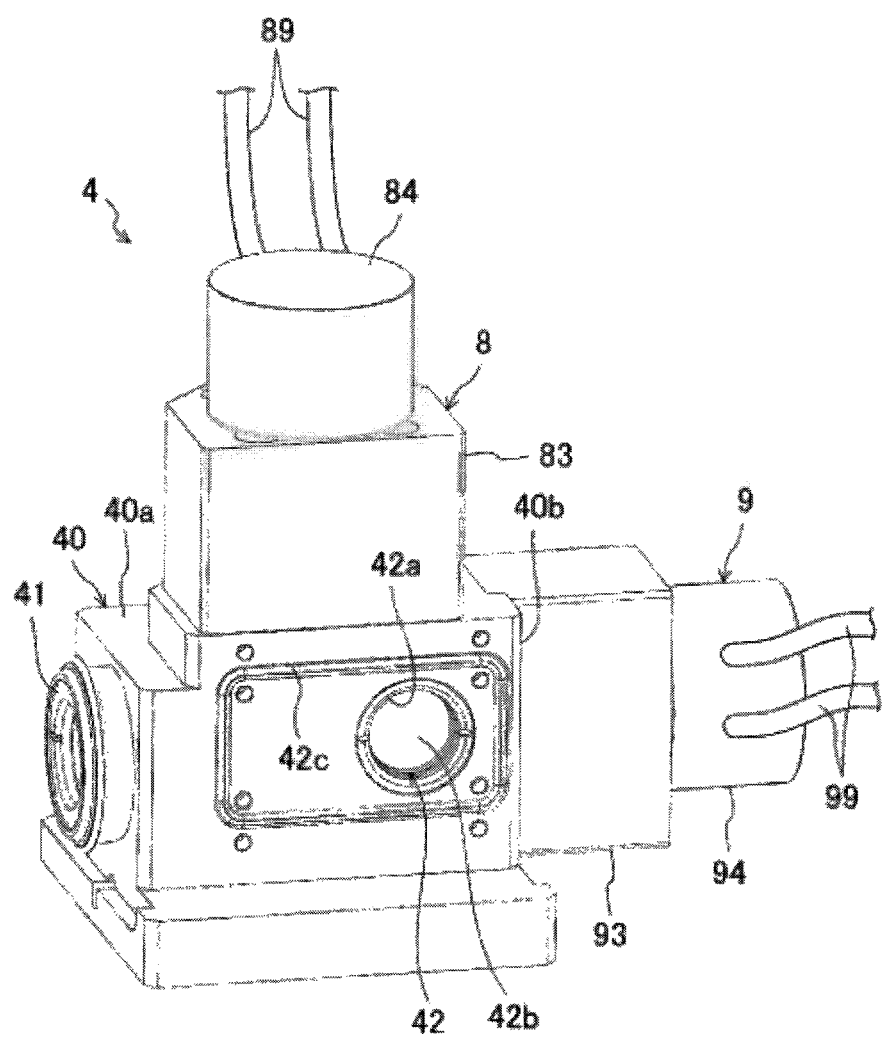
FIG. 22 is a perspective view illustrating the exterior of the laser-light scanning section.
Figure 23:
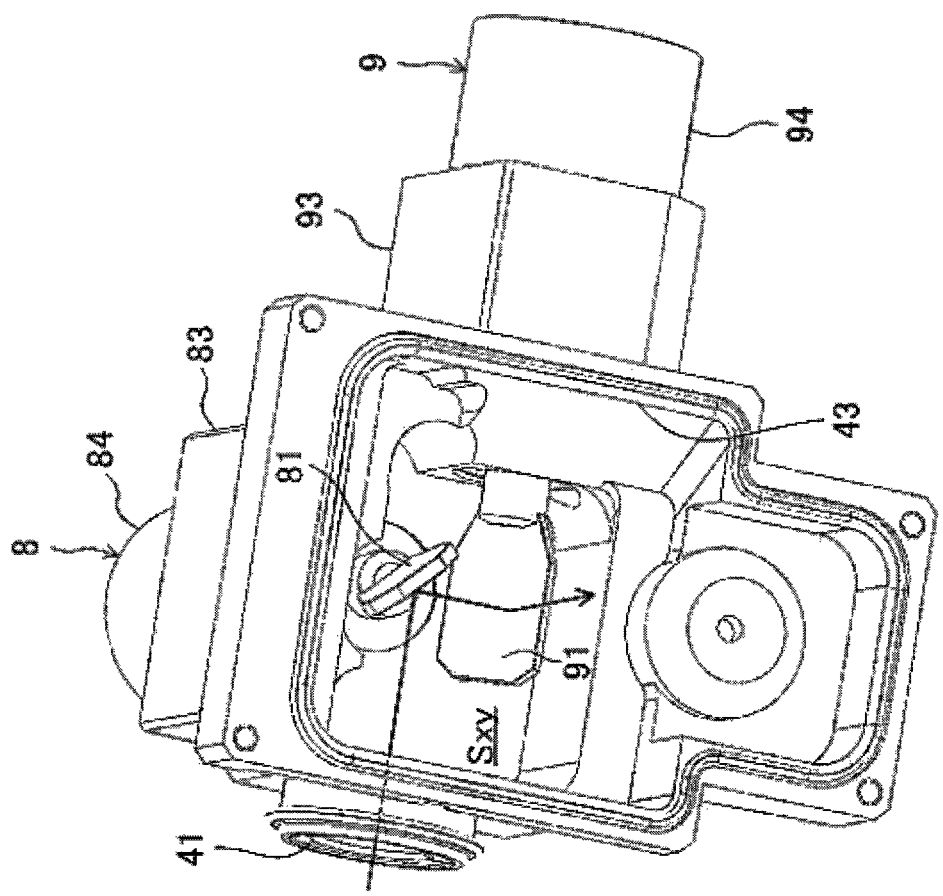
FIG. 23 is a bottom view of the configuration illustrated in FIG. 22.
Figure 24:
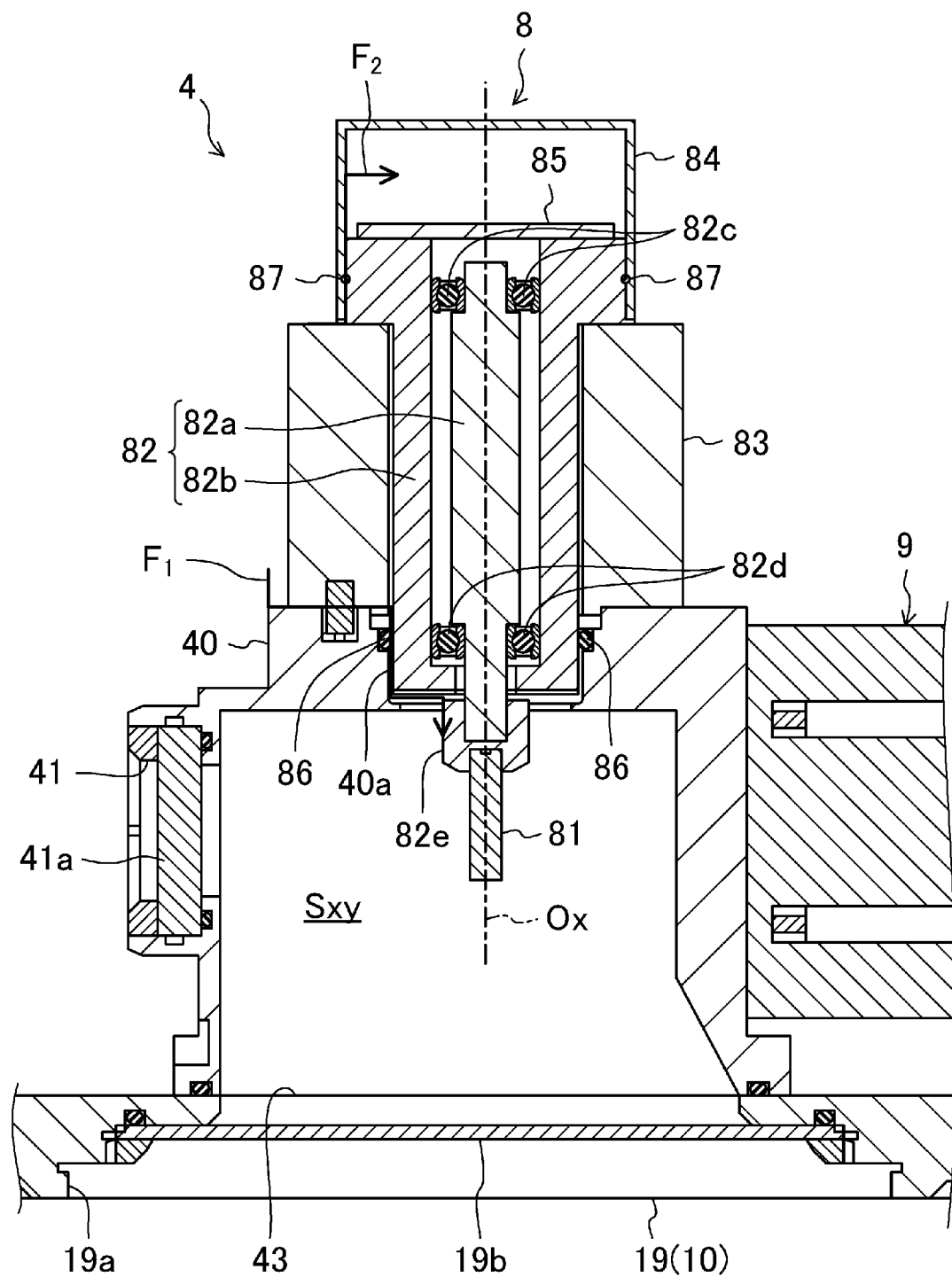
FIG. 24 is a longitudinal sectional view illustrating the configuration of an X scanner.
Figure 25:
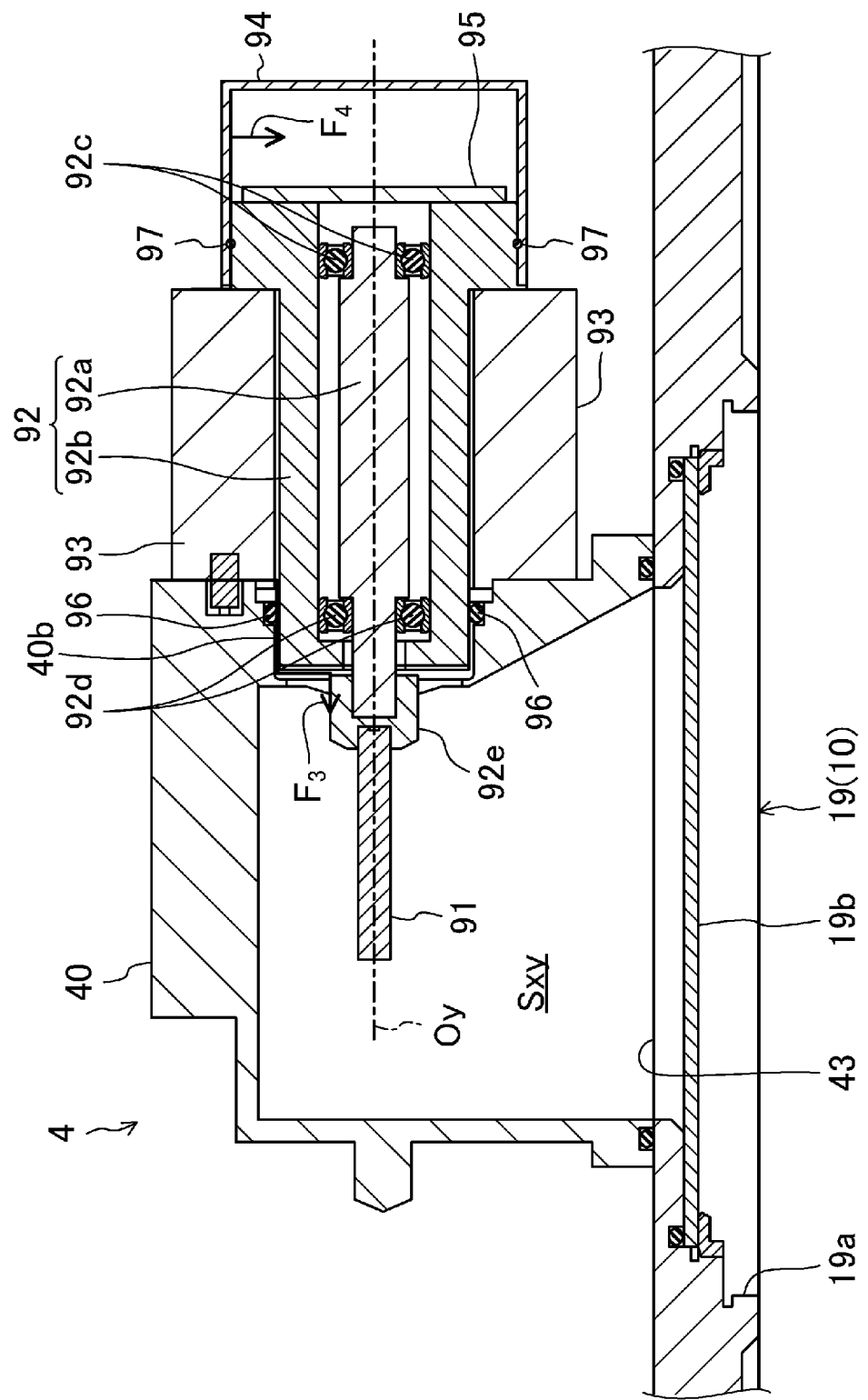
FIG. 25 is a longitudinal sectional view illustrating the configuration of a Y scanner.

FIGS. 21 and 22 are perspective views illustrating the exterior of the laser-light scanning section 4. FIG. 23 is a bottom view of the configuration illustrated in FIG. 22. FIG. 24 is a longitudinal sectional view illustrating the configuration of an X scanner 8. FIG. 25 is a longitudinal sectional view illustrating the configuration of a Y scanner 9.

In an example shown in FIGS. 21 to 25, the laser-light scanning section 4 is configured as a Galvano scanner of a so-called two-axis (an X axis and a Y axis) type. That is, the laser-light scanning section 4 includes an X scanner 8 for scanning laser light in an X direction, a Y scanner 9 for scanning the laser light in a Y direction, and a scanner housing (a housing member) 40 for housing both of a first scanner mirror (hereinafter simply referred to as "X mirror") 81 for the X scanner 8 and a second scanner mirror (hereinafter simply referred to as "Y mirror") 91 for the Y scanner 9.

A scanner chamber Sxy for housing the X mirror 81 and the Y mirror 91 is configured by the scanner housing 40 and the inner bottom surface of the housing 10. The scanner chamber Sxy is optically coupled to the downstream end portion (specifically, the downstream-side window section 11b explained above) of the laser-light guiding section 3 via an incident window section 41 provided on one side of the scanner housing 40. The scanner chamber Sxy is optically coupled to the emission window section 19 provided in the bottom of the housing 10 and a space outside the housing 10 via an opening section 43 provided in the bottom of the scanner housing 40.

Therefore, as indicated by a black arrow in FIG. 23, when UV laser light is made incident on the inside of the scanner chamber Sxy from the incident window section 41, the UV laser light is reflected by the X mirror 81 and the Y mirror 91 (in this example, reflected by the Y mirror 91 after being reflected by the X mirror 81) and emitted to the outside of the scanner chamber Sxy from the opening section 43.

At that time, the UV laser light can be two-dimensionally scanned, for example, on the surface of the work W by operating the X mirror 81 and the Y mirror 91 to adjust angles formed by the mirrors and the UV laser light.

To keep the reflectance of laser light by the X mirror 81 and the Y mirror 91, it is requested to keep airtightness of the scanner chamber Sxy and prevent impurities from intruding into the chamber.

To prevent scattering of the UV laser light due to dew condensation, it is also requested to remove moisture from the scanner chamber Sxy.

Therefore, the laser-light scanning section 4 according to this embodiment is configured to meet the requests described above by contriving a supporting structure for the X scanner 8 and the Y scanner 9 and disposing the drying agent Dm on the inside or the outside of the scanner chamber Sxy.

Components related to the laser-light scanning section 4 are explained focusing on a correspondence relation with the requests.

Scanner Housing 40

In this embodiment, the scanner housing 40 is formed in a substantially cubic box shape. As shown in FIGS. 4 and 21 and the like, in the first space S1, the scanner housing 40 can be disposed around a corner where the lower surface of the housing 10 and the partitioning section 11 cross. Surfaces of the scanner housing 40 are configured to exert various functions in order to hold the X scanner 8 and emit UV laser light.

That is, the upper surface of the scanner housing 40 configures a first holding section (a holding section) 40a including an opening into which a first driving motor 82 configuring the X scanner 8 can be inserted. The first holding section 40a holds the outer circumferential surface of the inserted first driving motor 82 (see FIG. 24).

On the other hand, the rear surface of the scanner housing 40 configures a second holding section (a holding section) 40b including an opening into which a second driving motor 92 configuring the Y scanner 9 can be inserted. The second holding section 40b holds the outer circumferential surface of the inserted second driving motor 92.

The front surface (one surface on the paper surface left side in FIG. 22) of the scanner housing 40 configures the incident window section 41 explained above. Laser light emitted from the laser-light output section 2 and passed through the laser-light guiding section 3 can be made incident on the inside of the scanner chamber Sxy.

The lower surface of the scanner housing 40 includes the opening section 43 explained above. The opening section 43, an opening section (a housing-side emitting section) 19a provided in the bottom of the housing 10, and a transmissive member 19b fit in the opening section 19a and capable of transmitting laser light configure the emission window section 19 (see FIGS. 24 and 25). The emission window section 19 can emit UV laser light made incident via the incident window section 41 to the outside of the housing 10.

The scanner chamber Sxy configured on the inner side of the scanner housing 40 is surrounded and sealed by the first holding section 40a, the second holding section 40b, the incident window section 41, and the emission window section 19 explained above. The X mirror 81 and the Y mirror 91 explained above can be housed in the scanner chamber Sxy.

One surface on the paper surface front side in FIG. 22 of the other two surfaces forming the scanner housing 40 configures a piercing-through section for drying 42. The piercing-through section for drying 42 includes a through-hole 42a for drying the scanner chamber Sxy with the drying agent Dm. The piercing-through section for drying 42, the first holding section 40a, the second holding section 40b, the incident window section 41, and the emission window section 19 surround and seal the scanner chamber Sxy.

As explained in detail below, the drying agent Dm disclosed herein can be disposed on the inside of the scanner chamber Sxy or the inside of a housing chamber Sd communicating with the scanner chamber Sxy explained in detail below.

X Scanner 8

The X scanner 8 includes the X mirror 81 for scanning UV laser light in the X direction (the first direction) crossing the optical axis of UV laser light on the surface of the work W, the first driving motor 82 configured to turnably support the X mirror 81, and a motor holding member 83 configured to hold the first driving motor 82 by coming into contact with a part of the outer circumferential surface of the first driving motor 82.

The X mirror 81 is configured as a so-called Galvano mirror. As shown in FIG. 23, the X mirror 81 reflects UV laser light made incident from the incident window section 41 and guides the UV laser light to the Y mirror 91.

Specifically, the X mirror 81 is a total reflection mirror having a substantially rectangular plate shape. The X mirror 81 is housed on the inside of the scanner chamber Sxy in a state in which the X mirror 81 is supported by a mirror base 82e. The X mirror 81 operates integrally with the mirror base 82e and a rotor 82a of the first driving motor 82. The X mirror 81 can turn around a predetermined rotation axis Ox.

The first driving motor 82 is a Galvano motor configured by a DC motor. The first driving motor 82 includes the rotor 82a configured to be capable of rotating around the rotation axis Ox and support the X mirror 81 at one end in the rotation axis Ox direction, a motor case 82b configured to house the rotor 82a, and bearings 82c and 82d interposed between the rotor 82a and the motor case 82b to axially support the rotor 82a with respect to the motor case 82b.

The rotor 82a is configured to receive an electric current and rotate and extended in a substantially columnar shape along the rotation axis Ox. One end portion in the rotation axis Ox direction (a distal end on the scanner chamber Sxy side) of the rotor 82a projects from the motor case 82b and extends to the inside of the scanner chamber Sxy. The one end portion is inserted into the mirror base 82e having a substantially cylindrical shape. On the other hand, the other end portion (a distal end on the counter scanner chamber Sxy side) located on the opposite side of the one end portion is sunk to the inside of the motor case 82b.

The motor case 82b is formed in a substantially cylindrical shape extending in the rotation axis Ox direction and opened at both ends in the direction. The rotor 82a can be inserted into the inner side of the motor case 82b. The distal end (an opening end) of the motor case 82b is inserted into the first holding section 40a of the scanner housing 40. Consequently, a portion inserted into the first holding section 40a in the outer circumferential surface of the motor case 82b is held by the first holding section 40a.

An opening end on the opposite side of the portion of the motor case 82b inserted into the first holding section 40a is expanded in diameter in a substantial brim shape. In a state in which a circuit board 85 for the first driving motor 82 is placed on the portion expanded in diameter in that way, the portion is covered by a cap-like scanner cover 84 together with the circuit board 85.

The bearings 82c and 82d are disposed between the outer circumferential surface of the rotor 82a and the inner circumferential surface of the motor case 82b. The bearings 82c and 82d support both ends in the longitudinal direction of the rotor 82a.

The motor holding member 83 is formed in a substantially cylindrical shape extending in the rotation axis Ox direction and opened at both ends in the direction. The motor case 82b can be inserted into the inner side of the motor holding member 83. One opening end of the motor holding member 83 can be attached to the first holding section 40a of the scanner housing 40 from above and fixed to the first holding section 40a.

When the motor holding member 83 is fixed to the first holding section 40a, the inner circumferential surface of the opening of the first holding section 40a and the inner circumferential surface of the motor holding member 83 are substantially integrated. A housing space of the motor case 82b is partitioned. When the motor case 82b is inserted into the housing space from above, the portion expanded in diameter in the substantial brim shape in the motor case 82b comes into contact with the motor holding member 83 from above and prevents the motor holding member 83 from coming off. At this time, the outer circumferential surface near the distal end of the motor case 82b is held by the opening of the first holding section 40a in a state in which the outer circumferential surface is inserted into the opening. On the other hand, the outer circumferential surface located further on the counter X mirror 81 side than the distal end comes into contact with the inner circumferential surface of the motor holding member 83. That is, the first holding section 40a holds the outer circumferential surface located further on the X mirror 81 side than a part in contact with the motor holding member 83.

The scanner cover 84 is formed in a bottomed cylindrical shape. The distal end on the counter X mirror 81 side in the motor holding member 83 is inserted into the scanner cover 84. A housing space of the circuit board 85 is partitioned by the scanner cover 84 and the motor case 82b.

The circuit board 85 configures an electric circuit for driving to rotate the first driving motor 82. The circuit board 85 is fixed to an end face on the side expanded in diameter in the substantial brim shape in the motor case 82b. Two harnesses 89 are connected to the circuit board 85 and let out to the outside via the opening provided in the scanner cover 84 (see FIG. 22). Although illustration is omitted, a member for airtightly sealing the inside of the scanner cover 84 such as a seal member made of resin is provided at the circumferential edge of the opening for letting out the harnesses 89.

A first seal member (a seal member) 86 configured to restrict inflow of the air into the scanner chamber Sxy is provided in a part held by the first holding section 40a in the outer circumferential surface of the first driving motor 82.

Specifically, the first seal member 86 is configured from an O-ring made of resin and is disposed to surround the outer circumferential surface of a portion inserted into the opening of the first holding section 40a in the outer circumferential surface of the motor case 82b. By adopting such disposition, the first seal member 86 is sandwiched between the inner circumferential surface of the opening of the first holding section 40a and the outer circumferential surface of the motor case 82b.

On the other hand, separately from such a first seal member 86, a second seal member (a seal member) 87 configured to restrict inflow of the air via a gap between the outer circumferential surface of the rotor 82a and the inner circumferential surface of the motor case 82b is provided. The second seal member 87 according to this embodiment is provided in the part inserted into the scanner cover 84 in the outer circumferential surface of the first driving motor 82.

Specifically, the second seal member 87 is configured from an O-ring made of resin like the first seal member 86 and is disposed to surround the outer circumferential surface of the portion expanded in diameter in the substantial brim shape in the outer circumferential surface of the motor case 82b. By adopting such disposition, the second seal member 87 is sandwiched between the inner circumferential surface near the opening of the scanner cover 84 and the outer circumferential surface of the motor case 82b.

Y Scanner 9

The Y scanner 9 includes the Y mirror 91 for scanning UV laser light in a Y direction (a second direction) crossing the optical axis of the UV laser light, the second driving motor 92 configured to turnably support the Y mirror 91, and a motor holding member 93 configured to hold the second driving motor 92 by coming into contact with a part of the outer circumferential surface of the second driving motor 92.

The Y mirror 91 is configured as a so-called Galvano mirror. As shown in FIG. 23, the Y mirror 91 reflects the UV laser light reflected by the X mirror 81 and guides the UV laser light to the emission window section 19.

Specifically, the Y mirror 91 is a total reflection mirror having a substantially rectangular plate shape. The Y mirror 91 is housed on the inside of the scanner chamber Sxy in a state in which the Y mirror 91 is supported by a mirror base

92e. The Y mirror 91 operates integrally with the mirror base 92e and a rotor 92a of the second driving motor 92. The Y mirror 91 can turn around a predetermined rotation axis Oy.

The second driving motor 92 is a Galvano motor configured from a DC motor. The second driving motor 92 includes the rotor 92a configured to be capable of rotating around the rotation axis Oy and support the Y mirror 91 at one end in the rotation axis Oy direction, a motor case 92b configured to house the rotor 92a, and bearings 92c and 92d interposed between the rotor 92a and the motor case 92b to axially support the rotor 92a with respect to the motor case 92b.

The rotor 92a is configured to receive an electric current and rotate and is extended in a substantially columnar shape along the rotation axis Oy. One end portion in the rotation axis Oy direction (a distal end on the scanner chamber Sxy side in FIG. 23) of the rotor 92a projects from the motor case 92b and extends to the inside of the scanner chamber Sxy. The one end portion is inserted into the mirror base 92e having a substantially cylindrical shape. On the other hand, the other end portion (a distal end on the counter scanner chamber Sxy side in FIG. 25) located on the opposite side of the one end portion is sunk to the inside of the motor case 92b.

The motor case 92b is formed in a substantially cylindrical shape extending in the rotation axis Oy direction and opened at both ends in the direction. The rotor 92a can be inserted into the inner side of the motor case 92b. The distal end (an opening end) of the motor case 92b is inserted into the second holding section 40b of the scanner housing 40. Consequently, a portion inserted into the second holding section 40b in the outer circumferential surface of the motor case 92b is held by the second holding section 40b.

An opening end on the opposite side of the portion of the motor case 92b inserted into the second holding section 40b is expanded in diameter in a substantial brim shape. In a state in which a circuit board 95 for the second driving motor 92 is attached to the portion expanded in diameter in that way, the portion is covered by a cap-like scanner cover 94 together with the circuit board 95.

The bearings 92c and 92d are disposed between the outer circumferential surface of the rotor 92a and the inner circumferential surface of the motor case 92b. The bearings 92c and 92d support both ends in the longitudinal direction of the rotor 92a.

The motor holding member 93 is formed in a substantially cylindrical shape extending in the rotation axis Oy direction and opened at both ends in the direction. The motor case 92b can be inserted into the inner side of the motor holding member 93. One opening end of the motor holding member 93 can be attached to the second holding section 40b of the scanner housing 40 from a side and fixed to the second holding section 40b.

When the motor holding member 93 is fixed to the second holding section 40b, the inner circumferential surface of the opening of the second holding section 40b and the inner circumferential surface of the motor holding member 93 are substantially integrated. A housing space of the motor case 92b is partitioned. When the motor case 92b is inserted into the housing space from a side, the portion expanded in diameter in the substantial brim shape in the motor case 92b comes into contact with the motor holding member 93 from a side and prevents the motor holding member 93 from coming off. At this time, the outer circumferential surface near the distal end of the motor case 92b is held by the opening of the second holding section 40b in a state in which the outer circumferential surface is inserted into the opening.

The outer circumferential surface located further on the counter Y mirror 91 side than the distal end comes into contact with the inner circumferential surface of the motor holding member 93. That is, the second holding section 40b holds the outer circumferential surface located further on the Y mirror 91 side than a part in contact with the motor holding member 93.

The scanner cover 94 is formed in a bottomed cylindrical shape. The distal end on the counter Y mirror 91 side in the motor holding member 93 is inserted into the scanner cover 94. A housing space of the circuit board 95 is partitioned by the scanner cover 94 and the motor case 92b.

The circuit board 95 configures an electric circuit for driving to rotate the second driving motor 92. The circuit board 95 is fixed to an end face on the side expanded in diameter in the substantial brim shape in the motor case 92b. Two harnesses 99 are connected to the circuit board 95 and let out to the outside via the opening provided in the scanner cover 94 (see FIG. 22). Although illustration is omitted, a member for airtightly sealing the inside of the scanner cover 94 such as a seal member made of resin is provided at the circumferential edge of the opening for letting out the harnesses 99.

As in the X scanner 8, a first seal member (a seal member) 96 configured to restrict inflow of the air into the scanner chamber Sxy is provided in a part held by the second holding section 40b in the outer circumferential surface of the second driving motor 92.

Specifically, the first seal member 96 for the Y scanner 9 is generally configured the same as the first seal member 86 for the X scanner 8. That is, the first seal member 96 for the Y scanner 9 is configured from an O-ring made of resin and is disposed to surround the outer circumferential surface of a portion inserted into the opening of the second holding section 40b in the outer circumferential surface of the motor case 92b. By adopting such disposition, the first seal member 96 is sandwiched between the inner circumferential surface of the opening of the second holding section 40b and the outer circumferential surface of the motor case 92b.

On the other hand, separately from such a first seal member 96, a second seal member (a seal member) 97 configured to restrict inflow of the air via a gap between the outer circumferential surface of the rotor 92a and the inner circumferential surface of the motor case 92b is provided. The second seal member 97 according to this embodiment is provided in a part inserted into the scanner cover 94 in the outer circumferential surface of the second driving motor 92.

Specifically, the second seal member 97 is configured from an O-ring made of resin like the first seal member 96 and is disposed to surround the outer circumferential surface of the portion expanded in diameter in the substantial brim shape in the outer circumferential surface of the motor case 92b. By adopting such disposition, the second seal member 97 is sandwiched between the inner circumferential surface near the opening of the scanner cover 94 and the outer circumferential surface of the motor case 92b.

Prevention of an Output Decrease of Laser Light (the Laser-Light Scanning Section 4)

As shown in FIGS. 24 and 25, slight gaps could be formed in parts held by the first and second holding sections 40a and 40b in the outer circumferential surfaces of the first and second driving motors 82 and 92. Therefore, as indicated by arrows F1 to F4 in FIGS. 24 and 25, impurities are likely to intrude into the scanner chamber Sxy from such gaps.

However, with the configuration explained above, by providing the first and second seal members 86, 87, 96, and 97 in such parts, it is possible to prevent impurities from intruding into the scanner chamber Sxy, which is a space for turning the X mirror 81 and the Y mirror 91, without using a special component such as a vacuum bearing. Consequently, it is possible to prevent an output decrease of laser light while reducing manufacturing cost.

Modifications of the Galvano Scanner

In the embodiment, the configuration is explained in which the first seal members 86 and 96 and the second seal members 87 and 97 are respectively provided in the X scanner 8 and the Y scanner 9. However, the configuration of the seal members can be modified as explained below.

Modifications of the Y scanner are explained below. The modifications disclosed herein can be applied to the X scanner as well.

Figure 26:
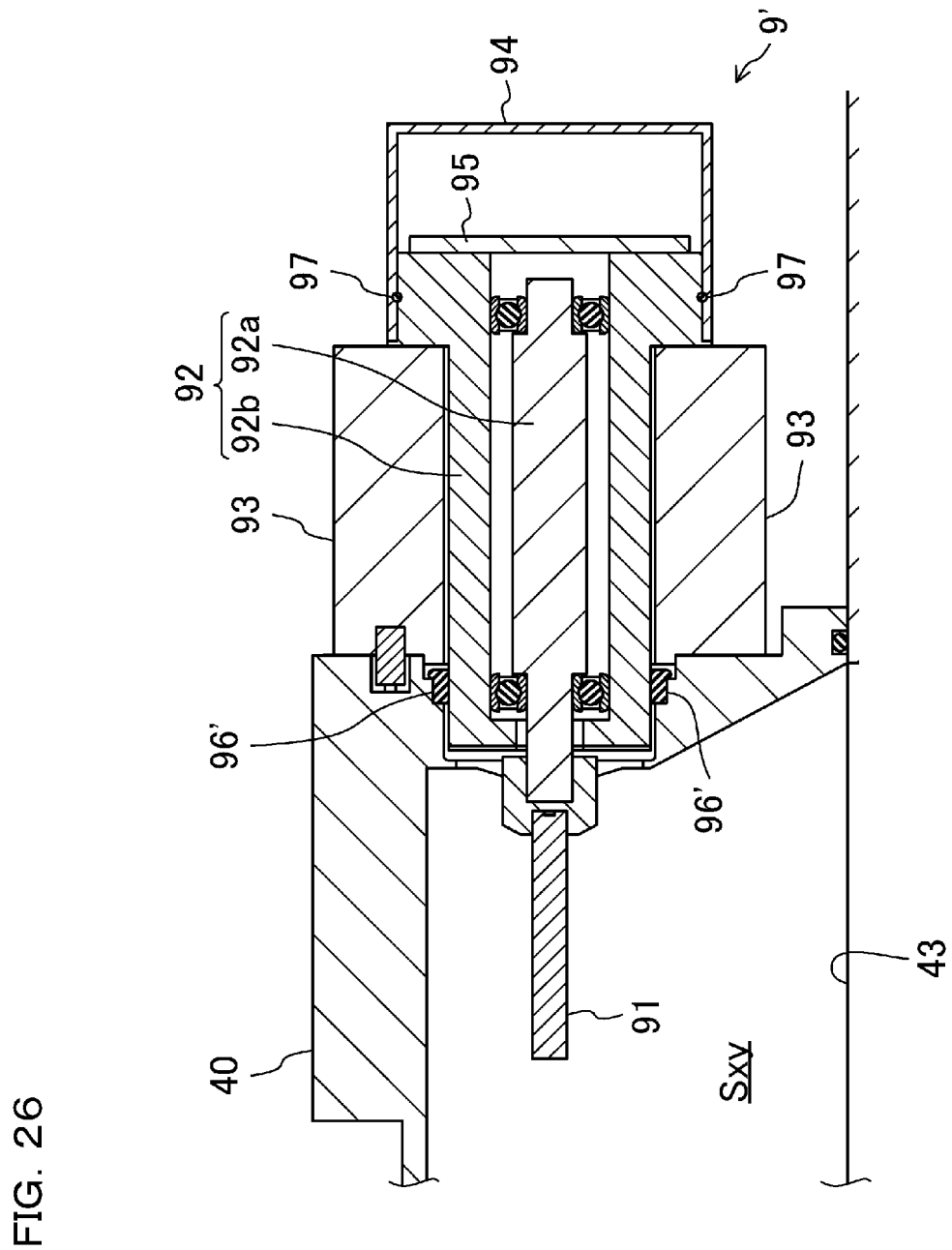
FIG. 26 is a diagram corresponding to FIG. 25 showing a first modification of the Y scanner.

FIG. 26 is a diagram corresponding to FIG. 25 showing a first modification of the Y scanner. As in a Y scanner 9' shown in FIG. 26, a gap between the second holding section 40b and the motor case 92b can be sealed by resin functioning as a first seal member 96'.

Figure 27:
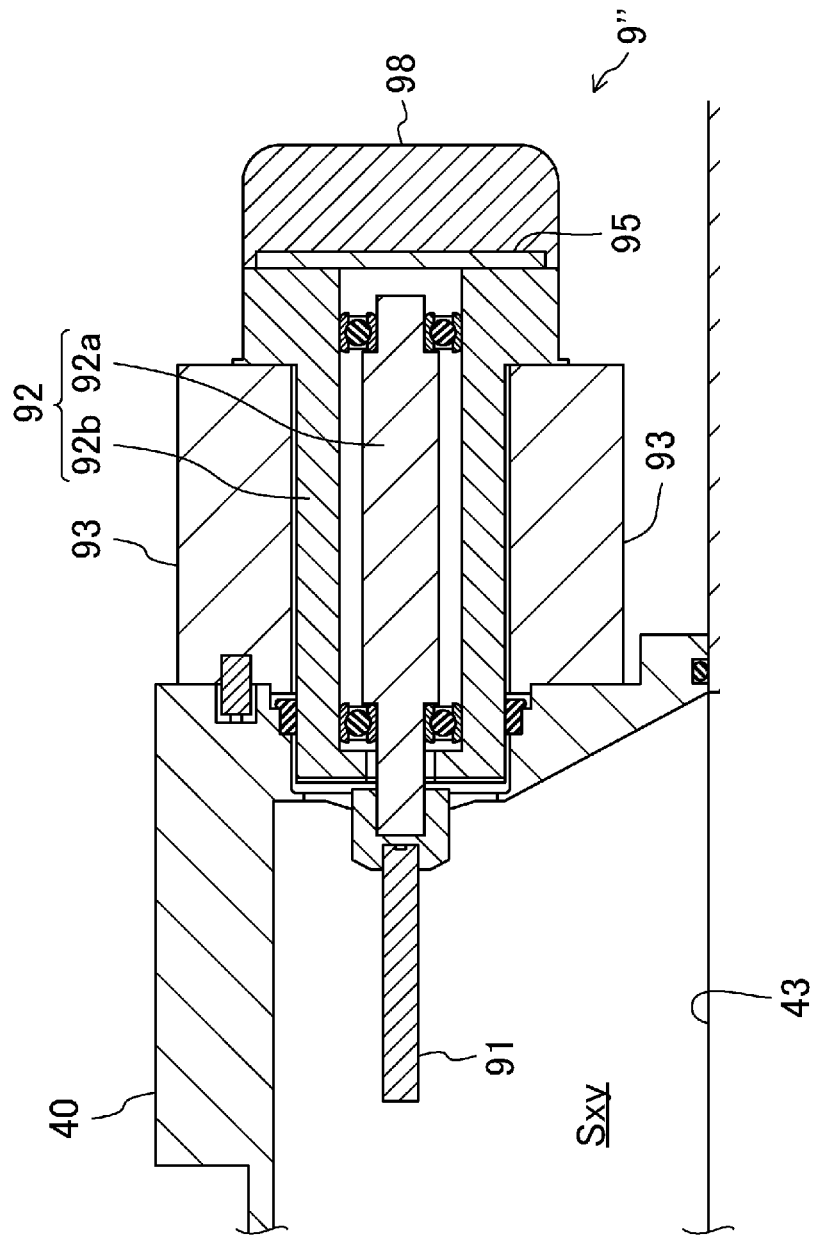
FIG. 27 is a diagram corresponding to FIG. 25 showing a second modification of the Y scanner.

FIG. 27 is a diagram corresponding to FIG. 25 showing a second modification of the Y scanner. As in the Y scanner 9' shown in FIG. 27, the gap between the rotor 92a and the motor case 92b may be sealed by resin functioning as a second seal member without providing a scanner cover.

In the first place, in the embodiment, the configuration is explained in which both of the X scanner 8 and the Y scanner 9 are attached to the scanner housing 40. However, the X scanner 8 and the Y scanner 9 are not limited to such a configuration in using at least the first seal members 86 and 96 and the second seal members 87 and 97.

For example, at least one of the X scanner 8 and the Y scanner 9 may be attached to the scanner housing 40. The first seal member may be applied to the one scanner.

Modifications of the Scanner Chamber Sxy

In the embodiment, the scanner chamber Sxy is surrounded by the first holding section 40a, the second holding section 40b, the incident window section 41, the emission window section 19, and the piercing-through section for drying 42. The emission window section 19 is configured by the opening section 43 provided in the bottom surface of the scanner housing 40, the opening section 19a provided in the bottom of the housing 10, and the transmissive member 19b fit in the opening section 19a. However, the emission window section 19 is not limited to this configuration.

Figure 28:
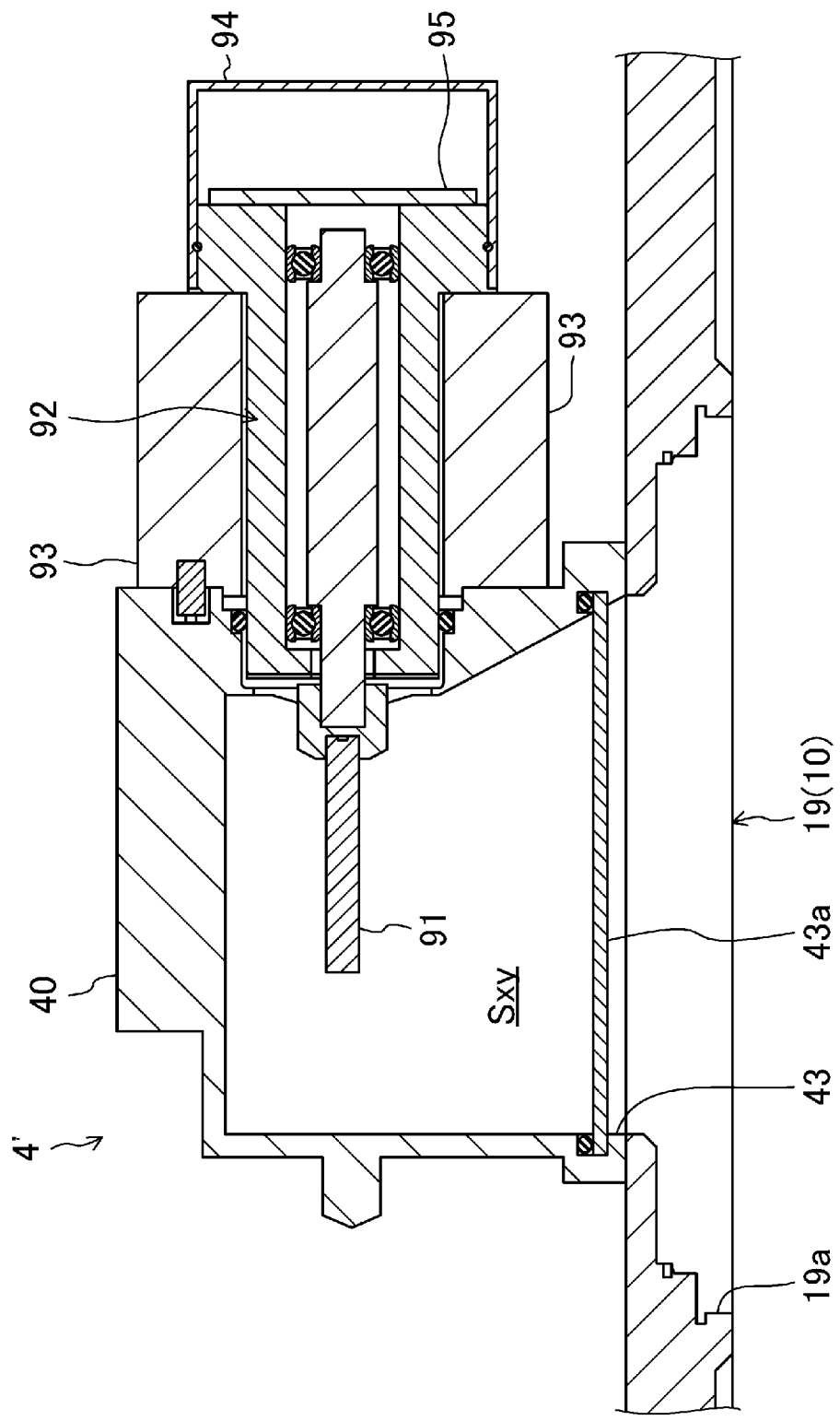
FIG. 28 is a diagram showing a modification of a scanner housing.

FIG. 28 is a diagram showing a modification of the scanner housing. As shown in FIG. 28, the emission window section 19 may be configured by fitting a transmissive member 43a in the opening section 43 of the scanner housing 40.

Housing Chamber Sd

As explained above, the drying agent Dm replaceable from the outside can be disposed in the scanner chamber Sxy or the housing chamber Sd communicating with the scanner chamber Sxy. In an embodiment illustrated below, the housing chamber Sd is configured on the outside of the scanner chamber Sxy. However, as in a modification explained below, a space for disposing the drying agent Dm can be formed on the inside of the scanner chamber Sxy (hereinafter, such a space is denoted by a sign "Sd'").

Figure 29:
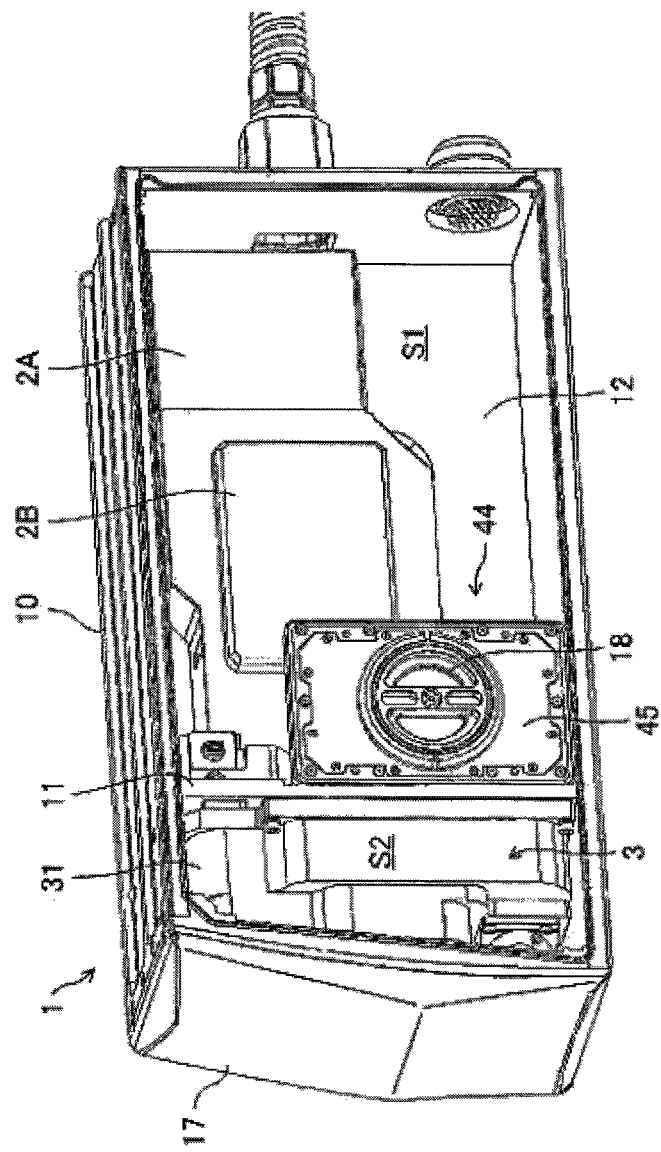
FIG. 29 is a perspective view illustrating the disposition of a drying agent housing.
Figure 30:
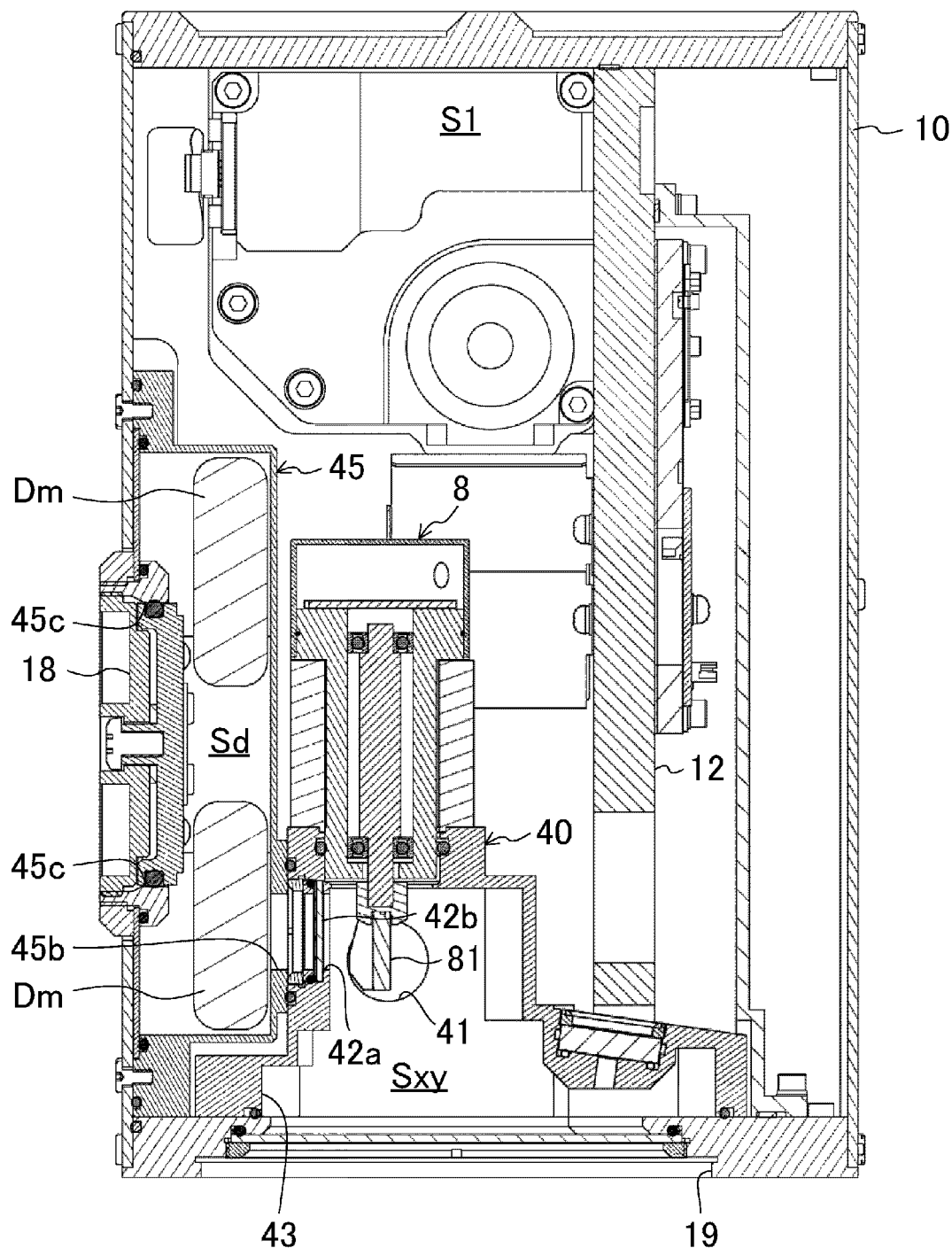
FIG. 30 is a longitudinal sectional view illustrating the configuration of a housing chamber and a scanner chamber.
Figure 31:
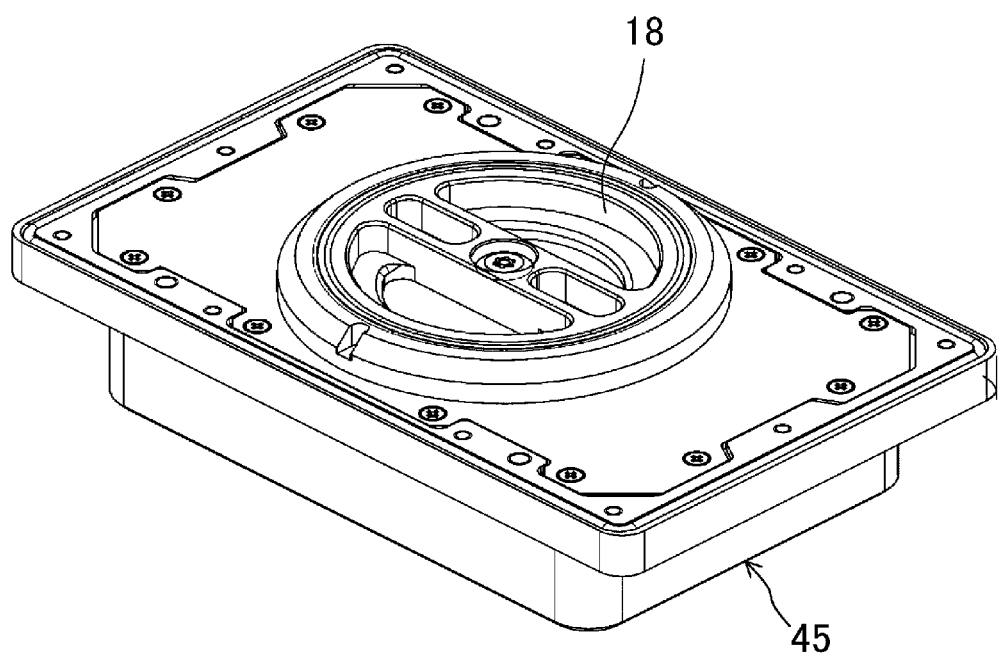
FIG. 31 is a perspective view illustrating the exterior of the drying agent housing.
Figure 32:
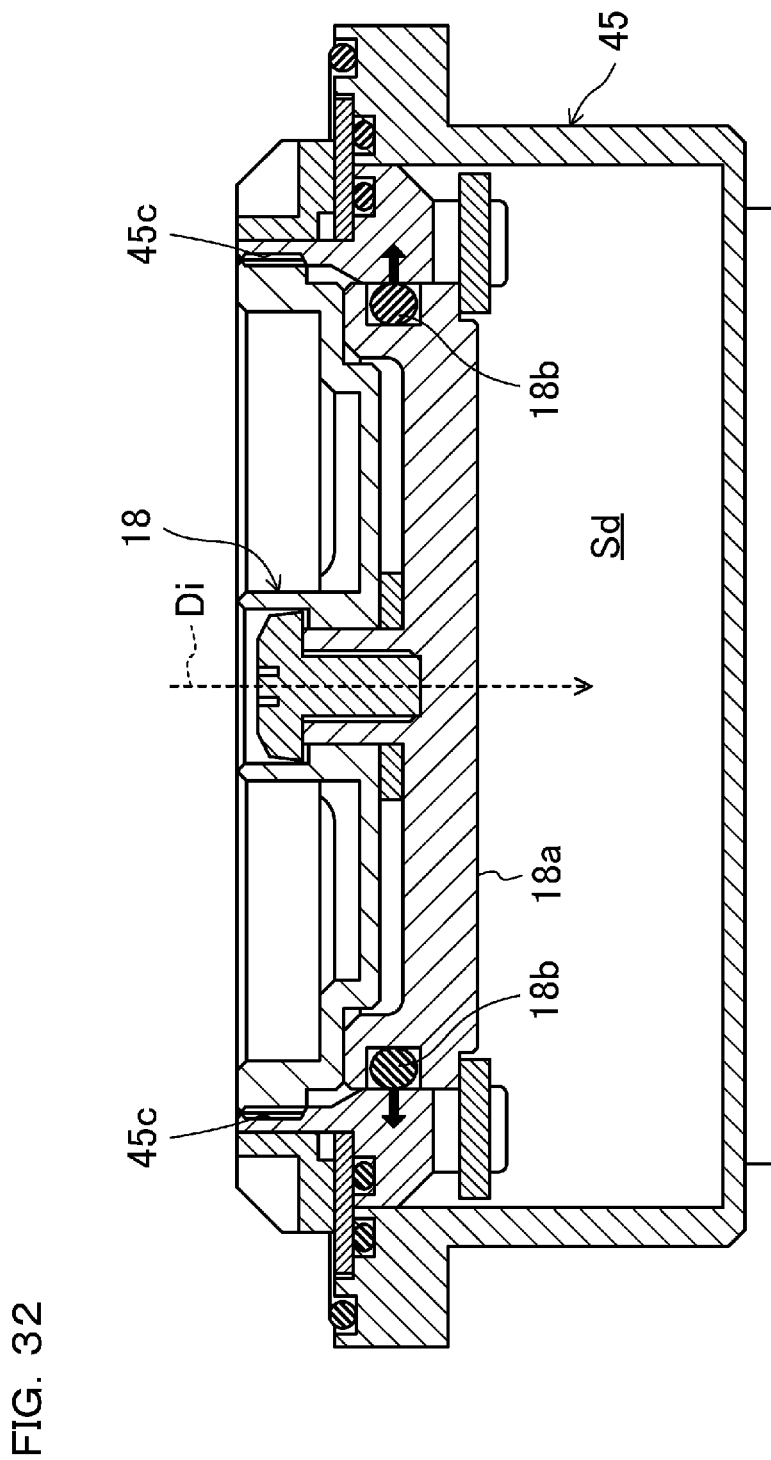
FIG. 32 is an explanatory diagram illustrating a sealing structure by a replacement lid section.

FIG. 29 is a perspective view illustrating disposition of a drying agent housing 45. FIG. 30 is a longitudinal sectional view illustrating the configuration of the housing chamber Sd and the scanner chamber Sxy. FIG. 31 is a perspective view illustrating the exterior of the drying agent housing 45. FIG. 32 is an explanatory diagram illustrating a sealing structure by the replacement lid section 18.

In this configuration example, the housing chamber Sd and the scanner chamber Sxy are adjacent to each other in the housing 10. The housing chamber Sd communicates with the scanner chamber Sxy through the through-hole 42a in the piercing-through section for drying 42 explained above. The housing chamber Sd is configured such that the drying agent Dm is replaced through an opening (a replacement opening section 45c explained below) separate from the through-hole 42a. The housing chamber Sd is opened by the replacement lid section 18.

That is, as shown in FIG. 30, the scanner chamber Sxy is interposed between the left side surface (a side surface on the paper surface left side in FIG. 30) of the housing 10 and the base plate 12. The housing chamber Sd is interposed between such a scanner chamber Sxy and the left side surface of the housing 10.

Specifically, the housing chamber Sd is partitioned by the drying agent housing 45 capable of housing the drying agent Dm. The drying agent housing 45 is formed in a rectangular shallow box shape. In the first space S1, the drying agent housing 45 is disposed at a corner where the lower surface of the housing 10 and the partitioning section 11 cross.

A through-hole 45b shown in FIG. 30 is opened in the rear surface (a surface on the other side in the latitudinal direction) of the drying agent housing 45. In a state in which both of the drying agent housing 45 and the scanner housing 40 are fixed to the housing 10, the through-hole 45b and the through-hole 42a of the scanner housing 40 are connected. The housing chamber Sd and the scanner chamber Sxy communicate.

A filter 42b is attached to the through-hole 42a of the scanner housing 40. Impurities formed from the drying agent Dm can be prevented from intruding into the scanner chamber Sxy from the housing chamber Sd.

As shown in FIG. 22, the piercing-through section for drying 42 of the scanner housing 40 includes a seal member 42c configured to cover the periphery of the through-hole 42a. A gap between the through-hole 42a of the scanner housing 40 and the through-hole 45b of the drying agent housing 45 can be sealed.

The front surface of the drying agent housing 45 is sealed by the replacement lid section 18 shown in FIG. 32 to be capable of being opened and closed. Specifically, a replacement opening section 45c communicating with the inside of the housing chamber Sd is drilled in the front surface (a surface on one side in the latitudinal direction) of the drying agent housing 45. The replacement opening section 45c is an opening having a substantially circular shape in section. A part of the inner circumferential surface (the inner surface) of the replacement opening section 45c is threaded in a female screw shape.

The replacement lid section 18 includes an inserting section 18a capable of closing the replacement opening section 45c by being inserted into the replacement opening section 45c. Specifically, the inserting section 18a is formed in a substantially cylindrical shape. A part of the outer circumferential surface (the outer surface) of the inserting section 18a is formed to be screwed in the threaded portion in the replacement opening section 45c. A seal member 18b is provided on the outer surface of a portion located on the distal end side in an inserting direction (see an arrow Di in FIG. 32) with respect to the part screwed in the threaded portion in the replacement opening section 45c.

The seal member 18b is configured from an O-ring made of resin and is fit in a circumferential groove section provided on the outer surface of the inserting section 18a. In a state in which the replacement lid section 18 is detached from the replacement opening section 45c, the seal member 18b is slightly larger in diameter than the inner diameter of the replacement opening section 45c. Therefore, when the inserting section 18a of the replacement lid section 18 is inserted into the replacement opening section 45c, the seal member 18b swells in an outward direction (see a black arrow in FIG. 32) orthogonal to the inserting direction Di to thereby adhere to the inner surface of the replacement opening section 45c.

The drying agent Dm is obtained by packing a substance capable of absorbing moisture in the air such as silica gel or lime. The drying agent Dm can not only remove moisture from the inside of the housing chamber Sd but also remove moisture from the inside of the scanner chamber Sxy through the piercing-through section for drying 42. When moisture removal performance by the drying agent Dm is deteriorated as a result of using the drying agent Dm for a predetermined period, the drying agent Dm can be replaced from the outside by detaching the replacement lid section 18.

Prevention of an Output Decrease of Laser Light Due to Dew Condensation

As shown in FIG. 22, by setting one surface of the scanner housing 40 as the piercing-through section for drying 42, it is possible to cause the housing section Sd and the scanner chamber Sxy to communicate via the through-hole 42a and insert and remove the drying agent Dm via the through-hole 42a. Therefore, it is possible to remove moisture from the inside of the scanner chamber Sxy and prevent an output decrease of the laser light due to dew condensation.

Modifications Related to Housing of the Drying Agent Dm

In the embodiment, the configuration is explained in which the housing chamber Sd is provided on the outside of the scanner chamber Sxy and the drying agent Dm is housed on the inside of the housing chamber Sd. In this embodiment, the piercing-through section for drying 42 surrounding the scanner chamber Sxy is provided to cause the scanner chamber Sxy and the housing chamber Sd to communicate. However, the configuration of the housing chamber Sd and the piercing-through section for drying 42 is not limited to this.

For example, a space equivalent to the housing chamber Sd may be provided on the inside of the scanner chamber Sxy. In this case, the through-hole 42a in the piercing-through section for drying 42 functions as an opening for replacing the drying agent Dm.

Even when the housing chamber Sd is provided on the outside of the scanner chamber Sxy, a housing method for the drying agent Dm can be changed as appropriate by, for example, contriving the structure of the replacement lid section.

Figure 33:
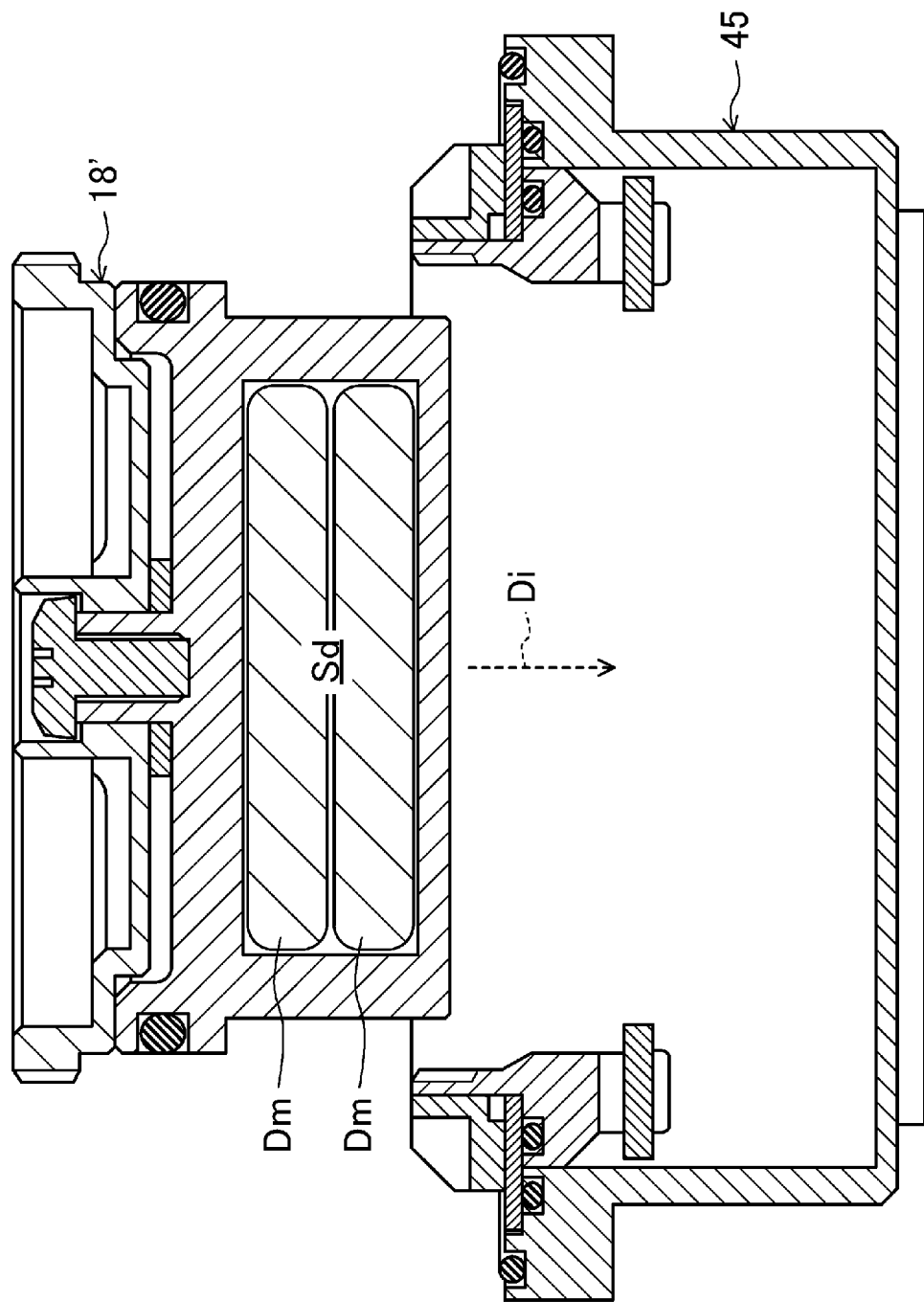
FIG. 33 is a diagram showing a modification of the replacement lid section.

FIG. 33 is a diagram showing a modification of a replacement lid section 18'. As shown in FIG. 33, the replacement lid section 18' itself may be used as a drying agent housing (a housing) for partitioning the housing chamber Sd. In this case, the replacement lid section 18' including the drying agent Dm can be attached to and detached from the housing.

Any one of the first holding section 40a, the second holding section 40b, the incident window section 41, and the emission window section 19 configured to surround the scanner chamber Sxy may be used as the piercing-through section for drying.

Figure 34:
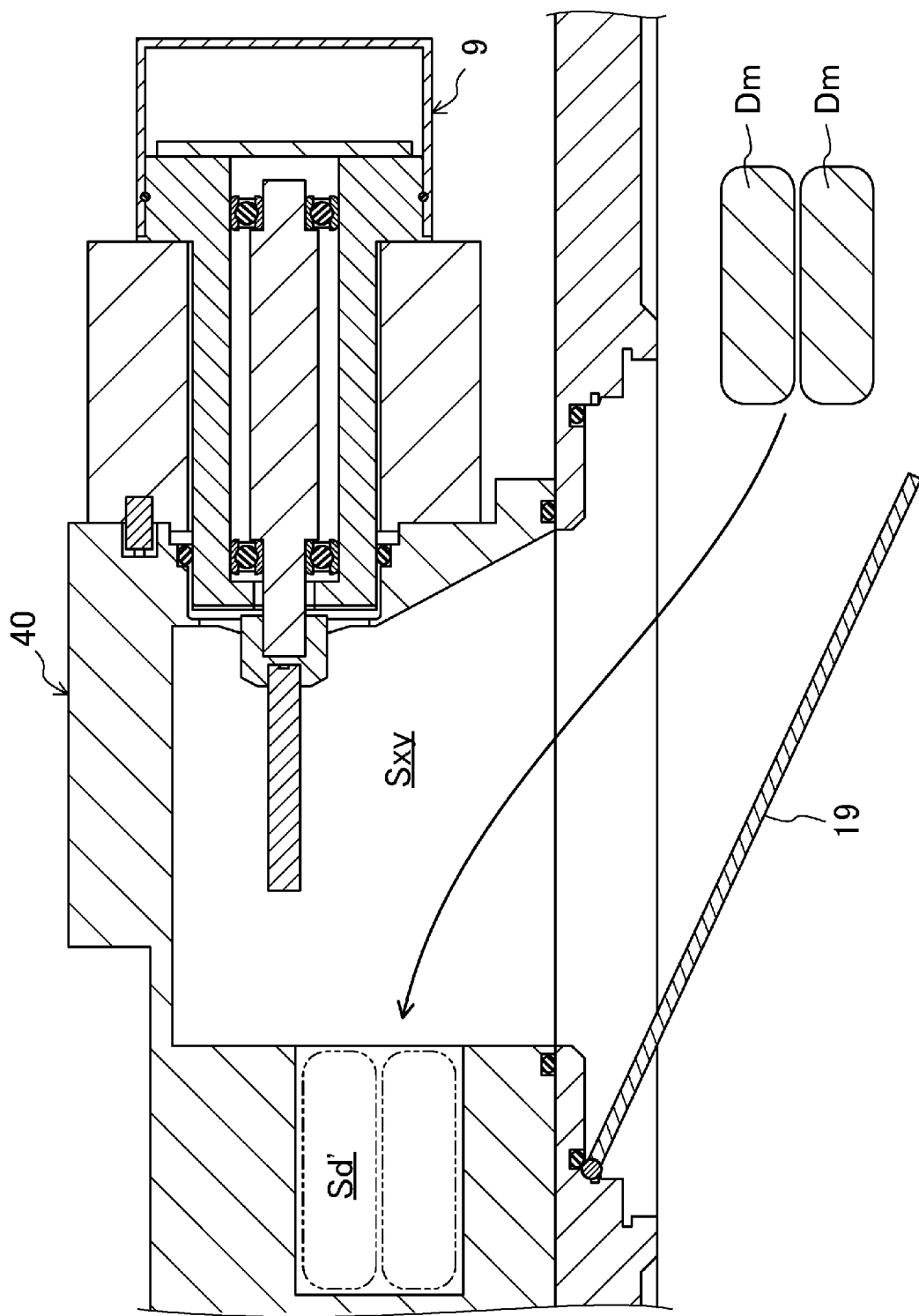
FIG. 34 is a diagram showing a modification of the housing chamber and the scanner chamber.

FIG. 34 is a diagram showing a modification of the periphery of the scanner chamber Sxy. As shown in FIG. 34, a space Sd' equivalent to the housing chamber may be provided on the inside of the scanner chamber Sxy. The emission window section 19 may be configured to be capable of being opened and closed from the outside.

Control of the Marker Head 1 by the Marker Controller 100

Control related to output adjustment of laser light and control performed during a stop of the laser machining device L in control of the marker head 1 by the marker controller 100 are explained below in order.

Output Adjustment Corresponding to a Pulse Frequency

In general, when laser machining is performed, a target output of laser light is sometimes changed in order to adjust, for example, color development of printing in laser marking and cutting speed in laser cutting.

In this case, as a method of achieving a changed target output, it is conceivable to adjust an output of a fundamental wave by adjusting a driving current supplied to the excitation light source 111.

That is, for example, when a current value of a driving current is reduced, an output of excitation light generated in the excitation light source 111 decreases. An output of a fundamental wave generated in the laser medium 25 also decreases. Consequently, it is possible to reduce an output of laser light generated on the basis of the fundamental wave.

In this way, a positive correlation is present between the magnitude of the driving current and the output of the laser light. Therefore, by storing, in advance, a correspondence relation between a target output of laser light and a driving current that should be supplied to the excitation light source 111 as in the table storing section 114 explained above, it is possible to determine a driving current corresponding to an output desired by the user using the correspondence relation.

Incidentally, when a configuration including the Q switch 23 is adopted as in the laser-light output section 2 according to this embodiment, as control parameters for laser light, there is a Q switching frequency (the pulse frequency explained above) indicating the number of times ON and OFF of the Q switch 23 are switched in one second, that is, the number of times pulsed oscillation is performed per unit time.

However, when the Q switch frequency is changed, a period in which the Q switch 23 is switched to the ON state increases or decreases. Consequently, a state of an inverted distribution in the laser medium 25 fluctuates. Therefore, the number of photons induced and emitted when excitation light is made incident on the laser medium 25 increases or decreases. An output of laser light fluctuates. Therefore, to perform appropriate output setting, it is insufficient to simply determine a driving current as explained above.

In addition, in general, a relation between the output of the laser light and the Q switch frequency changes according to the specifications of the excitation light source 111, a state of optical components, and the like. Therefore, there is an individual difference for each laser machining device in fluctuation of an output due to the Q switch frequency.

Therefore, a correspondence-relation storing section according to this embodiment not only stores a correspondence relation between a target output of laser light and a driving current that should be supplied to the excitation light source 111 but also stores the correspondence relation in association with the magnitude of a pulse frequency.

The excitation-light-source driving section 112 supplies, on the basis of the target output and the pulse frequency stored in the condition-setting strong section 102 and the correspondence relation stored in the correspondence-relation storing section, a driving current corresponding to the pulse frequency to the excitation light source 111.

In particular, when the table storing section 114 is used as the correspondence-relation storing section as in the configuration example shown in FIG. 1, the table storing section 114 can store, for each different pulse frequency, a current table that links a target output and a driving current.

In this case, when the user sets both of a target output and a pulse frequency as machining conditions by operating the marker controller 100 via the operation terminal 200 functioning as the setting section, the setting is stored in the condition-setting storing section 102. In the operation of the laser machining device L, when receiving a control signal concerning each of the target output and the pulse frequency, the excitation-light-source driving section 112 reads a current table related to the pulse frequency set as the machining condition from the table storing section 114 and determines a driving current on the basis of a correspondence relation between the target output and the driving current.

The number of pulse frequencies at the time when "a current table is stored for each different pulse frequency" only has to be at least two or more. In this case, a pulse frequency other than the pulse frequency stored in association with the current table can be complemented using the current table related to the pulse frequency associated with the correspondence relation.

The control section 101 may calibrate the correspondence relation stored in the table storing section 114 on the basis of a detection result of the power monitor explained above. For example, when the target output set as the machining condition is smaller than a measurement value of an output detected by the power monitor, the control section 101 increases the driving current corresponding to the target output. The control section 101 may perform such calibration every time the laser machining device L is started or in each predetermined period.

Specific Example of Proper Uses of Current Tables

Figure 35:
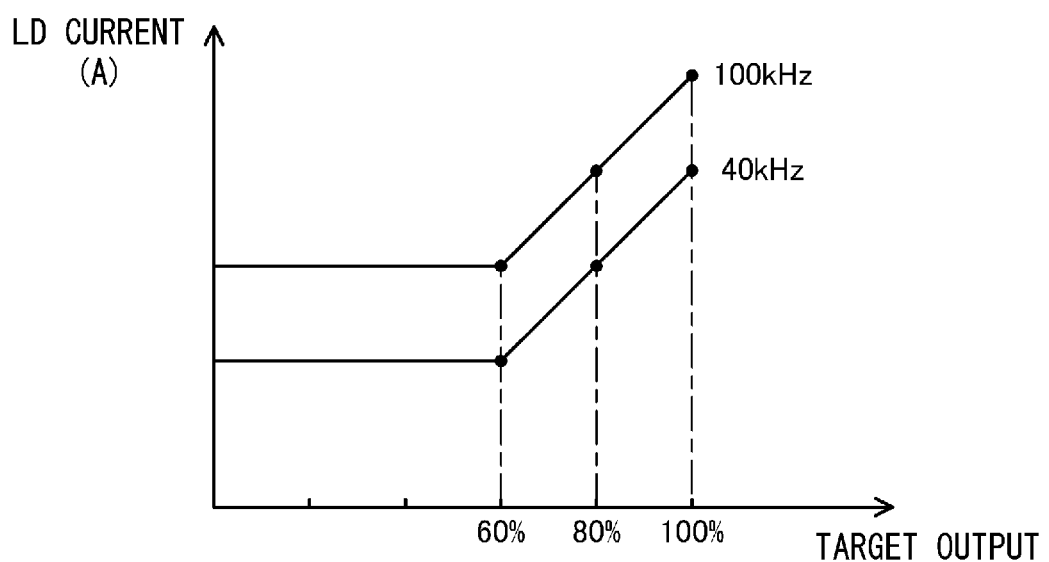
FIG. 35 is a diagram illustrating a correspondence relation between a target output and a driving current.
Figure 36:
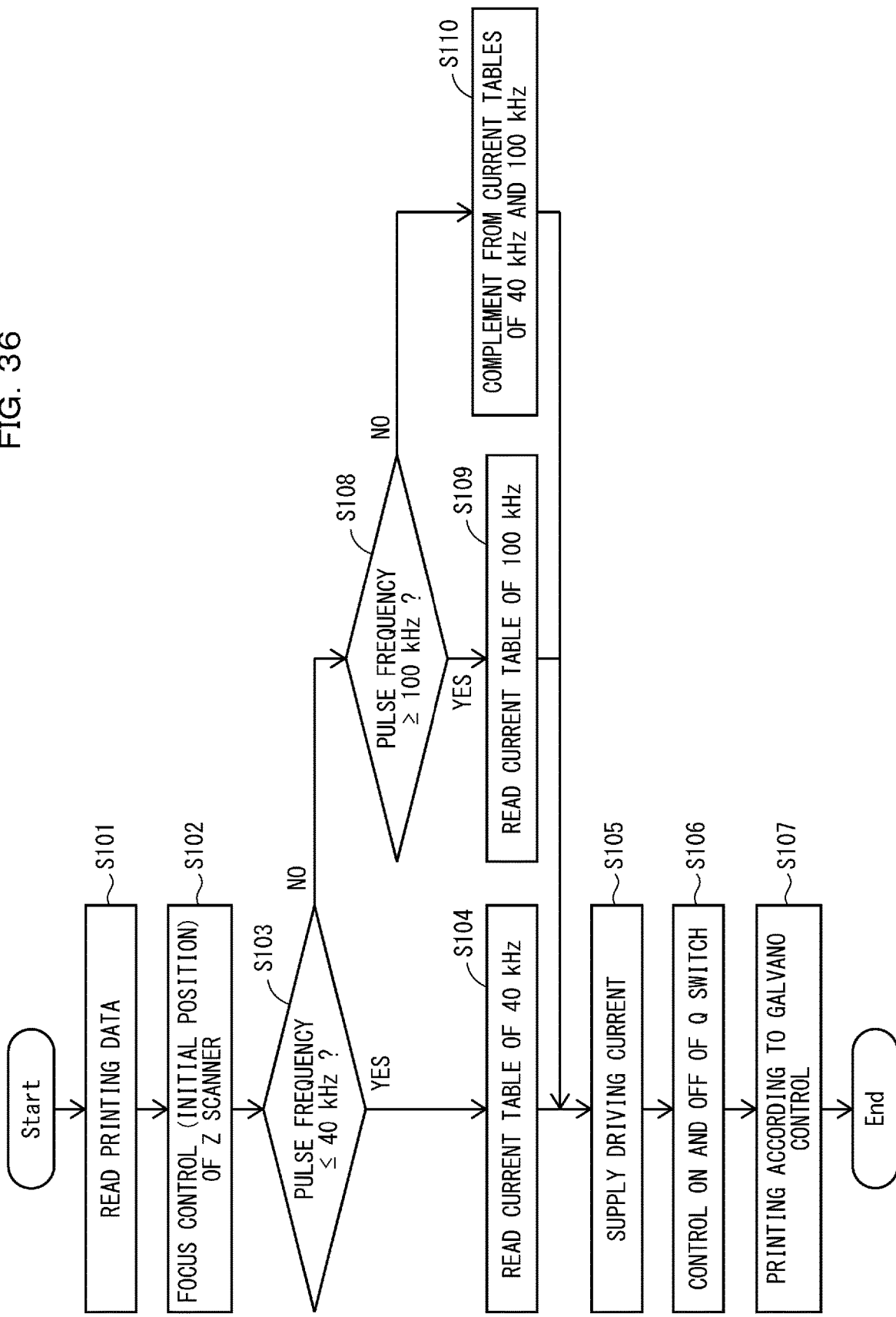
FIG. 36 is a flowchart illustrating proper uses of current tables corresponding to pulse frequencies.

FIG. 35 is a diagram illustrating a correspondence relation between a target output and a driving current. FIG. 36 is a flowchart illustrating proper uses of current tables corresponding to pulse frequencies. In an example shown in FIG. 35, a percentage is used as a unit of the target output. However, the unit of the target output is not limited to the percentage. For example, electric power (watt) of laser light may be directly used.

As shown in FIG. 35, two kinds of current tables are stored in the table storing section 114 according to this embodiment. Specifically, the current tables are stored in a state in which pulse frequencies are respectively associated with 40 kHz and 100 kHz. As it is seen from FIG. 35, a driving current (an LD current) is larger when the pulse frequency is high than when the pulse frequency is low.

As shown in FIG. 36, for example, when the laser machining device L is started to machine the work W, the control section 101 reads a marking pattern set via the operation terminal 200 and printing data including the target output and the pulse frequency serving as the machining conditions (step S101). Data related to the machining conditions among the printing data read at this time is input to the excitation-light-source driving section 112 from the control section 101.

Thereafter, when focus control by the Z scanner 33 is performed (step S102), the excitation-light-source driving section 112 determines whether the pulse frequency set as one of the machining conditions is 40 kHz or less (step S103). When the pulse frequency is 40 kHz or less, the excitation-light-source driving section 112 reads the current table stored in association with 40 kHz from the table storing section 114 and determines, on the basis of the target output of the laser light set as one of the machining conditions, a driving current that should be supplied to the excitation light source 111 (step S104).

Thereafter, the excitation-light-source driving section 112 supplies the driving current determined in step S104 to the excitation light source 111 (step S105). In parallel to a process shown in step S105, the control section 101 controls on and off of the Q switch 23 by outputting a control signal generated on the basis of the pulse frequency read in step S101 (S106). The control section 101 controls the X scanner 8 and the Y scanner 9 and executes two-dimensional scanning to realize the marking pattern read in step S101 (S107).

Kinds of processing shown in steps S105 to S107 are shown as being executed in order for convenience. However, as explained above, the kinds of processing are performed in parallel.

On the other hand, when determining in step S103 that the pulse frequency is more than 40 kHz, the excitation-light-source driving section 112 determines whether the pulse frequency is 100 kHz or more (step S108). When the pulse frequency is 100 kHz or more, the excitation-light-source driving section 112 reads the current table stored in association with 100 kHz from the table storing section 114 and determines, on the basis of the target output of the laser light set as one of the machining conditions, a driving current that should be supplied to the excitation light source 111 (step S109). The excitation-light-source driving section 112 proceeds to steps S105 to S107 explained above and executes the kinds of processing related to the steps.

When determining in step S109 that the pulse frequency is less than 100 kHz, that is, when determining that the pulse frequency is more than 40 kHz but less than 100 kHz, the excitation-light-source driving section 112 reads the current table stored in association with 40 kHz and the current table stored in association with 100 kHz from the table storing section 114 and complements contents of the current tables to determine a driving current that should be supplied to the excitation light source 111 (step S110). The excitation-light-source driving section 112 proceeds to steps S105 to S107 and executes the kinds of processing related to the steps.

Specifically, when proceeding to step S109, the excitation-light-source driving section 112 interpolates, with, for example, a linear function obtained by associating the pulse frequency and the driving currents, the driving current determined on the basis of the current table stored in association with 40 kHz and the driving current determined on the basis of the current table stored in association with 100 kHz and determines a driving current on the basis of the linear function obtained in that way and the pulse frequency set as one of the machining conditions.

In this way, the table storing section 114 functioning as the correspondence-relation storing section stores the correspondence relation between the target output of the laser light and the driving current in association with the magnitude of the pulse frequency set as one of the machining conditions. Consequently, a driving current suitable for the magnitude of the pulse frequency can be determined. Therefore, output setting of the laser light can be appropriately executed. Fluctuation in an output of the laser light can be reduced.

Modification of Output Adjustment Corresponding to a Pulse Frequency

When a calculation-formula storing section configured to store a calculation formula for calculating a driving current using a target output as an argument is provided as the correspondence-relation storing section instead of the table storing section 114, for example, a correspondence relation with the pulse frequency only has to be included in the calculation formula, which associates the target output and the driving current, as another argument.

Output Adjustment Corresponding to a Level of a Target Output

As explained above, when the output change of the laser light is performed through the driving current, if a target output of the laser light is too low, it is likely that a driving current corresponding to an output of the laser light is excessively small and becomes unstable. In this case, it is likely that the output of the laser light also becomes unstable. Therefore, there is room of improvement for output setting on a low-output side.

On the other hand, as it is publicly known, a method of changing an output of laser light by adjusting a duty ratio of the Q switch 23 is also conceivable.

That is, for example, when the duty ratio is reduced, the period in which the Q switch 23 is switched to the ON state decreases. Therefore, an output of a pulse wave oscillated from the laser medium 25 as a fundamental wave decreases. Consequently, it is possible to reduce an output of laser light generated on the basis of the fundamental wave.

Therefore, when the output change of the laser light is performed through the duty ratio, it is possible to reduce the output of the laser light while keeping the driving current set sufficiently large not to cause destabilization.

However, it has been found that, when the duty ratio of the Q switch 23 is adjusted while keeping the driving current large, although the output setting on the low-output side is improved, a difficulty occurs in output setting on a high-output side.

That is, when the duty ratio is set large to increase the output of the laser light, the period in which the Q switch 23 is switched to the ON state increases. Therefore, a period in which the laser light is continuously oscillated increases. Then, the first wavelength conversion element 26 and the second wavelength conversion element 27 generate heat. The wavelength conversion elements are overheated by the heat generation and an increase in an output of a fundamental wave due to the driving current kept large. Laser characteristics are likely to be deteriorated, for example, an output immediately after the pulsed oscillation becomes unstable because of the influence of a thermal lens or the like.

Therefore, the control section 101 according to this embodiment properly uses, according to a level of a target output, a method for changing the output of the laser light.

Specifically, when the target output exceeds a predetermined threshold, the control section 101 controls an output of laser light emitted from the laser-light output section 2 by changing a driving current supplied to the excitation light source 111 via the excitation-light generating section 110. On the other hand, when the target output is equal to or smaller than the threshold, the control section 101 controls the output of the laser light emitted from the laser-light output section 2 by changing a duty ratio via the laser-light output section 2 while keeping the driving current supplied to the excitation light source 111 substantially fixed.

As a method of changing the duty ratio, a table that associates the target output and the duty ratio may be used. A calculation formula for calculating a duty ratio using the target output and the pulse frequency as arguments may be used.

As it is seen from the description "while keeping the driving current substantially fixed", even when the target output is equal to or smaller than the threshold, it is unnecessary to keep the driving current fixed. The driving current only has to be kept within a range at the time when the target output is increased or reduced by 10% to 20% with respect to the threshold. For example, when the threshold of the target output is set to 60%, the driving current only has to be set to a driving current at the time when the target output is 50% to 70%.

This control form can be used concurrently with the output adjustment corresponding to the pulse frequency explained above. One of the control forms can also be used.

Specific Example of Output Adjustment Corresponding to a Level of a Target Output As explained above, the two kinds of current tables corresponding to the pulse frequencies are stored in the table storing section 114 according to this embodiment. As shown in FIG. 35, in the current tables, output adjustment through a driving current and output adjustment through a duty ratio are properly used according to whether the target output is lower or higher than 60% set as a threshold for the target output.

Specifically, when the target output exceeds 60%, the driving current monotonously increases as the target output increases. On the other hand, when the target output is 60% or less, the driving current is substantially fixed with respect to a level of the target output. In this case, the driving current at the time when the target output is 60% is used. In the latter case, the duty ratio monotonously decreases as the target output decreases.

Figure 37:
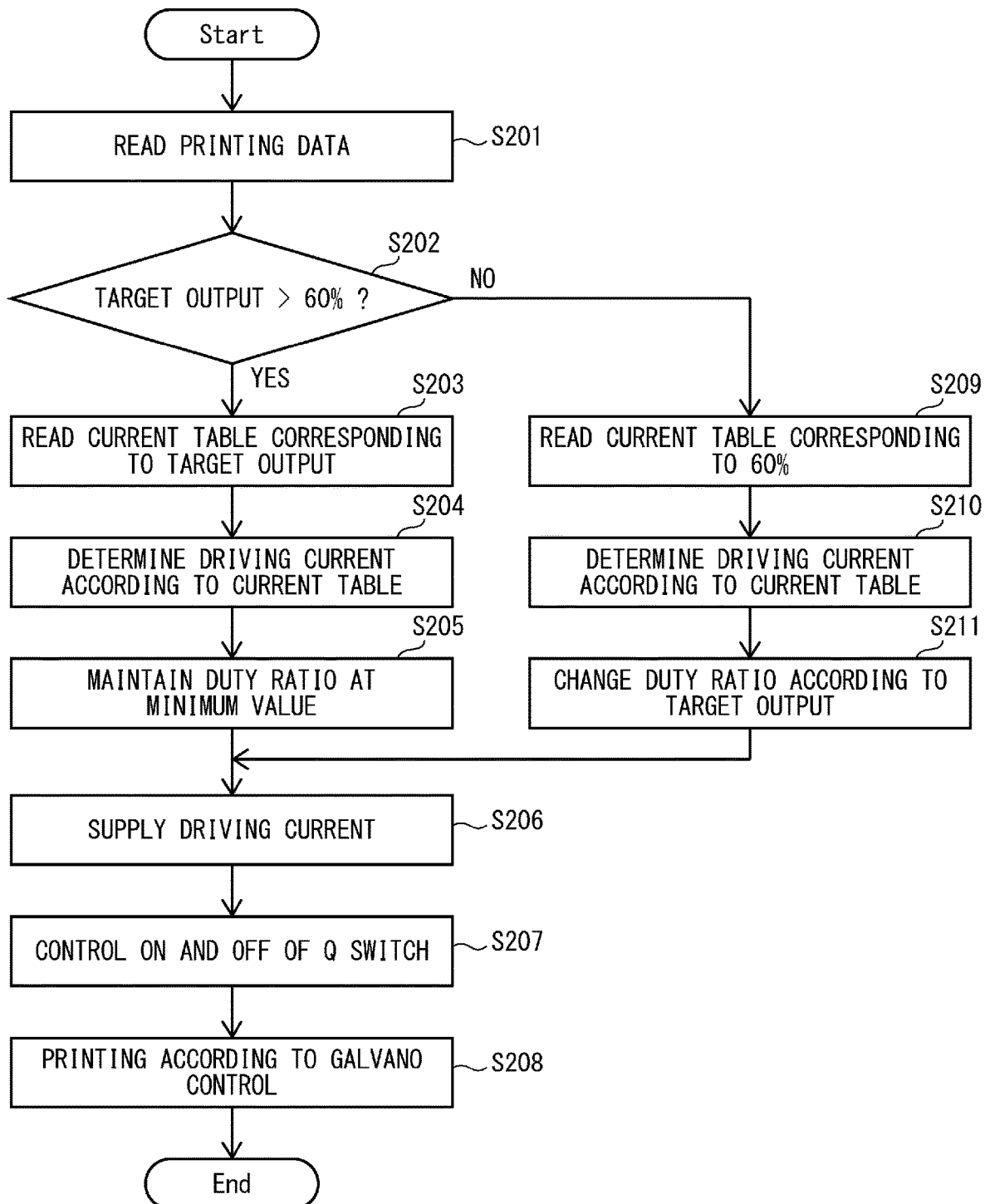
FIG. 37 is a flowchart illustrating output adjustment corresponding to levels of the target output.

FIG. 37 is a flowchart illustrating proper uses of an output adjusting method corresponding to a target output. For simplification, proper uses of the current tables corresponding to the pulse frequencies are omitted in FIG. 37. However, at it is seen from FIG. 35, proper uses corresponding to the pulse frequencies are simultaneously performed.

As shown in FIG. 37, for example, when the laser machining device L is started to machine the work W, the control section 101 reads a marking pattern set via the operation terminal 200 and printing data including the target output and the pulse frequency serving as the machining conditions (step S201). Data related to the machining conditions among the printing data read at this time is input to the excitation-light-source driving section 112 from the control section 101.

Thereafter, the excitation-light-source driving section 112 determines whether the target output set as one of the machining conditions is more than 60% (step S202). When the target output is more than 60%, the excitation-light-source driving section 112 reads the current table corresponding to the target output from the table storing section 114 (step S203) and determines a driving current according to the current table (step S204). The excitation-light-source driving section 112 executes the same processing as the flow shown in FIG. 36 and performs printing (steps S206 to S208) while maintaining the duty ratio at a minimum value (step S205).

The kinds of processing shown in steps S206 to S208 are shown as being executed in order for convenience. However, as explained above, the kinds of processing are performed in parallel.

On the other hand, when determining in step S202 that the target output is 60% or less, the excitation-light-source driving section 112 reads the current table corresponding to the target output set to 60% from the table storing section 114 irrespective of a level of the target output (step S209) and determines a driving current according to the current table (step S210). The excitation-light-source driving section 112 changes the duty ratio according to the target output (step S211) and executes the same processing as the flow shown in FIG. 36 and performs printing (steps S206 to S208).

In this way, when the target output is relatively high, the output of the laser light is changed through the driving current. On the other hand, when the target output is relatively low, the output of the laser light is changed through the duty ratio rather than the driving current.

By switching changing means for the output of the laser light according to the level of the target output, the output of the laser light can be stabilized on a low-output side and laser characteristics can be prevented from being deteriorated on a high-output side. Consequently, it is possible to appropriately change the output of the laser light without deteriorating the laser characteristics.

Configuration Related to an Output Stop of the Laser Machining Device L

Figure 38:
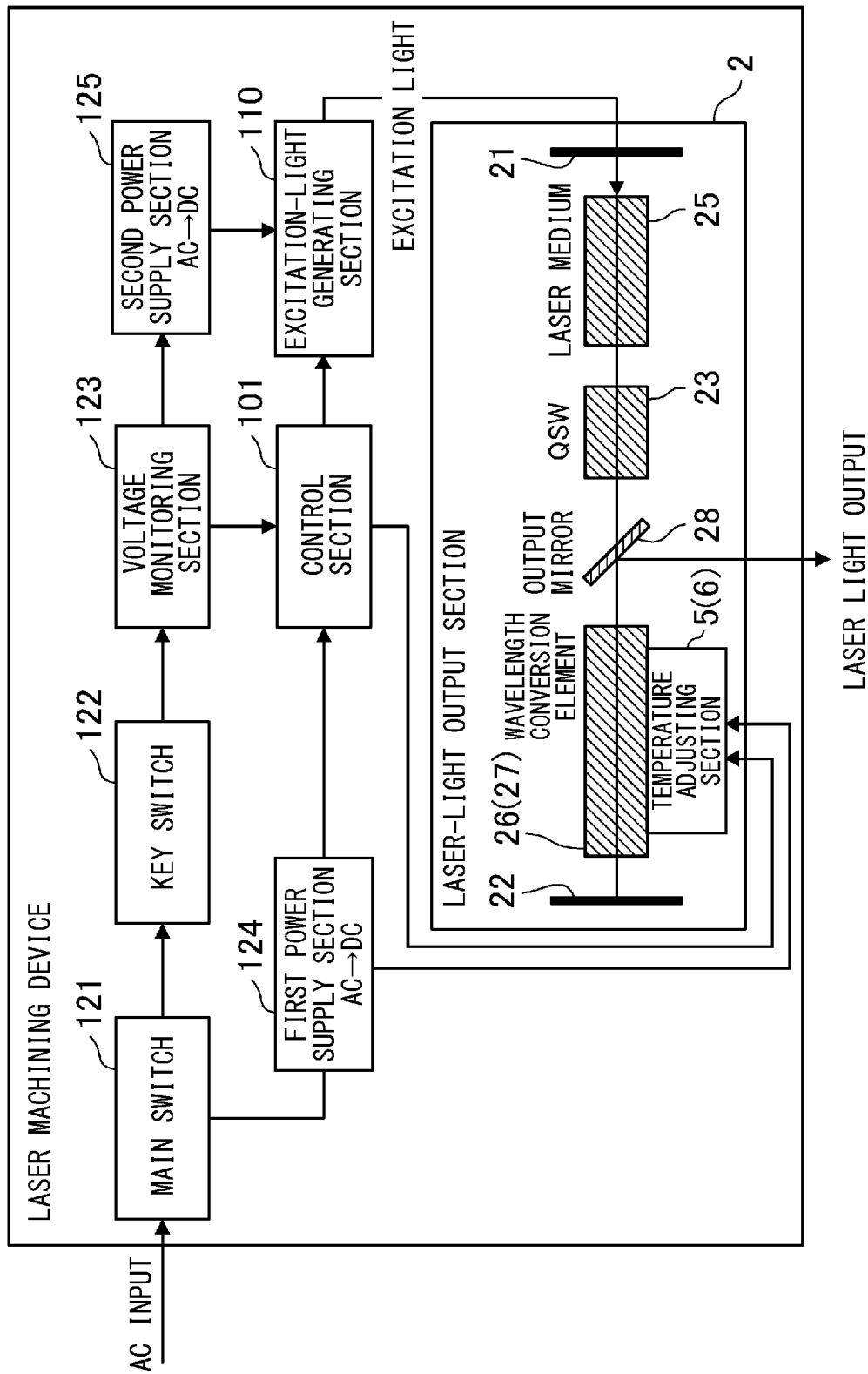
FIG. 38 is a diagram illustrating a configuration related to a power supply of the laser machining device.

FIG. 38 is a block diagram illustrating the configuration around a power supply of the laser machining device L. Among components shown in FIG. 38, the same components as the components explained above are denoted by the same reference numerals and signs. Explanation of the components is omitted as appropriate.

As shown in FIG. 38, the laser machining device L includes the excitation-light generating section 110, a power supply for supplying electric power to the laser-light output section 2 and the control section 101, and a power-supply monitoring section (in FIG. 38, described as "voltage monitoring section") 123 for monitoring the power supply.

In detail, the laser machining device L includes a first power supply section (a power supply) 124 capable of supplying electric power to the laser-light output section 2 and the control section 101. The first power supply section 124 is configured by a so-called AC/DC power supply.

Similarly, the laser machining device L includes a second power supply section (a power supply) 125 capable of supplying electric power to the excitation-light generating section 110. Like the first power supply section 124, the second power supply section 125 is configured by a general AC/DC power supply.

Power supply to the first power supply section 124 and the second power supply section 125 is turned on and off by a main switch 121 and a key switch 122. Specifically, the main switch 121 is connected to the key switch 122 and the first power supply section 124 and provided to perform a system start of the sections other than the excitation-light generating section 110. When the main switch 121 is switched to an ON state, electric power can be supplied to the first temperature adjusting section 5, the second temperature adjusting section 6, and the control section 101.

The key switch 122 is provided to surely stop emission of laser light. On and off of the key switch 122 and on and off of the emission of the laser light are associated. In detail, when the key switch 122 is switched to an OFF state, an electric circuit leading from the second power supply section 125 to the excitation-light generating section 110 is interrupted. Generation of laser excitation light and the emission of the laser light can be surely stopped. On the other hand, when the key switch 122 is switched to the ON state, the electric circuit leading from the second power supply section 125 to the excitation-light generating section 110 is conducted. The generation of the laser excitation light and the emission of the laser light are allowed.

To perform the control explained above, the laser machining device L includes the power-supply monitoring section 123 configured to monitor at least the second power supply section 125. In this embodiment, the power-supply monitoring section 123 is configured to monitor the second power supply section 125 by measuring at least a supply voltage to the second power supply section 125. Instead of this configuration, the power-supply monitoring section 123 may monitor only a supply voltage to the first power supply section 124. Alternatively, the power-supply monitoring section 123 may monitor a voltage supplied from the first power supply section 124 or the second power supply section 125 rather than the supply voltage to the first power supply section 124 or the second power supply section 125.

Although details are omitted, as explained above, the laser-light output section 2 is the intra-cavity type. The temperatures of the first and second wavelength conversion elements 26 and 27 are respectively adjusted by the first and second temperature adjusting sections (the temperature adjusting sections) 5 and 6.

Incidentally, in such a laser machining device L, for example, when power supply to the device L is stopped because of a power failure or shutdown, the generation of the excitation light by the excitation-light generating section 110 and the temperature adjustment of the wavelength conversion elements 26 and 27 stop according to a charge amount remaining in a capacitor or the like for a power supply. When the generation of the excitation light by the excitation-light generating section 110 stops, the generation of the fundamental wave by the laser medium 25 is stopped. In the above explanation, the generation of the fundamental wave and the temperature adjustment of the wavelength conversion elements 26 and 27 stop at random.

When the configuration of the extra-cavity type is adopted, the fundamental wave generated in the resonator is always output to the outside of the resonator. Therefore, even if the generation of the fundamental wave stops after the temperature adjustment of the wavelength conversion elements 26 and 27 stops, energy of the laser light including the fundamental wave does not accumulate on the inside of the resonator.

However, when the configuration of the intra-cavity type is adopted as in the embodiment disclosed herein, a wavelength conversion element is disposed between a pair of mirrors. Therefore, the wavelength conversion element is located on the inner side of a resonator. In such a configuration, harmonics generated by the wavelength conversion element are output to the outside of the resonator by a half mirror (e.g., the first separator 28a explained above) as long as the temperature adjustment explained above sufficiently functions.

However, in such a configuration of the intra-cavity type, if temperature adjustment of the wavelength conversion element stops before generation of a fundamental wave stops, it is likely that wavelength conversion of the generated fundamental wave is not sufficiently performed and energy of laser light accumulates on the inside of the resonator. To surely prevent various optical components disposed in the resonator from being damaged, it is undesirable that the resonator falls into such a situation.

Therefore, the control section 101 according to this embodiment is configured to control, when determining on the basis of a monitoring result by the power-supply monitoring section 123 that the power supply to the first and second power supply sections 124 and 125 is stopped, at least one of the excitation-light generating section 110 and the Q switch 23 such that the generation of the fundamental wave is prevented in a state in which the temperature adjustment by the first and second temperature adjusting sections 5 and 6 continues.

Specifically, when electric power supplied to each of the first and second power supply sections 124 and 125 falls below a predetermined threshold, the control section 101 determines that the power supply to the first and second power supply sections 124 and 125 is stopped. The control section 101 may perform the determination on the basis of a level of the electric power or on the basis of a physical quantity related to the electric power such as a voltage.

When determining that the power supply to the first and second power supply sections 124 and 125 is stopped, the control section 101 stops the generation of the laser excitation light by stopping power supply to the excitation-light generating section 110, in particular, supply of a driving current from the excitation-light-source driving section 112 to the excitation light source 111. Consequently, the generation of the fundamental wave based on the laser excitation light stops. Therefore, incidence of the fundamental wave on the first and second wavelength conversion elements 26 and 27 also stops.

Figure 39:
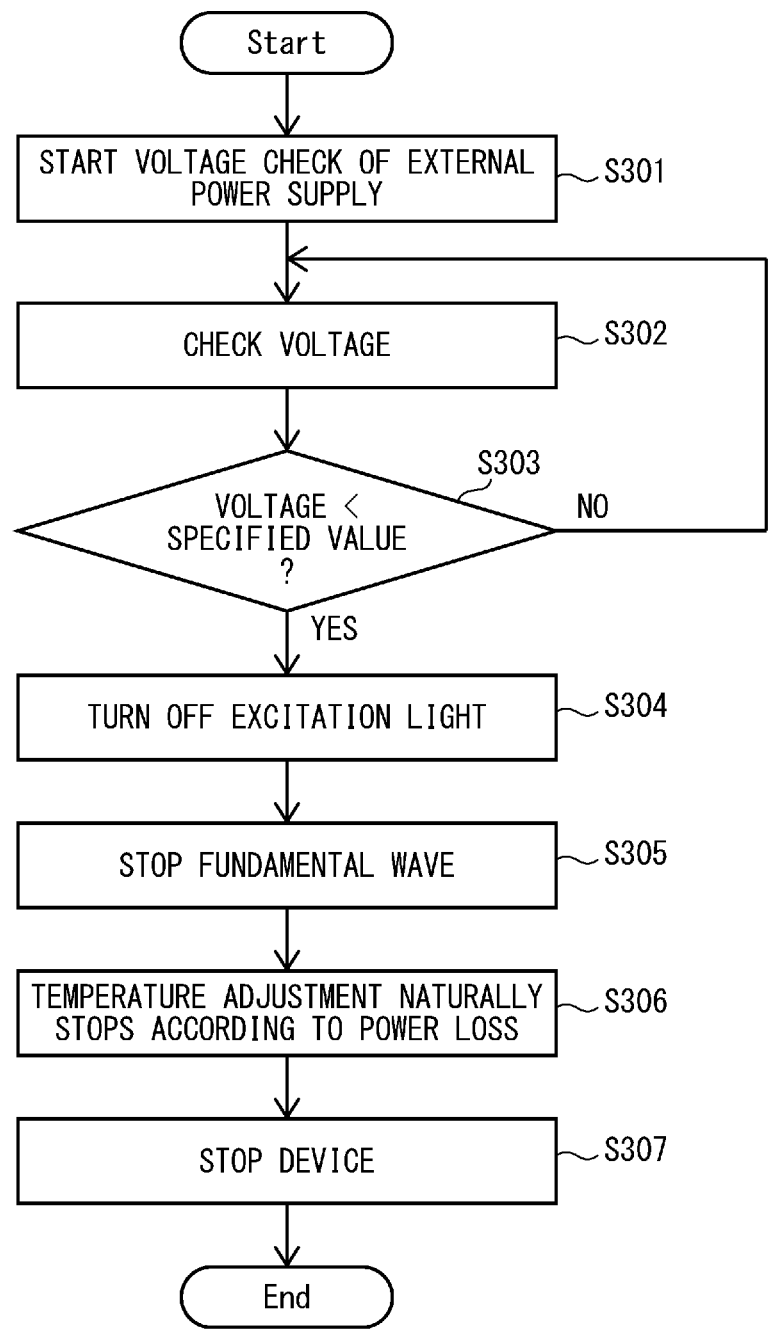
FIG. 39 is a flowchart illustrating processing related to an output stop of the laser machining device.

Specific Example of Processing Related to an Output Stop of the Laser Machining Device L FIG. 39 is a flowchart illustrating processing related to an output stop of the laser machining device L. As shown in FIG. 39, during the operation of the laser machining device L, the power-supply monitoring section 123 checks a voltage of electric power supplied to each of the first and second power supply sections 124 and 125 in order to check power supply to the second power supply section 125 functioning as an external power supply (steps S301 and S302).

The control section 101 determines whether the voltage checked by the power-supply monitoring section 123 is smaller than a predetermined threshold (a specified value) (step S303). When the voltage is equal to or larger than the threshold, the control section 101 returns to step S302. That is, the control section 101 repeats processing shown in steps S302 and S303 as long as a voltage equal to or larger than the threshold is secured.

When the voltage falls below the threshold because the main switch 121 is switched to the OFF state or the power supply to the first or second power supply section 124 or 125 is intentionally or unintentionally interrupted, the control section 101 proceeds from step S303 to step S304. The control section 101 stops, in the excitation-light generating section 110, the power supply from the excitation-light-source driving section 112 to the excitation light source 111. Consequently, the generation of the laser excitation light is stopped in the excitation light source 111 and the generation of the fundamental wave stops in the laser medium 25 (step S305). Thereafter, the temperature adjustment by the first and second temperature adjusting sections 5 and 6 naturally stops according to a charge amount remaining in the capacitor or the like (step S306). The laser machining device L is shut down (step S307).

In this way, the control section 101 prevents generation of the fundamental wave in a state in which the temperature adjustment by the temperature adjusting sections 5 and 6 continues. Since the temperature adjustment by the temperature adjusting sections 5 and 6 continues, the generation of the harmonics is kept promoted. Therefore, when the power supply is stopped, the fundamental wave generated while being reduced is smoothly converted into harmonics. Therefore, energy of the laser light can be prevented from accumulating. Therefore, the optical components can be prevented from being damaged.

Modification Related to an Output Stop of the Laser Machining Device L

In the embodiment, the power-supply monitoring section 123 is configured to monitor each of the first and second power supply sections 124 and 125 by measuring the supply voltage to each of the first and second power supply sections 124 and 125. However, the power-supply monitoring section 123 is not limited to such a configuration.

For example, the power-supply monitoring section 123 may monitor an electric connection state between the second power supply section 125 and the excitation-light generating section 110 or an electric connection state between the first power supply section 124 and the control section 101 or the laser-light output section 2. When determining that one of the connections is interrupted, the power-supply monitoring section 123 may determine that the power supply to the first and second power supply sections 124 and 125 is stopped.

In this case, the power-supply monitoring section 123 may be configured to, for example, when the electric connection between the second power supply section 125 and the excitation-light generating section 110 is interrupted as a result of switching the key switch 122 from the ON state to the OFF state, input a predetermined electric signal to the power-supply monitoring section 123. In this case, when such an electric signal is input, the power-supply monitoring section 123 can determine that the power supply by the second power supply section 125 is stopped.

Figure 40:
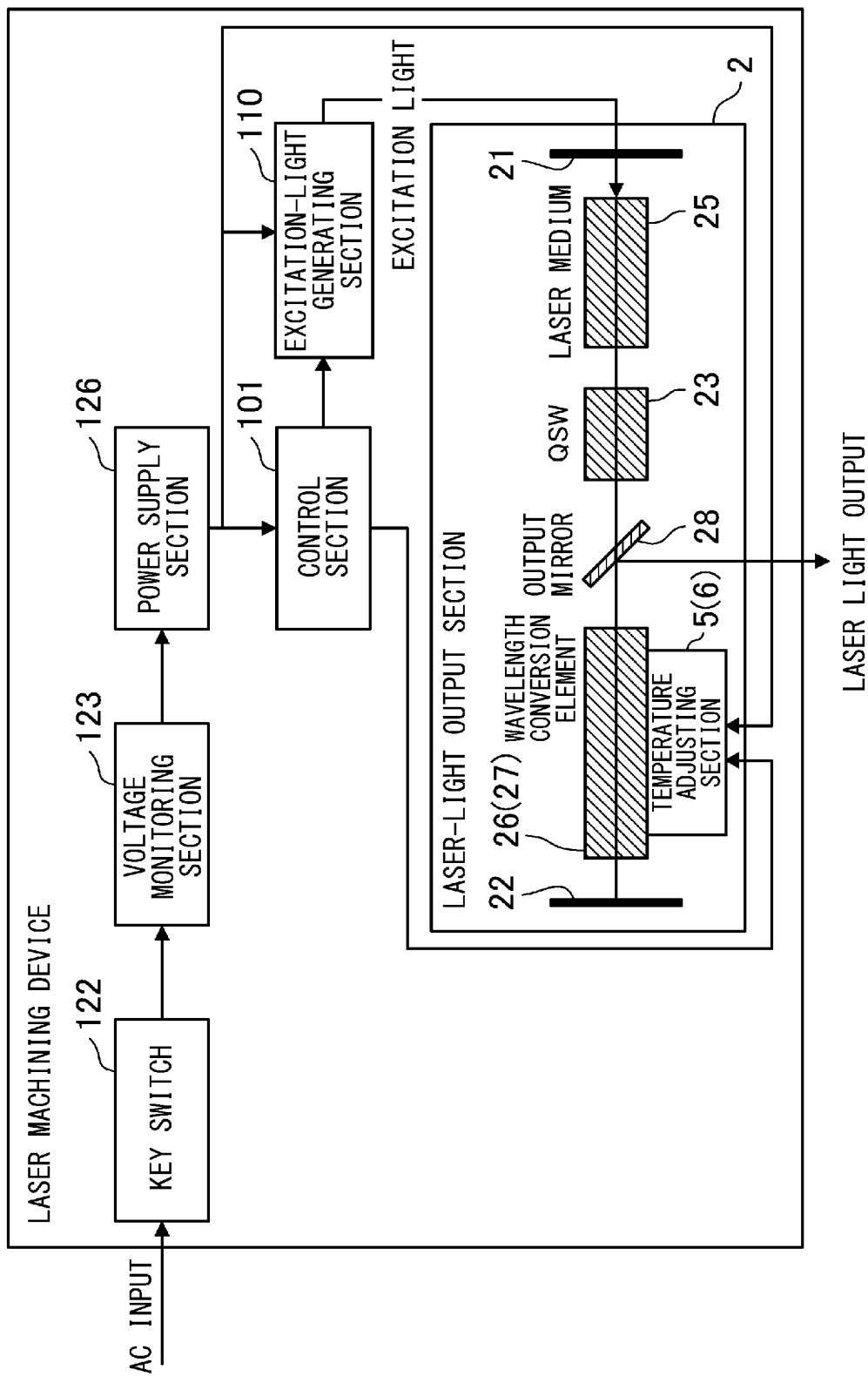
FIG. 40 is a diagram corresponding to FIG. 38 showing a modification of the configuration related to the power supply.

The configuration including the first and second power supply sections 124 and 125 is not essential. For example, as in a modification shown in FIG. 40, the control section 101, the excitation-light generating section 110, and the laser-light output section 2 may be controlled by one power supply section 126.

When an input power supply to the laser machining device L is a DC input, power supply such as the first and second power supply sections 124 and 125 does not have to be provided on the inside of the laser machining device L. In this case, a DC input from the outside only has to be monitored by the power-supply monitoring section 123.

In the embodiment, the control section 101 is configured to stop the generation of the fundamental wave by the laser medium by stopping the power supply to the excitation-light generating section 110. However, the control section 101 is not limited to such a configuration.

Figure 41:
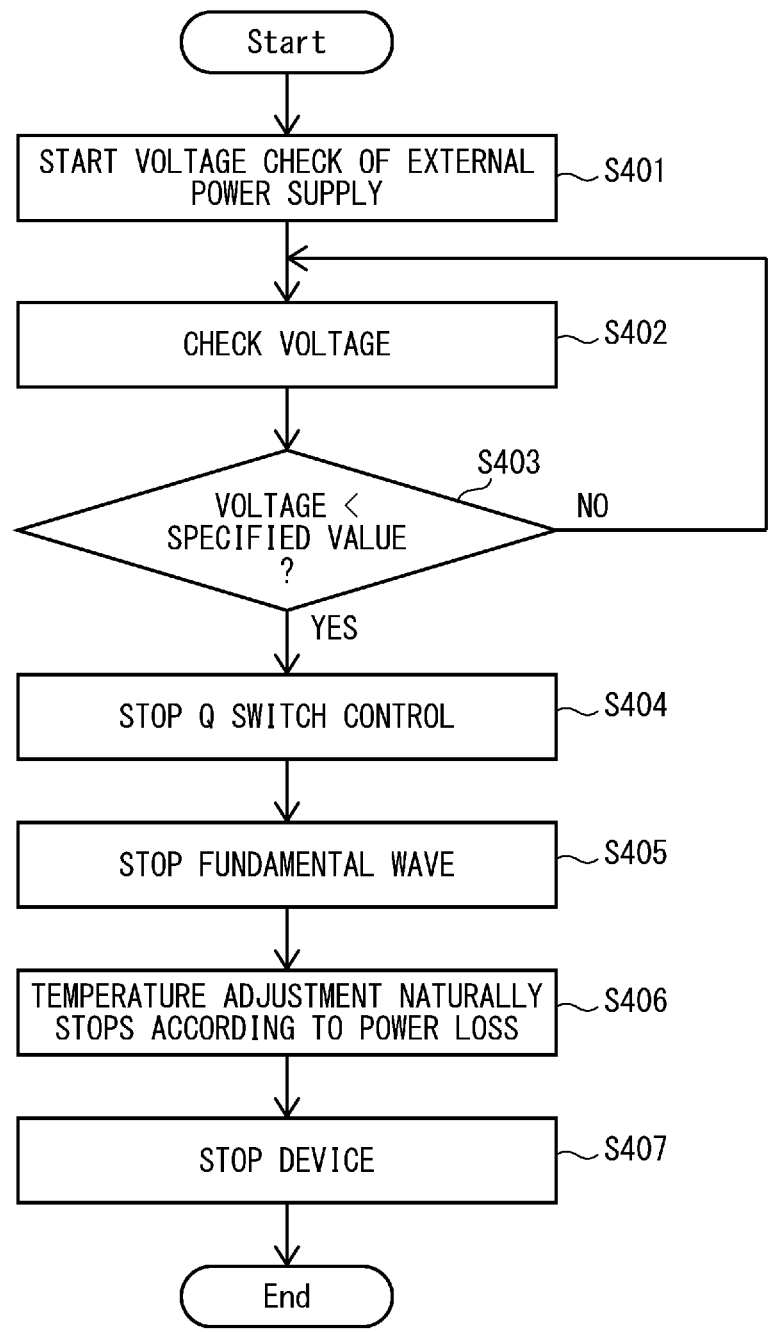
FIG. 41 is a diagram corresponding to FIG. 39 showing a modification of processing related to the output stop.

For example, when determining that the power supply by the second power supply section 125 is stopped, the control section 101 may prevent the generation of the fundamental wave by retaining the Q switch 23 in the OFF state in a state in which the temperature adjustment by the first and second temperature adjusting sections 5 and 6 is continued. In this case, at least a pulse-oscillated fundamental wave is not made incident on the first and second wavelength conversion elements 26 and 27. In this case, the control section 101 only has to stop the control related to the Q switch 23 as shown in step S404 in FIG. 41 instead of step S304 in FIG. 37. The control section 101 may simultaneously perform the stop of the pulse oscillation by the Q switch 23 and the stop of the power supply to the excitation-light generating section 110.

In realizing the processing related to the output stop of the laser light, the configuration including the first wavelength conversion element 26 and the second wavelength conversion element 27 is not essential. For example, only one wavelength conversion element may be provided or three or more wavelength conversion elements may be provided.

In realizing the processing related to the output stop of the laser light, the Q switch 23 is not essential. The configuration explained above can also be applied to a device not including the Q switch 23 and capable of only continuously oscillating the laser light.

As explained above, the present disclosure can be applied to a laser marker and the like.

What is claimed is:

1. A laser machining device comprising:
an excitation-light generating section configured to generate excitation light;
a laser-light output section configured to generate laser light on the basis of the excitation light generated by the excitation-light generating section and emit the laser light;
a laser-light scanning section configured to irradiate the laser light emitted from the laser-light output section on a workpiece and scan the laser light on a surface of the workpiece; and
a control section configured to perform machining of the workpiece by controlling the excitation-light generating section, the laser-light output section, and the laser-light scanning section, wherein
the laser-light output section includes:
a resonator forming a resonant optical path by a first mirror and a second mirror for emitting the laser light, wherein
the resonator includes:
a laser medium configured to generate a fundamental wave on the basis of the excitation light generated by the excitation-light generating section;
a Q switch configured to pulse-oscillate the fundamental wave generated by the laser medium on the basis of a control signal input from the control section;
the first mirror reflecting the fundamental wave generated by the laser medium;
a Q-switch housing section including an incident section on which the excitation light generated by the excitation-light generating section can be made incident and configured by housing at least the Q switch and the first mirror;
a first wavelength conversion element on which the fundamental wave generated by the laser medium is made incident, the first wavelength conversion element generating a second harmonic having a frequency higher than a frequency of the fundamental wave;
a second wavelength conversion element on which the second harmonic generated by the first wavelength conversion element is made incident, the second wavelength conversion element generating a third harmonic having a frequency higher than the frequency of the second harmonic;
the second mirror reflecting at least one of the second harmonic and the third harmonic; and
a wavelength converting section including a housing in which a transmission window section capable of transmitting the fundamental wave generated by the laser medium and an output window section capable of emitting the third harmonic generated by the second wavelength conversion element as laser light are formed, the wavelength converting section being configured by airtightly housing, within an internal space surrounded by the housing independent from the Q-switch housing section in the resonator, at least the first wavelength conversion element, the second wavelength conversion element, and the second mirror,
and wherein the laser medium is housed in one of the Q-switch housing section and the wavelength converting section.

2. The laser machining device according to claim 1, further comprising an element-temperature adjusting section for adjusting temperatures of the first and second wavelength conversion elements, the element-temperature adjusting section being disposed on an outside of the housing.

3. The laser machining device according to claim 2, wherein
the element-temperature adjusting section includes:
a first temperature adjusting section configured to adjust the temperature of the first wavelength conversion element; and
a second temperature adjusting section configured to adjust the temperature of the second wavelength conversion element, and
the first temperature adjusting section and the second temperature adjusting section are configured to be controlled independently from each other.

4. The laser machining device according to claim 1, wherein
the laser medium is housed in the Q-switch housing section, and
the Q-switch housing section is configured by airtightly housing the laser medium, the Q switch, and the first mirror.

5. The laser machining device according to claim 1, wherein, halfway in the resonant optical path, an output mirror for separating laser light including at least the third harmonic from the resonant optical path is disposed.

6. The laser machining device according to claim 5, wherein the output mirror is airtightly housed by the housing.

7. A laser oscillator comprising:
a resonator forming a resonant optical path by a first mirror and a second mirror for emitting the laser light, wherein
the resonator includes:
a laser medium configured to generate a fundamental wave on the basis of an excitation light;
a Q switch configured to control, on the basis of a control signal input from an outside, on and off of pulsed oscillation of the fundamental wave generated by the laser medium;
the first mirror reflecting the fundamental wave generated by the laser medium;
a Q-switch housing section including an incident section on which the excitation light can be made incident and configured to house at least the Q switch and the first mirror;
a first wavelength conversion element on which the fundamental wave generated by the laser medium is made incident, the first wavelength conversion element generating a second harmonic having a frequency higher than a frequency of the fundamental wave;
a second wavelength conversion element on which the second harmonic generated by the first wavelength conversion element is made incident, the second wavelength conversion element generating a third harmonic having a frequency higher than the frequency of the second harmonic;
the second mirror reflecting at least one of the second harmonic and the third harmonic; and
a wavelength converting section including a housing in which a transmission window section capable of transmitting the fundamental wave generated by the laser medium and an output window section capable of emitting the third harmonic generated by the second wavelength conversion element as laser light are formed, the wavelength converting section being configured by airtightly housing, within an internal space surrounded by the housing independent from the Q-switch housing section in the resonator, at least the first wavelength conversion element, the second wavelength conversion element, and the second mirror, wherein the laser medium is housed in one of the Q-switch housing section and the wavelength converting section.

8. The laser machining device according to claim 5, further comprising, in the wavelength converting section, a concave lens for shaping a beam diameter of the laser light separated from the resonant optical path by the output mirror and including at least the third harmonic.

9. The laser machining device according to claim 5, further comprising, in the wavelength converting section, a separator for extracting the third harmonic from the laser light separated from the resonant optical path by the output mirror and including at least the third harmonic.

10. The laser machining device according to claim 9, wherein the separator is a beam splitter configured to transmit the second harmonic and reflect the third harmonic, and the laser machining device further comprises, in the wavelength converting section, an attenuating section for attenuating the second harmonic transmitted in the beam splitter.

\* \* \* \* \*